United States Patent
Frank et al.

(10) Patent No.: US 9,756,262 B2
(45) Date of Patent: Sep. 5, 2017

(54) SYSTEMS AND METHODS FOR MONITORING POWER SYSTEMS

(71) Applicant: FLIR Systems, Inc., Wilsonville, OR (US)

(72) Inventors: Jeffrey D. Frank, Santa Barbara, CA (US); Shawn Jepson, Lakeside, MT (US); Mark Nussmeier, Goleta, CA (US); Eric A. Kurth, Santa Barbara, CA (US); Nicholas Högasten, Santa Barbara, CA (US); Theodore R. Hoelter, Goleta, CA (US); Katrin Strandemar, Rimbo (SE); Pierre Boulanger, Goleta, CA (US); Barbara Sharp, Santa Barbara, CA (US)

(73) Assignee: FLIR Systems, Inc., Wilsonville, OR (US)

( * ) Notice: Subject to any disclaimer, the term of this patent is extended or adjusted under 35 U.S.C. 154(b) by 423 days.

(21) Appl. No.: 14/135,493

(22) Filed: Dec. 19, 2013

(65) Prior Publication Data

US 2014/0168433 A1  Jun. 19, 2014

Related U.S. Application Data

(63) Continuation-in-part of application No. 14/101,245, filed on Dec. 9, 2013, which is a continuation of
(Continued)

(51) Int. Cl.
*B60Q 1/00* (2006.01)
*H04N 5/33* (2006.01)
*H04N 5/225* (2006.01)

(52) U.S. Cl.
CPC .................. *H04N 5/33* (2013.01); *B60Q 1/00* (2013.01); *H04N 5/2257* (2013.01)

(58) Field of Classification Search
CPC ........... B60Q 1/00; H04N 5/2257; H04N 5/33
(Continued)

(56) References Cited

U.S. PATENT DOCUMENTS 2,764,055 A   9/1956  Clemens et al.
6,348,951 B1  2/2002  Kim
(Continued)

FOREIGN PATENT DOCUMENTS

CA   2764055   7/2012
CN   2874947   2/2007
(Continued)

OTHER PUBLICATIONS

Yoon et al, A study of thermographic diagnosis system and imaging algorithm by distributed thermal data using single infrared sensor, Aug. 23-26, 2007.*
(Continued)

*Primary Examiner* — Shan Elahi
(74) *Attorney, Agent, or Firm* — Haynes and Boone, LLP

(57) ABSTRACT

Techniques are disclosed for systems and methods using small form factor infrared imaging modules to monitor aspects of a power system. A system may include one or more infrared imaging modules, a processor, a memory, a display, a communication module, and modules to control components of a power system. Infrared imaging modules may be mounted on, installed in, or otherwise integrated with a power system having one or more power system components. The infrared imaging modules may be configured to capture thermal images of portions of the power system. Various thermal image analytics and profiling may be performed on the captured thermal images to determine the operating conditions and temperatures of portions of the power system. Monitoring information may be generated
(Continued)

based on the determined conditions and temperatures and then presented to a user of the power system.

28 Claims, 17 Drawing Sheets

Related U.S. Application Data application No. PCT/US2012/041744, filed on Jun. 8, 2012, application No. 14/135,493, which is a continuation-in-part of application No. 14/099,818, filed on Dec. 6, 2013, which is a continuation of application No. PCT/US2012/041749, filed on Jun. 8, 2012, application No. 14/135,493, which is a continuation-in-part of application No. 14/101,258, filed on Dec. 9, 2013, which is a continuation-in-part of application No. PCT/US2012/041739, filed on Jun. 8, 2012, application No. 14/135,493, which is a continuation-in-part of application No. 13/437,645, filed on Apr. 2, 2012, now Pat. No. 9,171,361, which is a continuation-in-part of application No. 13/105,765, filed on May 11, 2011, now Pat. No. 8,565,547, and a continuation-in-part of application No. 12/766,739, filed on Apr. 23, 2010, now Pat. No. 8,520,970, said application No. 13/105,765 is a continuation of application No. PCT/EP2011/056432, filed on Apr. 21, 2011, which is a continuation-in-part of application No. 12/766,739, filed on Apr. 23, 2010, now Pat. No. 8,520,970, application No. 14/135,493, which is a continuation of application No. 12/477,828, filed on Jun. 3, 2009, now Pat. No. 8,749,635, said application No. 13/105,765 is a continuation-in-part of application No. 12/766,739, filed on Apr. 23, 2010, now Pat. No. 8,520,970.

(60) Provisional application No. 61/745,373, filed on Dec. 21, 2012, provisional application No. 61/656,889, filed on Jun. 7, 2012, provisional application No. 61/545,056, filed on Oct. 7, 2011, provisional application No. 61/495,873, filed on Jun. 10, 2011, provisional application No. 61/495,879, filed on Jun. 10, 2011, provisional application No. 61/495,888, filed on Jun. 10, 2011, provisional application No. 61/473,207, filed on Apr. 8, 2011, provisional application No. 61/748,018, filed on Dec. 31, 2012, provisional application No. 61/792,582, filed on Mar. 15, 2013, provisional application No. 61/793,952, filed on Mar. 15, 2013, provisional application No. 61/746,069, filed on Dec. 26, 2012, provisional application No. 61/746,074, filed on Dec. 26, 2012.

(58) Field of Classification Search
USPC .......................................................... 348/143
See application file for complete search history.

(56) References Cited

U.S. PATENT DOCUMENTS

| | | | |
|---|---|---|---|
| 6,396,543 B1 | 5/2002 | Shin et al. | |
| 6,424,843 B1 | 7/2002 | Reitmaa et al. | |
| 6,633,231 B1 | 10/2003 | Okamoto et al. | |
| 6,681,120 B1 | 1/2004 | Kim, II | |
| 6,759,949 B2 | 7/2004 | Miyahara | |
| 6,845,913 B2* | 1/2005 | Madding | G01N 25/72 235/375 |
| 6,883,054 B2 | 4/2005 | Yamaguchi et al. | |
| 6,911,652 B2 | 6/2005 | Walkenstein | |
| 7,050,107 B1 | 5/2006 | Frank et al. | |
| D524,785 S | 7/2006 | Huang | |
| 7,084,857 B2 | 8/2006 | Lieberman et al. | |
| 7,208,733 B2 | 4/2007 | Mian et al. | |
| 7,263,379 B1 | 8/2007 | Parkulo et al. | |
| 7,284,921 B2 | 10/2007 | Lapstun et al. | |
| 7,296,747 B2 | 11/2007 | Rohs | |
| 7,305,368 B2 | 12/2007 | Lieberman et al. | |
| 7,321,783 B2 | 1/2008 | Kim, II | |
| 7,333,832 B2 | 2/2008 | Tsai et al. | |
| 7,377,835 B2 | 5/2008 | Parkulo et al. | |
| 7,420,663 B2 | 9/2008 | Wang et al. | |
| 7,453,064 B2 | 11/2008 | Lee | |
| 7,477,309 B2 | 1/2009 | Cuccias | |
| 7,567,818 B2 | 7/2009 | Pylkko | |
| 7,572,077 B2 | 8/2009 | Lapstun et al. | |
| 7,575,077 B2 | 8/2009 | Priepke et al. | |
| 7,595,904 B2 | 9/2009 | Lapstun et al. | |
| 7,627,364 B2 | 12/2009 | Sato | |
| 7,697,962 B2 | 4/2010 | Cradick et al. | |
| 7,723,686 B2 | 5/2010 | Hannebauer | |
| 7,725,141 B2 | 5/2010 | Su | |
| 7,728,281 B2 | 6/2010 | Chen | |
| 7,735,974 B2 | 6/2010 | Silverbrook et al. | |
| 7,747,454 B2 | 6/2010 | Bartfeld et al. | |
| 7,760,919 B2 | 7/2010 | Namgoong | |
| 7,761,114 B2 | 7/2010 | Silverbrook et al. | |
| 7,773,870 B2 | 8/2010 | Naruse | |
| 7,801,733 B2 | 9/2010 | Lee et al. | |
| 7,810,733 B2 | 10/2010 | Silverbrook et al. | |
| 7,872,574 B2 | 1/2011 | Betts et al. | |
| 7,900,842 B2 | 3/2011 | Silverbrook et al. | |
| 7,903,152 B2 | 3/2011 | Kim, II | |
| 7,947,222 B2 | 5/2011 | Bae et al. | |
| 7,960,700 B2 | 6/2011 | Craig et al. | |
| 8,003,941 B1* | 8/2011 | Heinke | G01J 5/02 250/330 |
| 8,275,413 B1 | 9/2012 | Fraden et al. | |
| 8,305,577 B2 | 11/2012 | Kivioja et al. | |
| 8,345,226 B2 | 1/2013 | Zhang | |
| 8,537,343 B2 | 9/2013 | Zhang | |
| 8,781,420 B2 | 7/2014 | Schlub et al. | |
| 8,825,112 B1 | 9/2014 | Fraden et al. | |
| 2001/0045463 A1* | 11/2001 | Madding | G01N 25/72 235/462.14 |
| 2002/0006337 A1 | 1/2002 | Kimura et al. | |
| 2002/0122036 A1 | 9/2002 | Sasaki et al. | |
| 2002/0135571 A1 | 9/2002 | Klocek et al. | |
| 2002/0140542 A1 | 10/2002 | Prokoski et al. | |
| 2002/0149600 A1 | 10/2002 | Van Splunter et al. | |
| 2003/0007193 A1 | 1/2003 | Sato et al. | |
| 2003/0112871 A1 | 6/2003 | Demos | |
| 2003/0122957 A1 | 7/2003 | Emme | |
| 2003/0209893 A1* | 11/2003 | Breed | B60J 10/00 280/735 |
| 2003/0223623 A1 | 12/2003 | Gutta et al. | |
| 2004/0047518 A1 | 3/2004 | Tiana | |
| 2004/0101298 A1 | 5/2004 | Mandelbaum et al. | |
| 2004/0127156 A1 | 7/2004 | Park | |
| 2004/0128070 A1 | 7/2004 | Schmidt et al. | |
| 2004/0129478 A1* | 7/2004 | Breed | B60N 2/002 180/273 |
| 2004/0157612 A1 | 8/2004 | Kim, II | |
| 2004/0165788 A1 | 8/2004 | Perez et al. | |
| 2004/0169860 A1 | 9/2004 | Jung et al. | |
| 2004/0206898 A1* | 10/2004 | Ratliff | G01J 5/52 250/252.1 |
| 2004/0207036 A1 | 10/2004 | Ikeda | |
| 2004/0256561 A1 | 12/2004 | Beuhler et al. | |
| 2005/0017488 A1* | 1/2005 | Breed | B60N 2/002 280/735 |
| 2005/0030314 A1 | 2/2005 | Dawson | |
| 2005/0046584 A1* | 3/2005 | Breed | B60C 11/24 340/13.31 |
| 2005/0063453 A1* | 3/2005 | Camm | G01J 5/0003 374/161 |
| 2005/0067852 A1 | 3/2005 | Jeong | |
| 2005/0068333 A1 | 3/2005 | Nakahashi et al. | |

(56) References Cited

U.S. PATENT DOCUMENTS

| | | |
|---|---|---|
| 2005/0089241 A1 | 4/2005 | Kawanishi et al. |
| 2005/0093890 A1 | 5/2005 | Baudisch |
| 2005/0110803 A1 | 5/2005 | Sugimura |
| 2005/0138569 A1 | 6/2005 | Baxter et al. |
| 2005/0169655 A1 | 8/2005 | Koyama et al. |
| 2005/0184993 A1 | 8/2005 | Ludwin et al. |
| 2005/0213813 A1 | 9/2005 | Lin et al. |
| 2005/0213853 A1 | 9/2005 | Maier et al. |
| 2005/0219249 A1 | 10/2005 | Xie et al. |
| 2005/0248912 A1 | 11/2005 | Kang et al. |
| 2005/0265688 A1 | 12/2005 | Kobayashi |
| 2005/0270784 A1 | 12/2005 | Hahn et al. |
| 2005/0277447 A1 | 12/2005 | Buil et al. |
| 2006/0039686 A1 | 2/2006 | Soh et al. |
| 2006/0043296 A1 | 3/2006 | Mian et al. |
| 2006/0060984 A1 | 3/2006 | Wakabayashi et al. |
| 2006/0077246 A1 | 4/2006 | Kawakami et al. |
| 2006/0097172 A1 | 5/2006 | Park |
| 2006/0120712 A1 | 6/2006 | Kim |
| 2006/0132642 A1 | 6/2006 | Hosaka et al. |
| 2006/0140501 A1 | 6/2006 | Tadas |
| 2006/0147191 A1 | 7/2006 | Kim |
| 2006/0154559 A1 | 7/2006 | Yoshida |
| 2006/0210249 A1 | 9/2006 | Seto |
| 2006/0234744 A1 | 10/2006 | Sung et al. |
| 2006/0240867 A1 | 10/2006 | Wang et al. |
| 2006/0279758 A1 | 12/2006 | Myoki |
| 2006/0285907 A1 | 12/2006 | Kang et al. |
| 2007/0004449 A1 | 1/2007 | Sham |
| 2007/0019077 A1 | 1/2007 | Park |
| 2007/0019099 A1 | 1/2007 | Lieberman et al. |
| 2007/0019103 A1 | 1/2007 | Lieberman et al. |
| 2007/0033309 A1 | 2/2007 | Kuwabara et al. |
| 2007/0034800 A1 | 2/2007 | Huang |
| 2007/0052616 A1 | 3/2007 | Yoon |
| 2007/0057764 A1 | 3/2007 | Sato et al. |
| 2007/0103479 A1 | 5/2007 | Kim et al. |
| 2007/0120879 A1 | 5/2007 | Kanade et al. |
| 2007/0132858 A1 | 6/2007 | Chiba et al. |
| 2007/0139739 A1 | 6/2007 | Kim et al. |
| 2007/0159524 A1 | 7/2007 | Kim et al. |
| 2007/0164771 A1* | 7/2007 | Lin .................. G01R 31/2846 324/762.02 |
| 2007/0189583 A1 | 8/2007 | Shimada et al. |
| 2007/0211965 A1 | 9/2007 | Helbing et al. |
| 2007/0222798 A1 | 9/2007 | Kuno |
| 2007/0248284 A1 | 10/2007 | Bernsen et al. |
| 2007/0274541 A1 | 11/2007 | Uetake et al. |
| 2007/0285439 A1 | 12/2007 | King et al. |
| 2007/0286517 A1 | 12/2007 | Paik et al. |
| 2007/0299226 A1 | 12/2007 | Park et al. |
| 2008/0038579 A1 | 2/2008 | Schuisky et al. |
| 2008/0056612 A1 | 3/2008 | Park et al. |
| 2008/0079834 A1 | 4/2008 | Chung et al. |
| 2008/0095714 A1* | 4/2008 | Castella ............... A61B 5/0066 424/9.3 |
| 2008/0112012 A1 | 5/2008 | Yokoyama et al. |
| 2008/0151056 A1 | 6/2008 | Ahamefula |
| 2008/0165190 A1 | 7/2008 | Min et al. |
| 2008/0165342 A1 | 7/2008 | Yoshida et al. |
| 2008/0170082 A1 | 7/2008 | Kim |
| 2008/0218474 A1 | 9/2008 | Ahn et al. |
| 2008/0248833 A1 | 10/2008 | Silverbrook et al. |
| 2008/0266079 A1 | 10/2008 | Lontka |
| 2008/0278772 A1 | 11/2008 | Silverbrook et al. |
| 2008/0284880 A1 | 11/2008 | Numata |
| 2008/0292144 A1 | 11/2008 | Kim |
| 2008/0297614 A1 | 12/2008 | Lieberman et al. |
| 2009/0023421 A1 | 1/2009 | Parkulo et al. |
| 2009/0027525 A1 | 1/2009 | Lin et al. |
| 2009/0040042 A1 | 2/2009 | Lontka |
| 2009/0040195 A1 | 2/2009 | Njolstad et al. |
| 2009/0052883 A1 | 2/2009 | Lee et al. |
| 2009/0129700 A1 | 5/2009 | Rother et al. |
| 2009/0131104 A1 | 5/2009 | Yoon |
| 2009/0139781 A1* | 6/2009 | Straubel ............. B60L 11/1875 180/65.1 |
| 2009/0148019 A1 | 6/2009 | Hamada et al. |
| 2009/0213110 A1 | 8/2009 | Kato et al. |
| 2009/0215479 A1 | 8/2009 | Karmarkar |
| 2009/0227287 A1 | 9/2009 | Kotidis |
| 2009/0238238 A1 | 9/2009 | Hollander et al. |
| 2009/0278048 A1 | 11/2009 | Choe et al. |
| 2009/0297062 A1 | 12/2009 | Molne et al. |
| 2010/0066866 A1 | 3/2010 | Lim |
| 2010/0080487 A1* | 4/2010 | Yitzhaky ................ G06T 5/003 382/266 |
| 2010/0090965 A1 | 4/2010 | Birkler |
| 2010/0090983 A1 | 4/2010 | Challener et al. |
| 2010/0103141 A1 | 4/2010 | Challener et al. |
| 2010/0113068 A1 | 5/2010 | Rothschild |
| 2010/0131268 A1 | 5/2010 | Moeller |
| 2010/0144387 A1 | 6/2010 | Chou |
| 2010/0156632 A1* | 6/2010 | Hyland .................. G08B 25/08 340/540 |
| 2010/0163730 A1 | 7/2010 | Schmidt et al. |
| 2010/0234067 A1 | 9/2010 | Silverbrook et al. |
| 2010/0245582 A1 | 9/2010 | Harel |
| 2010/0245585 A1 | 9/2010 | Fisher et al. |
| 2010/0245826 A1 | 9/2010 | Lee |
| 2010/0314543 A1 | 12/2010 | Lee et al. |
| 2011/0043486 A1 | 2/2011 | Hagiwara et al. |
| 2011/0063446 A1 | 3/2011 | McMordie et al. |
| 2011/0074346 A1* | 3/2011 | Hall ......................... B60L 3/00 320/108 |
| 2011/0102599 A1 | 5/2011 | Kwon et al. |
| 2011/0117532 A1 | 5/2011 | Relyea et al. |
| 2011/0121978 A1 | 5/2011 | Schwörer et al. |
| 2011/0122075 A1 | 5/2011 | Seo et al. |
| 2011/0128384 A1 | 6/2011 | Tiscareno et al. |
| 2011/0225327 A1* | 9/2011 | Tom ........................ G06F 13/10 710/58 |
| 2011/0268149 A1 | 11/2011 | Chillar et al. |
| 2012/0007987 A1 | 1/2012 | Gaber |
| 2012/0083314 A1 | 4/2012 | Ng et al. |
| 2012/0184252 A1 | 7/2012 | Hirsch |
| 2012/0200698 A1 | 8/2012 | Baleine et al. |
| 2012/0273688 A1 | 11/2012 | Tsai et al. |
| 2012/0274814 A1 | 11/2012 | Wajs |
| 2012/0276954 A1 | 11/2012 | Kowalsky |
| 2012/0292518 A1 | 11/2012 | Goldstein |
| 2012/0320086 A1 | 12/2012 | Kasama et al. |
| 2013/0204570 A1 | 8/2013 | Mendelson et al. |
| 2013/0320220 A1 | 12/2013 | Donowsky |
| 2015/0006018 A1* | 1/2015 | Tesanovic ............ G07C 5/0808 701/29.6 |

FOREIGN PATENT DOCUMENTS

| | | |
|---|---|---|
| CN | 2899321 | 5/2007 |
| CN | 201203922 | 3/2009 |
| CN | 101635754 | 1/2010 |
| CN | 201481406 | 5/2010 |
| CN | 201550169 | 8/2010 |
| CN | 101859209 | 10/2010 |
| CN | 201628839 | 11/2010 |
| CN | 101945154 | 1/2011 |
| CN | 102045423 | 5/2011 |
| CN | 102045448 | 5/2011 |
| CN | 102055836 | 5/2011 |
| CN | 201869255 | 6/2011 |
| CN | 201897853 | 7/2011 |
| CN | 102178510 | 9/2011 |
| CN | 202261481 | 5/2012 |
| CN | 102880289 | 1/2013 |
| CN | 202998279 | 6/2013 |
| DE | 102006057431 | 6/2008 |
| EP | 1134565 | 9/2001 |
| EP | 2415975 | 2/2012 |
| EP | 2477391 | 7/2012 |
| EP | 2495674 | 9/2012 |
| JP | 1997275518 | 4/1999 |
| JP | 2004048571 | 2/2004 |

(56) References Cited

FOREIGN PATENT DOCUMENTS

| | | |
|---|---|---|
| JP | 2006098098 | 4/2006 |
| JP | 2006106655 | 4/2006 |
| JP | 2007006475 | 1/2007 |
| JP | 2007325842 | 12/2007 |
| JP | 2010181324 | 8/2010 |
| JP | 2012231309 | 11/2012 |
| KR | 20000026757 | 5/2000 |
| KR | 100227582 | 11/2000 |
| KR | 100272582 | 11/2000 |
| KR | 20000073381 | 12/2000 |
| KR | 100285817 | 1/2001 |
| KR | 20010001341 | 1/2001 |
| KR | 20010002462 | 1/2001 |
| KR | 20010010010 | 2/2001 |
| KR | 20010014992 | 2/2001 |
| KR | 20010044756 | 6/2001 |
| KR | 20010050263 | 6/2001 |
| KR | 20010060752 | 7/2001 |
| KR | 20010068202 | 7/2001 |
| KR | 20010070355 | 7/2001 |
| KR | 20010074565 | 8/2001 |
| KR | 20020006967 | 1/2002 |
| KR | 20020044339 | 6/2002 |
| KR | 20020049605 | 6/2002 |
| KR | 20060071220 | 6/2002 |
| KR | 20020061406 | 7/2002 |
| KR | 20020061920 | 7/2002 |
| KR | 20020069690 | 9/2002 |
| KR | 20020078469 | 10/2002 |
| KR | 20020083368 | 11/2002 |
| KR | 20020083961 | 11/2002 |
| KR | 20020085124 | 11/2002 |
| KR | 20020085490 | 11/2002 |
| KR | 20020095752 | 12/2002 |
| KR | 20030000332 | 1/2003 |
| KR | 20030007030 | 1/2003 |
| KR | 20030012444 | 2/2003 |
| KR | 20030016607 | 3/2003 |
| KR | 20030024545 | 3/2003 |
| KR | 20030037101 | 5/2003 |
| KR | 20030051140 | 6/2003 |
| KR | 20030055693 | 7/2003 |
| KR | 20030056667 | 7/2003 |
| KR | 20030067116 | 8/2003 |
| KR | 20030085742 | 11/2003 |
| KR | 20030088968 | 11/2003 |
| KR | 20040001684 | 1/2004 |
| KR | 20040001686 | 1/2004 |
| KR | 20040023826 | 3/2004 |
| KR | 20040027692 | 4/2004 |
| KR | 20040033223 | 4/2004 |
| KR | 20040033532 | 4/2004 |
| KR | 20040033986 | 4/2004 |
| KR | 20040033993 | 4/2004 |
| KR | 20040039868 | 5/2004 |
| KR | 20040040296 | 5/2004 |
| KR | 20040042475 | 5/2004 |
| KR | 20040044624 | 5/2004 |
| KR | 100437890 | 6/2004 |
| KR | 20040054416 | 6/2004 |
| KR | 20040058969 | 7/2004 |
| KR | 20040062802 | 7/2004 |
| KR | 20040064855 | 7/2004 |
| KR | 20040066724 | 7/2004 |
| KR | 20040068864 | 8/2004 |
| KR | 20040070840 | 8/2004 |
| KR | 20040076308 | 9/2004 |
| KR | 20040086994 | 10/2004 |
| KR | 20040102386 | 12/2004 |
| KR | 20050008245 | 1/2005 |
| KR | 20050011313 | 1/2005 |
| KR | 20050012505 | 2/2005 |
| KR | 20050014448 | 2/2005 |
| KR | 20050015293 | 2/2005 |
| KR | 20050015526 | 2/2005 |
| KR | 20050015745 | 2/2005 |
| KR | 20050018370 | 2/2005 |
| KR | 20050023950 | 3/2005 |
| KR | 20050028537 | 3/2005 |
| KR | 20050033308 | 4/2005 |
| KR | 101006660 | 9/2005 |
| KR | 1020050095463 | 9/2005 |
| KR | 100547739 | 1/2006 |
| KR | 20060023957 | 3/2006 |
| KR | 1020060019715 | 3/2006 |
| KR | 100645746 | 5/2006 |
| KR | 20060054877 | 5/2006 |
| KR | 100612890 | 8/2006 |
| KR | 100633792 | 10/2006 |
| KR | 100646966 | 11/2006 |
| KR | 20060119077 | 11/2006 |
| KR | 20060119236 | 11/2006 |
| KR | 20060120318 | 11/2006 |
| KR | 20060121595 | 11/2006 |
| KR | 100660125 | 12/2006 |
| KR | 100663528 | 1/2007 |
| KR | 100672377 | 1/2007 |
| KR | 20070002590 | 1/2007 |
| KR | 20070005263 | 1/2007 |
| KR | 20070005553 | 1/2007 |
| KR | 20070009380 | 1/2007 |
| KR | 100677913 | 2/2007 |
| KR | 100689465 | 3/2007 |
| KR | 20070028201 | 3/2007 |
| KR | 100722974 | 5/2007 |
| KR | 100729813 | 6/2007 |
| KR | 20070067650 | 6/2007 |
| KR | 100743171 | 7/2007 |
| KR | 100743254 | 7/2007 |
| KR | 20070068501 | 7/2007 |
| KR | 20070078477 | 8/2007 |
| KR | 20070082960 | 8/2007 |
| KR | 20070087513 | 8/2007 |
| KR | 20070091486 | 9/2007 |
| KR | 100766953 | 10/2007 |
| KR | 100771364 | 10/2007 |
| KR | 20070104957 | 10/2007 |
| KR | 100777428 | 11/2007 |
| KR | 20070115754 | 12/2007 |
| KR | 20070122344 | 12/2007 |
| KR | 20070122345 | 12/2007 |
| KR | 100802525 | 2/2008 |
| KR | 20080013314 | 2/2008 |
| KR | 20080015099 | 2/2008 |
| KR | 20080015100 | 2/2008 |
| KR | 20080015973 | 2/2008 |
| KR | 20080018407 | 2/2008 |
| KR | 100822053 | 4/2008 |
| KR | 20080045551 | 5/2008 |
| KR | 100841243 | 6/2008 |
| KR | 20080053057 | 6/2008 |
| KR | 20080054596 | 6/2008 |
| KR | 100846192 | 7/2008 |
| KR | 20080059882 | 7/2008 |
| KR | 20080069007 | 7/2008 |
| KR | 100854932 | 8/2008 |
| KR | 20080071070 | 8/2008 |
| KR | 20080078315 | 8/2008 |
| KR | 100866177 | 10/2008 |
| KR | 100866475 | 11/2008 |
| KR | 100866476 | 11/2008 |
| KR | 100866573 | 11/2008 |
| KR | 100870724 | 11/2008 |
| KR | 20080096918 | 11/2008 |
| KR | 20080098409 | 11/2008 |
| KR | 100871916 | 12/2008 |
| KR | 20080112331 | 12/2008 |
| KR | 20090003899 | 1/2009 |
| KR | 20090018486 | 2/2009 |
| KR | 20090020864 | 2/2009 |
| KR | 100888554 | 3/2009 |
| KR | 20090036734 | 4/2009 |
| KR | 100897170 | 5/2009 |
| KR | 20090052526 | 5/2009 |

(56) References Cited

FOREIGN PATENT DOCUMENTS

| | | |
|---|---|---|
| KR | 100901784 | 6/2009 |
| KR | 100903348 | 6/2009 |
| KR | 20090089931 | 8/2009 |
| KR | 100922497 | 10/2009 |
| KR | 20090105424 | 10/2009 |
| KR | 100932752 | 12/2009 |
| KR | 100935495 | 1/2010 |
| KR | 20100006652 | 1/2010 |
| KR | 2010022327 | 3/2010 |
| KR | 20100039170 | 4/2010 |
| KR | 100958030 | 5/2010 |
| KR | 20100059681 | 6/2010 |
| KR | 20100070116 | 6/2010 |
| KR | 20100070119 | 6/2010 |
| KR | 20100072994 | 7/2010 |
| KR | 100977516 | 8/2010 |
| KR | 2010091758 | 8/2010 |
| KR | 20100089125 | 8/2010 |
| KR | 20100090521 | 8/2010 |
| KR | 20100091758 | 8/2010 |
| KR | 20100098958 | 9/2010 |
| KR | 100985816 | 10/2010 |
| KR | 100990904 | 11/2010 |
| KR | 20100123021 | 11/2010 |
| KR | 1006660 | 1/2011 |
| KR | 20110006437 | 1/2011 |
| KR | 20110011264 | 2/2011 |
| KR | 2011019994 | 3/2011 |
| KR | 2011024290 | 3/2011 |
| KR | 101111167 | 4/2011 |
| KR | 1111167 | 2/2012 |
| KR | 1020130142810 | 12/2013 |
| TW | 201116030 | 5/2011 |
| WO | WO 03/093963 | 11/2003 |
| WO | WO 2005/002228 | 1/2005 |
| WO | WO 2005/088846 | 9/2005 |
| WO | WO 2006/112866 | 10/2006 |
| WO | WO 2007/006242 | 1/2007 |
| WO | WO 2009/122114 | 10/2009 |
| WO | WO 2010/005152 | 1/2010 |
| WO | WO 2010/033142 | 3/2010 |
| WO | WO 2012/087716 | 6/2012 |
| WO | WO 2014/043592 | 3/2014 |
| WO | WO 2014/082097 | 5/2014 |

OTHER PUBLICATIONS

Mendonca et al, Development of a reduced-Model Laboratory for Testing Predictive Fault System in Internal Combustion Engines, 2015.*

Wang et al, Equipment monitoring for temperature related failures using thermography cameras, 2015.*

Darpa, "Broad Agency Announcement Low Cost Thermal Imager Manufacturing (LCTI-M)", Microsystems Technology Office, DARPA-BAA-11-27, Jan. 24, 2011. pp. 1-42, Arlington, VA.

* cited by examiner

SYSTEMS AND METHODS FOR MONITORING POWER SYSTEMS

CROSS-REFERENCE TO RELATED APPLICATIONS

This application claims the benefit of U.S. Provisional Patent Application No. 61/745,373 filed Dec. 21, 2012 and entitled "SYSTEMS AND METHODS FOR MONITORING POWER SYSTEMS" which is hereby incorporated by reference in its entirety.

This application is a continuation-in-part of U.S. patent application Ser. No. 14/101,245 filed Dec. 9, 2013 and entitled "LOW POWER AND SMALL FORM FACTOR INFRARED IMAGING" which is hereby incorporated by reference in its entirety.

U.S. patent application Ser. No. 14/101,245 is a continuation of International Patent Application No. PCT/US2012/041744 filed Jun. 8, 2012 and entitled "LOW POWER AND SMALL FORM FACTOR INFRARED IMAGING" which is hereby incorporated by reference in its entirety.

International Patent Application No. PCT/US2012/041744 claims the benefit of U.S. Provisional Patent Application No. 61/656,889 filed Jun. 7, 2012 and entitled "LOW POWER AND SMALL FORM FACTOR INFRARED IMAGING" which is hereby incorporated by reference in its entirety.

International Patent Application No. PCT/US2012/041744 claims the benefit of U.S. Provisional Patent Application No. 61/545,056 filed Oct. 7, 2011 and entitled "NON-UNIFORMITY CORRECTION TECHNIQUES FOR INFRARED IMAGING DEVICES" which is hereby incorporated by reference in its entirety.

International Patent Application No. PCT/US2012/041744 claims the benefit of U.S. Provisional Patent Application No. 61/495,873 filed Jun. 10, 2011 and entitled "INFRARED CAMERA PACKAGING SYSTEMS AND METHODS" which is hereby incorporated by reference in its entirety.

International Patent Application No. PCT/US2012/041744 claims the benefit of U.S. Provisional Patent Application No. 61/495,879 filed Jun. 10, 2011 and entitled "INFRARED CAMERA SYSTEM ARCHITECTURES" which is hereby incorporated by reference in its entirety.

International Patent Application No. PCT/US2012/041744 claims the benefit of U.S. Provisional Patent Application No. 61/495,888 filed Jun. 10, 2011 and entitled "INFRARED CAMERA CALIBRATION TECHNIQUES" which is hereby incorporated by reference in its entirety.

This application is a continuation-in-part of U.S. patent application Ser. No. 14/099,818 filed Dec. 6, 2013 and entitled "NON-UNIFORMITY CORRECTION TECHNIQUES FOR INFRARED IMAGING DEVICES" which is hereby incorporated by reference in its entirety.

U.S. patent application Ser. No. 14/099,818 is a continuation of International Patent Application No. PCT/US2012/041749 filed Jun. 8, 2012 and entitled "NON-UNIFORMITY CORRECTION TECHNIQUES FOR INFRARED IMAGING DEVICES" which is hereby incorporated by reference in its entirety.

International Patent Application No. PCT/US2012/041749 claims the benefit of U.S. Provisional Patent Application No. 61/545,056 filed Oct. 7, 2011 and entitled "NON-UNIFORMITY CORRECTION TECHNIQUES FOR INFRARED IMAGING DEVICES" which is hereby incorporated by reference in its entirety.

International Patent Application No. PCT/US2012/041749 claims the benefit of U.S. Provisional Patent Application No. 61/495,873 filed Jun. 10, 2011 and entitled "INFRARED CAMERA PACKAGING SYSTEMS AND METHODS" which is hereby incorporated by reference in its entirety.

International Patent Application No. PCT/US2012/041749 claims the benefit of U.S. Provisional Patent Application No. 61/495,879 filed Jun. 10, 2011 and entitled "INFRARED CAMERA SYSTEM ARCHITECTURES" which is hereby incorporated by reference in its entirety.

International Patent Application No. PCT/US2012/041749 claims the benefit of U.S. Provisional Patent Application No. 61/495,888 filed Jun. 10, 2011 and entitled "INFRARED CAMERA CALIBRATION TECHNIQUES" which is hereby incorporated by reference in its entirety.

This application is a continuation-in-part of U.S. patent application Ser. No. 14/101,258 filed Dec. 9, 2013 and entitled "INFRARED CAMERA SYSTEM ARCHITECTURES" which is hereby incorporated by reference in its entirety.

U.S. patent application Ser. No. 14/101,258 is a continuation of International Patent Application No. PCT/US2012/041739 filed Jun. 8, 2012 and entitled "INFRARED CAMERA SYSTEM ARCHITECTURES" which is hereby incorporated by reference in its entirety.

International Patent Application No. PCT/US2012/041739 claims the benefit of U.S. Provisional Patent Application No. 61/495,873 filed Jun. 10, 2011 and entitled "INFRARED CAMERA PACKAGING SYSTEMS AND METHODS" which is hereby incorporated by reference in its entirety.

International Patent Application No. PCT/US2012/041739 claims the benefit of U.S. Provisional Patent Application No. 61/495,879 filed Jun. 10, 2011 and entitled "INFRARED CAMERA SYSTEM ARCHITECTURES" which is hereby incorporated by reference in its entirety.

International Patent Application No. PCT/US2012/041739 claims the benefit of U.S. Provisional Patent Application No. 61/495,888 filed Jun. 10, 2011 and entitled "INFRARED CAMERA CALIBRATION TECHNIQUES" which is hereby incorporated by reference in its entirety.

This patent application is a continuation-in-part of U.S. patent application Ser. No. 13/437,645 filed Apr. 2, 2012 and entitled "INFRARED RESOLUTION AND CONTRAST ENHANCEMENT WITH FUSION" which is hereby incorporated by reference in its entirety.

U.S. patent application Ser. No. 13/437,645 is a continuation-in-part of U.S. patent application Ser. No. 13/105,765 filed May 11, 2011 and entitled "INFRARED RESOLUTION AND CONTRAST ENHANCEMENT WITH FUSION" which is hereby incorporated by reference in its entirety.

U.S. patent application Ser. No. 13/437,645 also claims the benefit of U.S. Provisional Patent Application No. 61/473,207 filed Apr. 8, 2011 and entitled "INFRARED RESOLUTION AND CONTRAST ENHANCEMENT WITH FUSION" which is hereby incorporated by reference in its entirety.

U.S. patent application Ser. No. 13/437,645 is also a continuation-in-part of U.S. patent application Ser. No. 12/766,739 filed Apr. 23, 2010 and entitled "INFRARED RESOLUTION AND CONTRAST ENHANCEMENT WITH FUSION" which is hereby incorporated by reference in its entirety.

U.S. patent application Ser. No. 13/105,765 is a continuation of International Patent Application No. PCT/EP2011/

056432 filed Apr. 21, 2011 and entitled "INFRARED RESOLUTION AND CONTRAST ENHANCEMENT WITH FUSION" which is hereby incorporated by reference in its entirety.

U.S. patent application Ser. No. 13/105,765 is also a continuation-in-part of U.S. patent application Ser. No. 12/766,739 which is hereby incorporated by reference in its entirety.

International Patent Application No. PCT/EP2011/056432 is a continuation-in-part of U.S. patent application Ser. No. 12/766,739 which is hereby incorporated by reference in its entirety.

International Patent Application No. PCT/EP2011/056432 also claims the benefit of U.S. Provisional Patent Application No. 61/473,207 which is hereby incorporated by reference in its entirety.

This application claims the benefit of U.S. Provisional Patent Application No. 61/748,018 filed Dec. 31, 2012 and entitled "COMPACT MULTI-SPECTRUM IMAGING WITH FUSION" which is hereby incorporated by reference in its entirety.

This application is a continuation-in-part of U.S. patent application Ser. No. 12/477,828 filed Jun. 3, 2009 and entitled "INFRARED CAMERA SYSTEMS AND METHODS FOR DUAL SENSOR APPLICATIONS" which is hereby incorporated by reference in its entirety.

This application claims the benefit of U.S. Provisional Patent Application No. 61/792,582 filed Mar. 15, 2013 and entitled "TIME SPACED INFRARED IMAGE ENHANCEMENT" which is hereby incorporated by reference in its entirety.

This application claims the benefit of U.S. Provisional Patent Application No. 61/793,952 filed Mar. 15, 2013 and entitled "INFRARED IMAGING ENHANCEMENT WITH FUSION" which is hereby incorporated by reference in its entirety.

This application claims the benefit of U.S. Provisional Patent Application No. 61/746,069 filed Dec. 26, 2012 and entitled "TIME SPACED INFRARED IMAGE ENHANCEMENT" which is hereby incorporated by reference in its entirety.

This application claims the benefit of U.S. Provisional Patent Application No. 61/746,074 filed Dec. 26, 2012 and entitled "INFRARED IMAGING ENHANCEMENT WITH FUSION" which is hereby incorporated by reference in its entirety.

TECHNICAL FIELD

One or more embodiments of the invention relate generally to thermal imaging devices and more particularly, for example, to the use of thermal imaging to monitor and control power systems.

BACKGROUND

Almost all modern technology relies on or is directly supported by electrical and mechanical power systems. Electrical power systems generate, store, and distribute the electricity that powers the huge variety of electronics used every day. Mechanical power systems leverage their mechanical advantage for everything from transportation to lawn care, and they form the foundation for almost all types of construction.

Conventional sensors used to monitor operation of such power systems are often difficult and expensive to install due to a need for their active sensor surface to be in intimate physical contact solely with the object being monitored. Such conventional sensors are also often relatively fragile and prone to wear and tear due in part to their forced proximity to the object being monitored. Furthermore, conventional thermal imaging sensors typically provide sensor data that is from a single point (e.g. spot sensors) and/or that is imprecise or time-delayed so as to preclude cost-effective, accurate and/or real-time monitoring of a modern power system.

SUMMARY

Techniques are disclosed for systems and methods using small form factor infrared imaging modules to monitor aspects of power systems. In one embodiment, a monitoring system may include one or more infrared imaging modules, a processor, a memory, a display, a communication module, and modules to control components of a power system. Infrared imaging modules may be positioned in proximity to, mounted on, installed in, or otherwise integrated with a power system having one or more power system components. The infrared imaging modules may be configured to capture thermal images of portions of the power system. Various thermal image analytics and profiling may be performed on the captured thermal images to determine the operating conditions and temperatures of portions of the power system. Monitoring information may be generated based on the detected conditions and temperatures and then presented to a user and/or used to control the power system.

In another embodiment, a system includes an infrared imaging module positioned to view at least a portion of a component of a power system, where the infrared imaging module includes a focal plane array (FPA) configured to capture a thermal image of the portion of the component; and a processor in communication with the thermal imaging module and configured to process the thermal image to generate monitoring information associated with the power system.

In a further embodiment, a method includes capturing, at a focal plane array (FPA) of an infrared imaging module, a thermal image of at least a portion of a component of a power system, where the infrared imaging module is positioned to view the portion of the component; and processing the thermal image to generate monitoring information associated with the power system.

The scope of the invention is defined by the claims, which are incorporated into this section by reference. A more complete understanding of embodiments of the invention will be afforded to those skilled in the art, as well as a realization of additional advantages thereof, by a consideration of the following detailed description of one or more embodiments. Reference will be made to the appended sheets of drawings that will first be described briefly.

BRIEF DESCRIPTION OF THE DRAWINGS

Embodiments of the invention and their advantages are best understood by referring to the detailed description that follows. It should be appreciated that like reference numerals are used to identify like elements illustrated in one or more of the figures.

DETAILED DESCRIPTION

Figure 1:
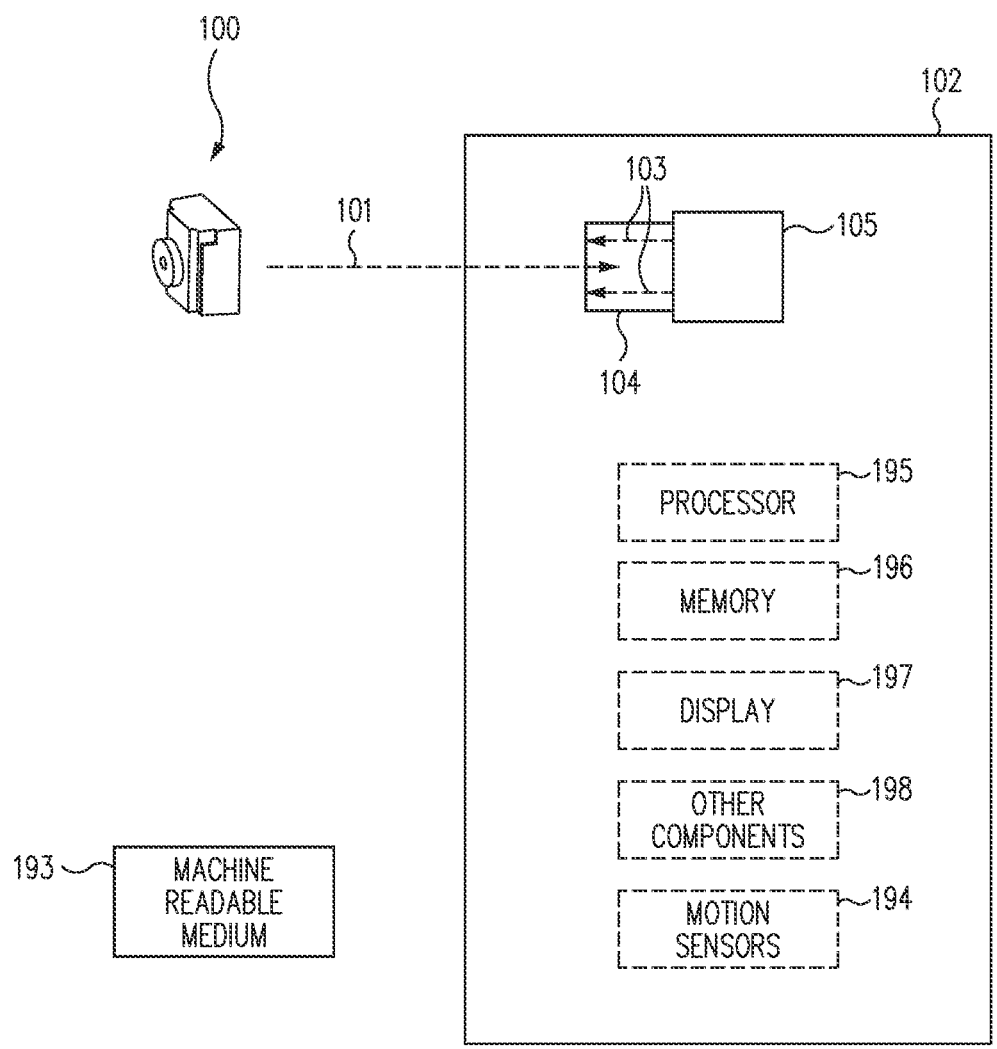
FIG. 1 illustrates an infrared imaging module configured to be implemented in a host device in accordance with an embodiment of the disclosure.

FIG. 1 illustrates an infrared imaging module 100 (e.g., an infrared camera or an infrared imaging device) configured to be implemented in a host device 102 in accordance with an embodiment of the disclosure. Infrared imaging module 100 may be implemented, for one or more embodiments, with a small form factor and in accordance with wafer level packaging techniques or other packaging techniques.

In one embodiment, infrared imaging module 100 may be configured to be implemented in a small portable host device 102, such as a mobile telephone, a tablet computing device, a laptop computing device, a personal digital assistant, a visible light camera, a music player, or any other appropriate mobile device. In this regard, infrared imaging module 100 may be used to provide infrared imaging features to host device 102. For example, infrared imaging module 100 may be configured to capture, process, and/or otherwise manage infrared images and provide such infrared images to host device 102 for use in any desired fashion (e.g., for further processing, to store in memory, to display, to use by various applications running on host device 102, to export to other devices, or other uses).

In various embodiments, infrared imaging module 100 may be configured to operate at low voltage levels and over a wide temperature range. For example, in one embodiment, infrared imaging module 100 may operate using a power supply of approximately 2.4 volts, 2.5 volts, 2.8 volts, or lower voltages, and operate over a temperature range of approximately −20 degrees C. to approximately +60 degrees C. (e.g., providing a suitable dynamic range and performance over an environmental temperature range of approximately 80 degrees C.). In one embodiment, by operating infrared imaging module 100 at low voltage levels, infrared imaging module 100 may experience reduced amounts of self heating in comparison with other types of infrared imaging devices. As a result, infrared imaging module 100 may be operated with reduced measures to compensate for such self heating.

Figure 2:
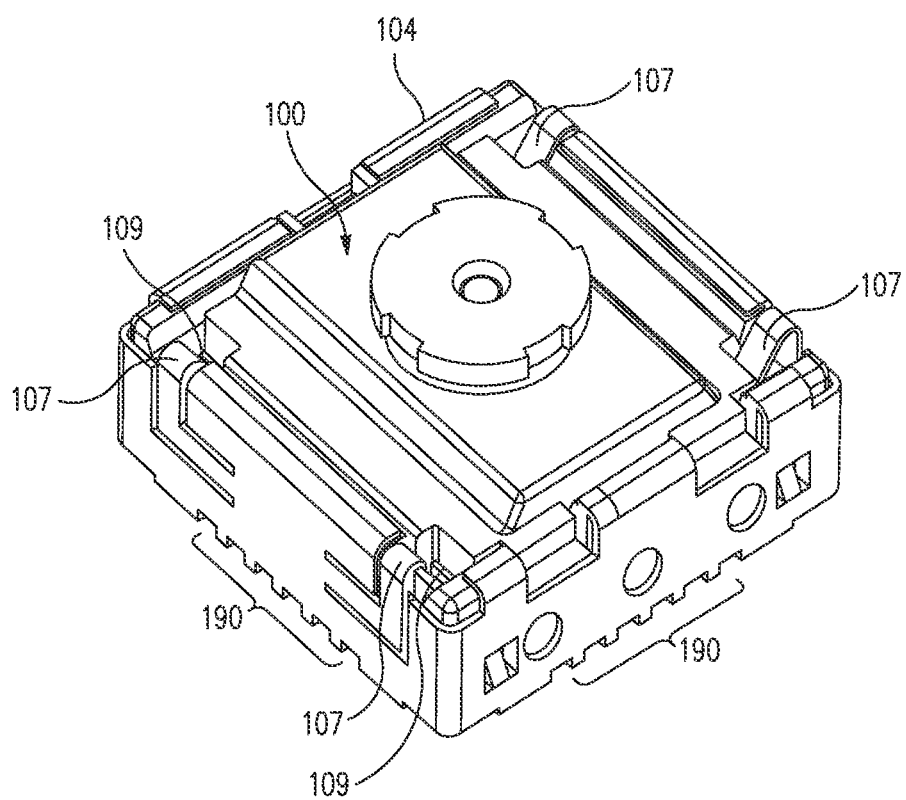
FIG. 2 illustrates an assembled infrared imaging module in accordance with an embodiment of the disclosure.

As shown in FIG. 1, host device 102 may include a socket 104, a shutter 105, motion sensors 194, a processor 195, a memory 196, a display 197, and/or other components 198. Socket 104 may be configured to receive infrared imaging module 100 as identified by arrow 101. In this regard, FIG. 2 illustrates infrared imaging module 100 assembled in socket 104 in accordance with an embodiment of the disclosure.

Motion sensors 194 may be implemented by one or more accelerometers, gyroscopes, or other appropriate devices that may be used to detect movement of host device 102. Motion sensors 194 may be monitored by and provide information to processing module 160 or processor 195 to detect motion. In various embodiments, motion sensors 194 may be implemented as part of host device 102 (as shown in FIG. 1), infrared imaging module 100, or other devices attached to or otherwise interfaced with host device 102.

Processor 195 may be implemented as any appropriate processing device (e.g., logic device, microcontroller, processor, application specific integrated circuit (ASIC), or other device) that may be used by host device 102 to execute appropriate instructions, such as software instructions provided in memory 196. Display 197 may be used to display captured and/or processed infrared images and/or other images, data, and information. Other components 198 may be used to implement any features of host device 102 as may be desired for various applications (e.g., clocks, temperature sensors, a visible light camera, or other components). In addition, a machine readable medium 193 may be provided for storing non-transitory instructions for loading into memory 196 and execution by processor 195.

In various embodiments, infrared imaging module 100 and socket 104 may be implemented for mass production to facilitate high volume applications, such as for implementation in mobile telephones or other devices (e.g., requiring small form factors). In one embodiment, the combination of infrared imaging module 100 and socket 104 may exhibit overall dimensions of approximately 8.5 mm by 8.5 mm by 5.9 mm while infrared imaging module 100 is installed in socket 104.

Figure 3:
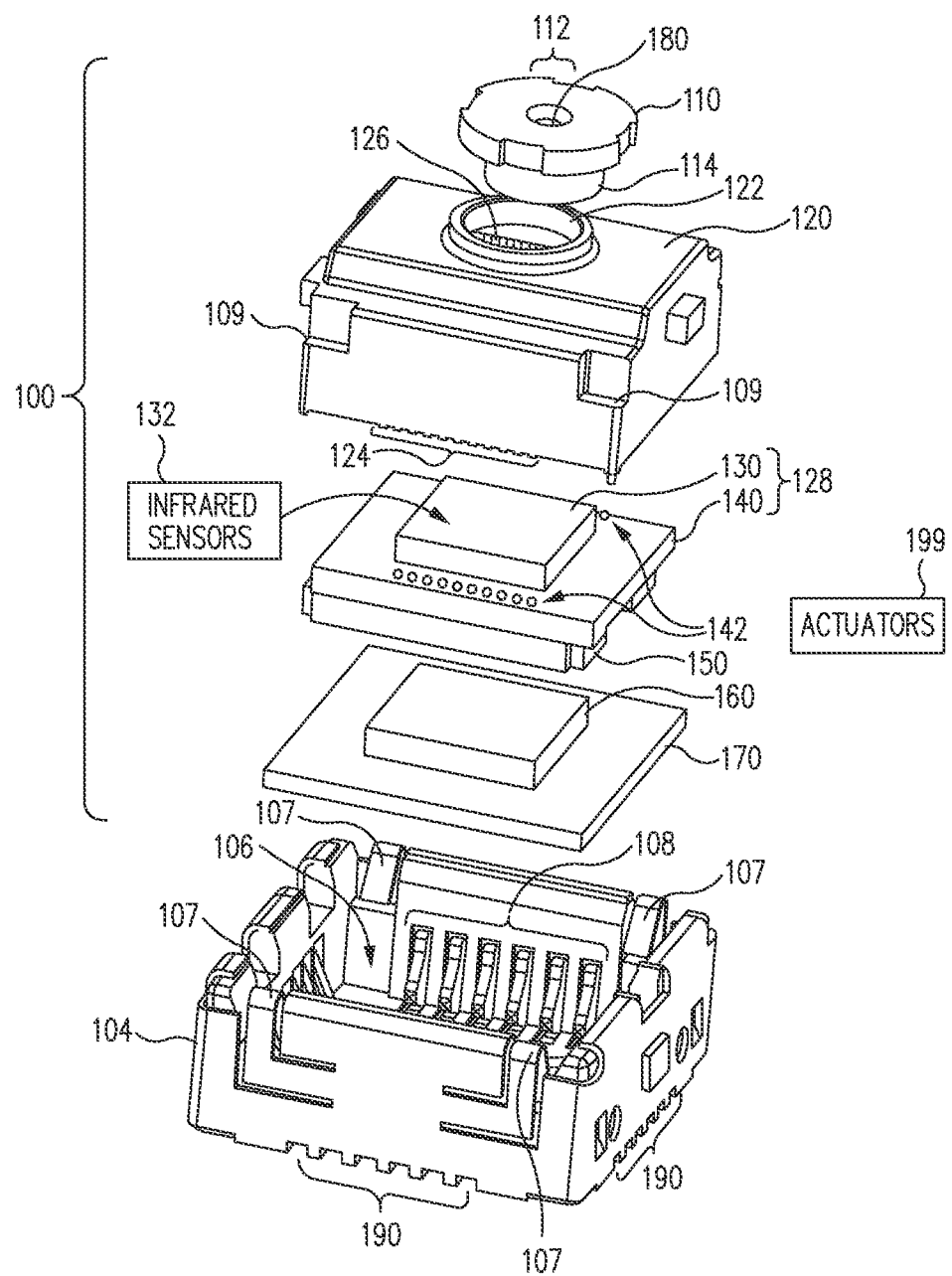
FIG. 3 illustrates an exploded view of an infrared imaging module juxtaposed over a socket in accordance with an embodiment of the disclosure.

FIG. 3 illustrates an exploded view of infrared imaging module 100 juxtaposed over socket 104 in accordance with an embodiment of the disclosure. Infrared imaging module 100 may include a lens barrel 110, a housing 120, an infrared sensor assembly 128, a circuit board 170, a base 150, and a processing module 160.

Lens barrel 110 may at least partially enclose an optical element 180 (e.g., a lens) which is partially visible in FIG.

3 through an aperture 112 in lens barrel 110. Lens barrel 110 may include a substantially cylindrical extension 114 which may be used to interface lens barrel 110 with an aperture 122 in housing 120.

Infrared sensor assembly 128 may be implemented, for example, with a cap 130 (e.g., a lid) mounted on a substrate 140. Infrared sensor assembly 128 may include a plurality of infrared sensors 132 (e.g., infrared detectors) implemented in an array or other fashion on substrate 140 and covered by cap 130. For example, in one embodiment, infrared sensor assembly 128 may be implemented as a focal plane array (FPA). Such a focal plane array may be implemented, for example, as a vacuum package assembly (e.g., sealed by cap 130 and substrate 140). In one embodiment, infrared sensor assembly 128 may be implemented as a wafer level package (e.g., infrared sensor assembly 128 may be singulated from a set of vacuum package assemblies provided on a wafer). In one embodiment, infrared sensor assembly 128 may be implemented to operate using a power supply of approximately 2.4 volts, 2.5 volts, 2.8 volts, or similar voltages.

Infrared sensors 132 may be configured to detect infrared radiation (e.g., infrared energy) from a target scene including, for example, mid wave infrared wave bands (MWIR), long wave infrared wave bands (LWIR), and/or other thermal imaging bands as may be desired in particular implementations. In one embodiment, infrared sensor assembly 128 may be provided in accordance with wafer level packaging techniques.

Infrared sensors 132 may be implemented, for example, as microbolometers or other types of thermal imaging infrared sensors arranged in any desired array pattern to provide a plurality of pixels. In one embodiment, infrared sensors 132 may be implemented as vanadium oxide (VOx) detectors with a 17 μm pixel pitch. In various embodiments, arrays of approximately 32 by 32 infrared sensors 132, approximately 64 by 64 infrared sensors 132, approximately 80 by 64 infrared sensors 132, or other array sizes may be used.

Substrate 140 may include various circuitry including, for example, a read out integrated circuit (ROIC) with dimensions less than approximately 5.5 mm by 5.5 mm in one embodiment. Substrate 140 may also include bond pads 142 that may be used to contact complementary connections positioned on inside surfaces of housing 120 when infrared imaging module 100 is assembled as shown in FIG. 3. In one embodiment, the ROIC may be implemented with low-dropout regulators (LDO) to perform voltage regulation to reduce power supply noise introduced to infrared sensor assembly 128 and thus provide an improved power supply rejection ratio (PSRR). Moreover, by implementing the LDO with the ROIC (e.g., within a wafer level package), less die area may be consumed and fewer discrete die (or chips) are needed.

Figure 4:
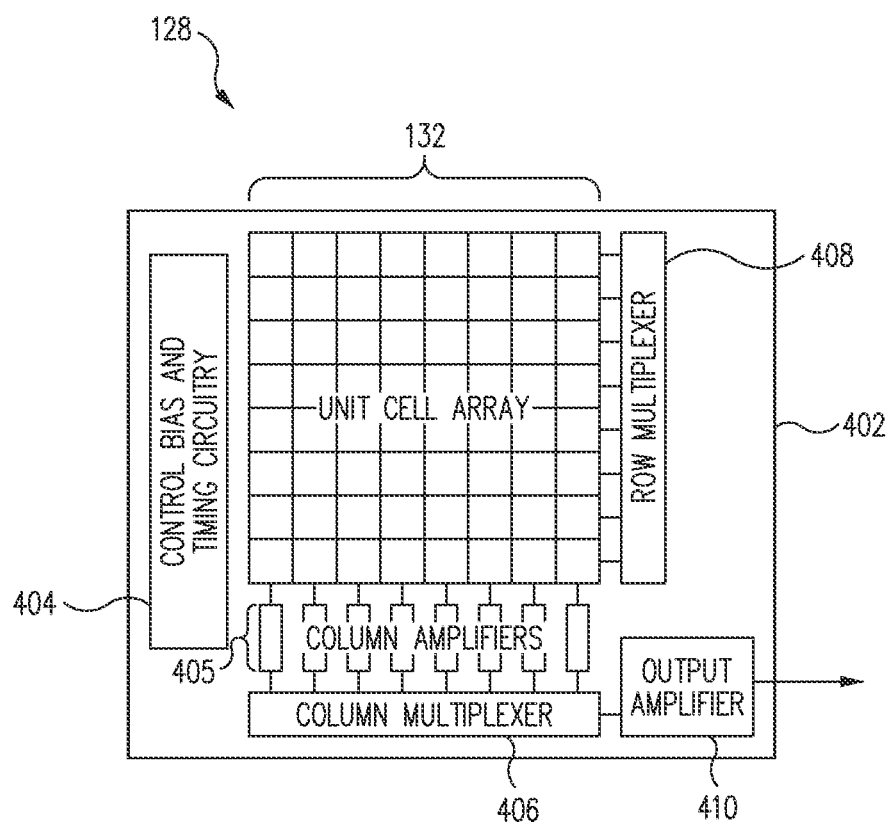
FIG. 4 illustrates a block diagram of an infrared sensor assembly including an array of infrared sensors in accordance with an embodiment of the disclosure.

FIG. 4 illustrates a block diagram of infrared sensor assembly 128 including an array of infrared sensors 132 in accordance with an embodiment of the disclosure. In the illustrated embodiment, infrared sensors 132 are provided as part of a unit cell array of a ROIC 402. ROIC 402 includes bias generation and timing control circuitry 404, column amplifiers 405, a column multiplexer 406, a row multiplexer 408, and an output amplifier 410. Image frames (e.g., thermal images) captured by infrared sensors 132 may be provided by output amplifier 410 to processing module 160, processor 195, and/or any other appropriate components to perform various processing techniques described herein. Although an 8 by 8 array is shown in FIG. 4, any desired array configuration may be used in other embodiments.

Further descriptions of ROICs and infrared sensors (e.g., microbolometer circuits) may be found in U.S. Pat. No. 6,028,309 issued Feb. 22, 2000, which is incorporated herein by reference in its entirety.

Infrared sensor assembly 128 may capture images (e.g., image frames) and provide such images from its ROIC at various rates. Processing module 160 may be used to perform appropriate processing of captured infrared images and may be implemented in accordance with any appropriate architecture. In one embodiment, processing module 160 may be implemented as an ASIC. In this regard, such an ASIC may be configured to perform image processing with high performance and/or high efficiency. In another embodiment, processing module 160 may be implemented with a general purpose central processing unit (CPU) which may be configured to execute appropriate software instructions to perform image processing, coordinate and perform image processing with various image processing blocks, coordinate interfacing between processing module 160 and host device 102, and/or other operations. In yet another embodiment, processing module 160 may be implemented with a field programmable gate array (FPGA). Processing module 160 may be implemented with other types of processing and/or logic circuits in other embodiments as would be understood by one skilled in the art.

In these and other embodiments, processing module 160 may also be implemented with other components where appropriate, such as, volatile memory, non-volatile memory, and/or one or more interfaces (e.g., infrared detector interfaces, inter-integrated circuit (I2C) interfaces, mobile industry processor interfaces (MIPI), joint test action group (JTAG) interfaces (e.g., IEEE 1149.1 standard test access port and boundary-scan architecture), and/or other interfaces).

In some embodiments, infrared imaging module 100 may further include one or more actuators 199 which may be used to adjust the focus of infrared image frames captured by infrared sensor assembly 128. For example, actuators 199 may be used to move optical element 180, infrared sensors 132, and/or other components relative to each other to selectively focus and defocus infrared image frames in accordance with techniques described herein. Actuators 199 may be implemented in accordance with any type of motion-inducing apparatus or mechanism, and may be positioned at any location within or external to infrared imaging module 100 as appropriate for different applications.

When infrared imaging module 100 is assembled, housing 120 may substantially enclose infrared sensor assembly 128, base 150, and processing module 160. Housing 120 may facilitate connection of various components of infrared imaging module 100. For example, in one embodiment, housing 120 may provide electrical connections 126 to connect various components as further described.

Electrical connections 126 (e.g., conductive electrical paths, traces, or other types of connections) may be electrically connected with bond pads 142 when infrared imaging module 100 is assembled. In various embodiments, electrical connections 126 may be embedded in housing 120, provided on inside surfaces of housing 120, and/or otherwise provided by housing 120. Electrical connections 126 may terminate in connections 124 protruding from the bottom surface of housing 120 as shown in FIG. 3. Connections 124 may connect with circuit board 170 when infrared imaging module 100 is assembled (e.g., housing 120 may rest atop circuit board 170 in various embodiments). Processing module 160 may be electrically connected with circuit board 170 through appropriate electrical connections. As a result, infrared sensor assembly 128 may be electrically connected with processing module 160 through, for example, conductive electrical paths provided by: bond pads 142, complementary connections on inside surfaces of housing 120, electrical connections 126 of housing 120, connections 124, and circuit board 170. Advantageously, such an arrangement may be implemented without requiring wire bonds to be provided between infrared sensor assembly 128 and processing module 160.

In various embodiments, electrical connections 126 in housing 120 may be made from any desired material (e.g., copper or any other appropriate conductive material). In one embodiment, electrical connections 126 may aid in dissipating heat from infrared imaging module 100.

Other connections may be used in other embodiments. For example, in one embodiment, sensor assembly 128 may be attached to processing module 160 through a ceramic board that connects to sensor assembly 128 by wire bonds and to processing module 160 by a ball grid array (BGA). In another embodiment, sensor assembly 128 may be mounted directly on a rigid flexible board and electrically connected with wire bonds, and processing module 160 may be mounted and connected to the rigid flexible board with wire bonds or a BGA.

The various implementations of infrared imaging module 100 and host device 102 set forth herein are provided for purposes of example, rather than limitation. In this regard, any of the various techniques described herein may be applied to any infrared camera system, infrared imager, or other device for performing infrared/thermal imaging.

Substrate 140 of infrared sensor assembly 128 may be mounted on base 150. In various embodiments, base 150 (e.g., a pedestal) may be made, for example, of copper formed by metal injection molding (MIM) and provided with a black oxide or nickel-coated finish. In various embodiments, base 150 may be made of any desired material, such as for example zinc, aluminum, or magnesium, as desired for a given application and may be formed by any desired applicable process, such as for example aluminum casting, MIM, or zinc rapid casting, as may be desired for particular applications. In various embodiments, base 150 may be implemented to provide structural support, various circuit paths, thermal heat sink properties, and other features where appropriate. In one embodiment, base 150 may be a multi-layer structure implemented at least in part using ceramic material.

In various embodiments, circuit board 170 may receive housing 120 and thus may physically support the various components of infrared imaging module 100. In various embodiments, circuit board 170 may be implemented as a printed circuit board (e.g., an FR4 circuit board or other types of circuit boards), a rigid or flexible interconnect (e.g., tape or other type of interconnects), a flexible circuit substrate, a flexible plastic substrate, or other appropriate structures. In various embodiments, base 150 may be implemented with the various features and attributes described for circuit board 170, and vice versa.

Socket 104 may include a cavity 106 configured to receive infrared imaging module 100 (e.g., as shown in the assembled view of FIG. 2). Infrared imaging module 100 and/or socket 104 may include appropriate tabs, arms, pins, fasteners, or any other appropriate engagement members which may be used to secure infrared imaging module 100 to or within socket 104 using friction, tension, adhesion, and/or any other appropriate manner. Socket 104 may include engagement members 107 that may engage surfaces 109 of housing 120 when infrared imaging module 100 is inserted into a cavity 106 of socket 104. Other types of engagement members may be used in other embodiments.

Infrared imaging module 100 may be electrically connected with socket 104 through appropriate electrical connections (e.g., contacts, pins, wires, or any other appropriate connections). For example, socket 104 may include electrical connections 108 which may contact corresponding electrical connections of infrared imaging module 100 (e.g., interconnect pads, contacts, or other electrical connections on side or bottom surfaces of circuit board 170, bond pads 142 or other electrical connections on base 150, or other connections). Electrical connections 108 may be made from any desired material (e.g., copper or any other appropriate conductive material). In one embodiment, electrical connections 108 may be mechanically biased to press against electrical connections of infrared imaging module 100 when infrared imaging module 100 is inserted into cavity 106 of socket 104. In one embodiment, electrical connections 108 may at least partially secure infrared imaging module 100 in socket 104. Other types of electrical connections may be used in other embodiments.

Socket 104 may be electrically connected with host device 102 through similar types of electrical connections. For example, in one embodiment, host device 102 may include electrical connections (e.g., soldered connections, snap-in connections, or other connections) that connect with electrical connections 108 passing through apertures 190. In various embodiments, such electrical connections may be made to the sides and/or bottom of socket 104.

Various components of infrared imaging module 100 may be implemented with flip chip technology which may be used to mount components directly to circuit boards without the additional clearances typically needed for wire bond connections. Flip chip connections may be used, as an example, to reduce the overall size of infrared imaging module 100 for use in compact small form factor applications. For example, in one embodiment, processing module 160 may be mounted to circuit board 170 using flip chip connections. For example, infrared imaging module 100 may be implemented with such flip chip configurations.

In various embodiments, infrared imaging module 100 and/or associated components may be implemented in accordance with various techniques (e.g., wafer level packaging techniques) as set forth in U.S. patent application Ser. No. 12/844,124 filed Jul. 27, 2010, and U.S. Provisional Patent Application No. 61/469,651 filed Mar. 30, 2011, which are incorporated herein by reference in their entirety. Furthermore, in accordance with one or more embodiments, infrared imaging module 100 and/or associated components may be implemented, calibrated, tested, and/or used in accordance with various techniques, such as for example as set forth in U.S. Pat. No. 7,470,902 issued Dec. 30, 2008, U.S. Pat. No. 6,028,309 issued Feb. 22, 2000, U.S. Pat. No. 6,812,465 issued Nov. 2, 2004, U.S. Pat. No. 7,034,301 issued Apr. 25, 2006, U.S. Pat. No. 7,679,048 issued Mar. 16, 2010, U.S. Pat. No. 7,470,904 issued Dec. 30, 2008, U.S. patent application Ser. No. 12/202,880 filed Sep. 2, 2008, and U.S. patent application Ser. No. 12/202,896 filed Sep. 2, 2008, which are incorporated herein by reference in their entirety.

In some embodiments, host device 102 may include other components 198 such as a non-thermal camera (e.g., a visible light camera or other type of non-thermal imager). The non-thermal camera may be a small form factor imaging module or imaging device, and may, in some embodiments, be implemented in a manner similar to the various embodiments of infrared imaging module 100 disclosed herein, with one or more sensors and/or sensor arrays responsive to radiation in non-thermal spectrums (e.g., radiation in visible light wavelengths, ultraviolet wavelengths, and/or other non-thermal wavelengths). For example, in some embodiments, the non-thermal camera may be implemented with a charge-coupled device (CCD) sensor, an electron multiplying CCD (EMCCD) sensor, a complementary metal-oxide-semiconductor (CMOS) sensor, a scientific CMOS (sCMOS) sensor, or other filters and/or sensors.

In some embodiments, the non-thermal camera may be co-located with infrared imaging module 100 and oriented such that a field-of-view (FOV) of the non-thermal camera at least partially overlaps a FOV of infrared imaging module 100. In one example, infrared imaging module 100 and a non-thermal camera may be implemented as a dual sensor module sharing a common substrate according to various techniques described in U.S. Provisional Patent Application No. 61/748,018 filed Dec. 31, 2012, which is incorporated herein by reference.

For embodiments having such a non-thermal light camera, various components (e.g., processor 195, processing module 160, and/or other processing component) may be configured to superimpose, fuse, blend, or otherwise combine infrared images (e.g., including thermal images) captured by infrared imaging module 100 and non-thermal images (e.g., including visible light images) captured by a non-thermal camera, whether captured at substantially the same time or different times (e.g., time-spaced over hours, days, daytime versus nighttime, and/or otherwise).

In some embodiments, thermal and non-thermal images may be processed to generate combined images (e.g., one or more processes performed on such images in some embodiments). For example, scene-based NUC processing may be performed (as further described herein), true color processing may be performed, and/or high contrast processing may be performed.

Regarding true color processing, thermal images may be blended with non-thermal images by, for example, blending a radiometric component of a thermal image with a corresponding component of a non-thermal image according to a blending parameter, which may be adjustable by a user and/or machine in some embodiments. For example, luminance or chrominance components of the thermal and non-thermal images may be combined according to the blending parameter. In one embodiment, such blending techniques may be referred to as true color infrared imagery. For example, in daytime imaging, a blended image may comprise a non-thermal color image, which includes a luminance component and a chrominance component, with its luminance value replaced by the luminance value from a thermal image. The use of the luminance data from the thermal image causes the intensity of the true non-thermal color image to brighten or dim based on the temperature of the object. As such, these blending techniques provide thermal imaging for daytime or visible light images.

Regarding high contrast processing, high spatial frequency content may be obtained from one or more of the thermal and non-thermal images (e.g., by performing high pass filtering, difference imaging, and/or other techniques). A combined image may include a radiometric component of a thermal image and a blended component including infrared (e.g., thermal) characteristics of a scene blended with the high spatial frequency content, according to a blending parameter, which may be adjustable by a user and/or machine in some embodiments. In some embodiments, high spatial frequency content from non-thermal images may be blended with thermal images by superimposing the high spatial frequency content onto the thermal images, where the high spatial frequency content replaces or overwrites those portions of the thermal images corresponding to where the high spatial frequency content exists. For example, the high spatial frequency content may include edges of objects depicted in images of a scene, but may not exist within the interior of such objects. In such embodiments, blended image data may simply include the high spatial frequency content, which may subsequently be encoded into one or more components of combined images.

For example, a radiometric component of thermal image may be a chrominance component of the thermal image, and the high spatial frequency content may be derived from the luminance and/or chrominance components of a non-thermal image. In this embodiment, a combined image may include the radiometric component (e.g., the chrominance component of the thermal image) encoded into a chrominance component of the combined image and the high spatial frequency content directly encoded (e.g., as blended image data but with no thermal image contribution) into a luminance component of the combined image. By doing so, a radiometric calibration of the radiometric component of the thermal image may be retained. In similar embodiments, blended image data may include the high spatial frequency content added to a luminance component of the thermal images, and the resulting blended data encoded into a luminance component of resulting combined images.

For example, any of the techniques disclosed in the following applications may be used in various embodiments: U.S. patent application Ser. No. 12/477,828 filed Jun. 3, 2009; U.S. patent application Ser. No. 12/766,739 filed Apr. 23, 2010; U.S. patent application Ser. No. 13/105,765 filed May 11, 2011; U.S. patent application Ser. No. 13/437,645 filed Apr. 2, 2012; U.S. Provisional Patent Application No. 61/473,207 filed Apr. 8, 2011; U.S. Provisional Patent Application No. 61/746,069 filed Dec. 26, 2012; U.S. Provisional Patent Application No. 61/746,074 filed Dec. 26, 2012; U.S. Provisional Patent Application No. 61/748,018 filed Dec. 31, 2012; U.S. Provisional Patent Application No. 61/792,582 filed Mar. 15, 2013; U.S. Provisional Patent Application No. 61/793,952 filed Mar. 15, 2013; and International Patent Application No. PCT/EP2011/056432 filed Apr. 21, 2011, all of such applications are incorporated herein by reference in their entirety. Any of the techniques described herein, or described in other applications or patents referenced herein, may be applied to any of the various thermal devices, non-thermal devices, and uses described herein.

Referring again to FIG. 1, in various embodiments, host device 102 may include shutter 105. In this regard, shutter 105 may be selectively positioned over socket 104 (e.g., as identified by arrows 103) while infrared imaging module 100 is installed therein. In this regard, shutter 105 may be used, for example, to protect infrared imaging module 100 when not in use. Shutter 105 may also be used as a temperature reference as part of a calibration process (e.g., a NUC process or other calibration processes) for infrared imaging module 100 as would be understood by one skilled in the art.

In various embodiments, shutter 105 may be made from various materials such as, for example, polymers, glass, aluminum (e.g., painted or anodized) or other materials. In various embodiments, shutter 105 may include one or more coatings to selectively filter electromagnetic radiation and/or adjust various optical properties of shutter 105 (e.g., a uniform blackbody coating or a reflective gold coating).

In another embodiment, shutter 105 may be fixed in place to protect infrared imaging module 100 at all times. In this case, shutter 105 or a portion of shutter 105 may be made from appropriate materials (e.g., polymers or infrared transmitting materials such as silicon, germanium, zinc selenide, or chalcogenide glasses) that do not substantially filter desired infrared wavelengths. In another embodiment, a shutter may be implemented as part of infrared imaging module 100 (e.g., within or as part of a lens barrel or other components of infrared imaging module 100), as would be understood by one skilled in the art.

Alternatively, in another embodiment, a shutter (e.g., shutter 105 or other type of external or internal shutter) need not be provided, but rather a NUC process or other type of calibration may be performed using shutterless techniques. In another embodiment, a NUC process or other type of calibration using shutterless techniques may be performed in combination with shutter-based techniques.

Infrared imaging module 100 and host device 102 may be implemented in accordance with any of the various techniques set forth in U.S. Provisional Patent Application No. 61/495,873 filed Jun. 10, 2011, U.S. Provisional Patent Application No. 61/495,879 filed Jun. 10, 2011, and U.S. Provisional Patent Application No. 61/495,888 filed Jun. 10, 2011, which are incorporated herein by reference in their entirety.

In various embodiments, the components of host device 102 and/or infrared imaging module 100 may be implemented as a local or distributed system with components in communication with each other over wired and/or wireless networks. Accordingly, the various operations identified in this disclosure may be performed by local and/or remote components as may be desired in particular implementations.

Figure 5:
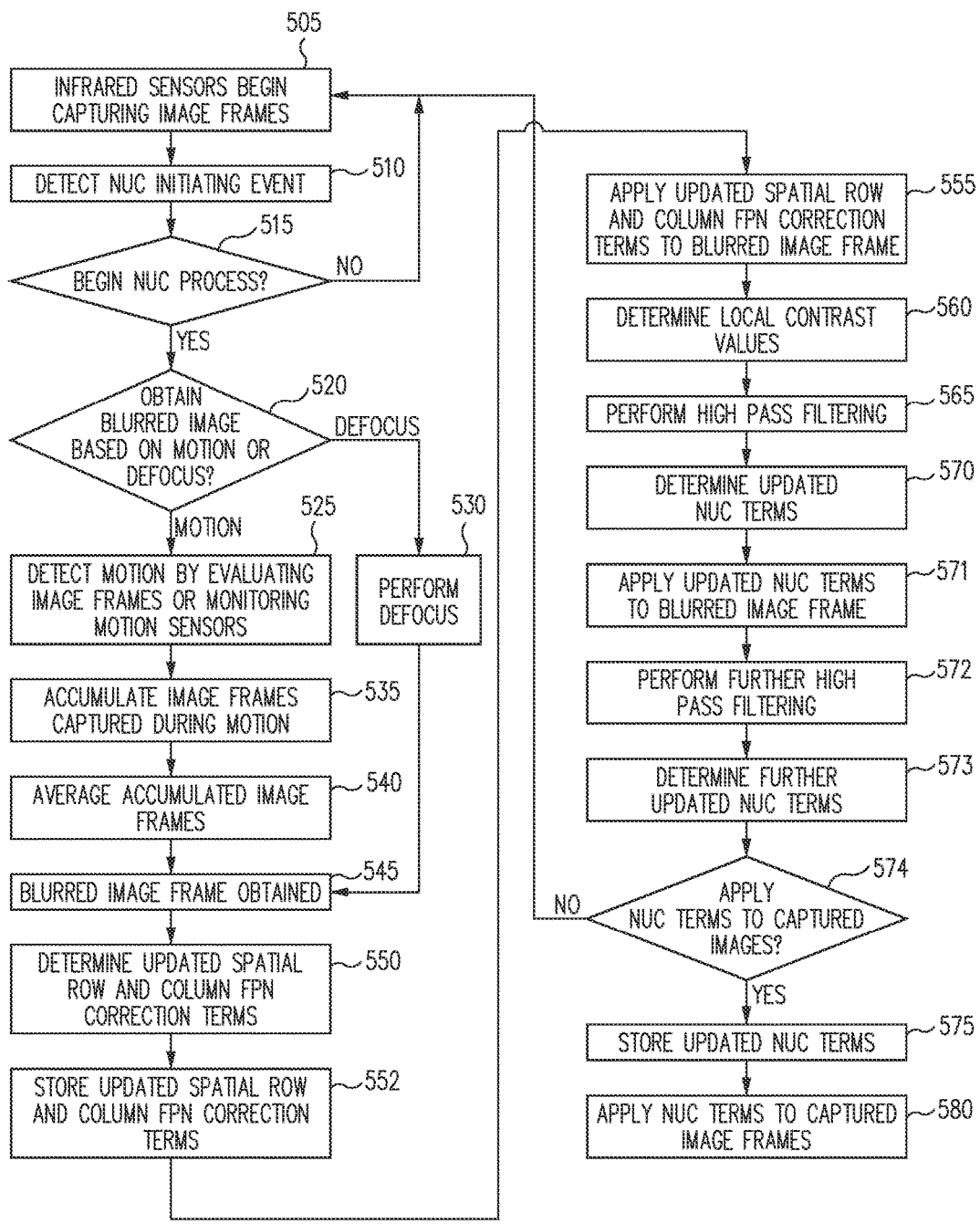
FIG. 5 illustrates a flow diagram of various operations to determine non-uniform correction (NUC) terms in accordance with an embodiment of the disclosure.

FIG. 5 illustrates a flow diagram of various operations to determine NUC terms in accordance with an embodiment of the disclosure. In some embodiments, the operations of FIG. 5 may be performed by processing module 160 or processor 195 (both also generally referred to as a processor) operating on image frames captured by infrared sensors 132.

In block 505, infrared sensors 132 begin capturing image frames of a scene. Typically, the scene will be the real world environment in which host device 102 is currently located. In this regard, shutter 105 (if optionally provided) may be opened to permit infrared imaging module to receive infrared radiation from the scene. Infrared sensors 132 may continue capturing image frames during all operations shown in FIG. 5. In this regard, the continuously captured image frames may be used for various operations as further discussed. In one embodiment, the captured image frames may be temporally filtered (e.g., in accordance with the process of block 826 further described herein with regard to FIG. 8) and be processed by other terms (e.g., factory gain terms 812, factory offset terms 816, previously determined NUC terms 817, column FPN terms 820, and row FPN terms 824 as further described herein with regard to FIG. 8) before they are used in the operations shown in FIG. 5.

In block 510, a NUC process initiating event is detected. In one embodiment, the NUC process may be initiated in response to physical movement of host device 102. Such movement may be detected, for example, by motion sensors 194 which may be polled by a processor. In one example, a user may move host device 102 in a particular manner, such as by intentionally waving host device 102 back and forth in an "erase" or "swipe" movement. In this regard, the user may move host device 102 in accordance with a predetermined speed and direction (velocity), such as in an up and down, side to side, or other pattern to initiate the NUC process. In this example, the use of such movements may permit the user to intuitively operate host device 102 to simulate the "erasing" of noise in captured image frames.

In another example, a NUC process may be initiated by host device 102 if motion exceeding a threshold value is detected (e.g., motion greater than expected for ordinary use). It is contemplated that any desired type of spatial translation of host device 102 may be used to initiate the NUC process.

In yet another example, a NUC process may be initiated by host device 102 if a minimum time has elapsed since a previously performed NUC process. In a further example, a NUC process may be initiated by host device 102 if infrared imaging module 100 has experienced a minimum temperature change since a previously performed NUC process. In a still further example, a NUC process may be continuously initiated and repeated.

In block 515, after a NUC process initiating event is detected, it is determined whether the NUC process should actually be performed. In this regard, the NUC process may be selectively initiated based on whether one or more additional conditions are met. For example, in one embodiment, the NUC process may not be performed unless a minimum time has elapsed since a previously performed NUC process. In another embodiment, the NUC process may not be performed unless infrared imaging module 100 has experienced a minimum temperature change since a previously performed NUC process. Other criteria or conditions may be used in other embodiments. If appropriate criteria or conditions have been met, then the flow diagram continues to block 520. Otherwise, the flow diagram returns to block 505.

In the NUC process, blurred image frames may be used to determine NUC terms which may be applied to captured image frames to correct for FPN. As discussed, in one embodiment, the blurred image frames may be obtained by accumulating multiple image frames of a moving scene (e.g., captured while the scene and/or the thermal imager is in motion). In another embodiment, the blurred image frames may be obtained by defocusing an optical element or other component of the thermal imager.

Accordingly, in block 520 a choice of either approach is provided. If the motion-based approach is used, then the flow diagram continues to block 525. If the defocus-based approach is used, then the flow diagram continues to block 530.

Referring now to the motion-based approach, in block 525 motion is detected. For example, in one embodiment, motion may be detected based on the image frames captured by infrared sensors 132. In this regard, an appropriate motion detection process (e.g., an image registration process, a frame-to-frame difference calculation, or other appropriate process) may be applied to captured image frames to determine whether motion is present (e.g., whether static or moving image frames have been captured). For example, in one embodiment, it can be determined whether pixels or regions around the pixels of consecutive image frames have changed more than a user defined amount (e.g., a percentage and/or threshold value). If at least a given percentage of pixels have changed by at least the user defined amount, then motion will be detected with sufficient certainty to proceed to block 535.

In another embodiment, motion may be determined on a per pixel basis, wherein only pixels that exhibit significant changes are accumulated to provide the blurred image frame. For example, counters may be provided for each pixel and used to ensure that the same number of pixel values are accumulated for each pixel, or used to average the pixel values based on the number of pixel values actually accumulated for each pixel. Other types of image-based motion detection may be performed such as performing a Radon transform.

In another embodiment, motion may be detected based on data provided by motion sensors 194. In one embodiment, such motion detection may include detecting whether host device 102 is moving along a relatively straight trajectory through space. For example, if host device 102 is moving along a relatively straight trajectory, then it is possible that certain objects appearing in the imaged scene may not be sufficiently blurred (e.g., objects in the scene that may be aligned with or moving substantially parallel to the straight trajectory). Thus, in such an embodiment, the motion detected by motion sensors 194 may be conditioned on host device 102 exhibiting, or not exhibiting, particular trajectories.

In yet another embodiment, both a motion detection process and motion sensors 194 may be used. Thus, using any of these various embodiments, a determination can be made as to whether or not each image frame was captured while at least a portion of the scene and host device 102 were in motion relative to each other (e.g., which may be caused by host device 102 moving relative to the scene, at least a portion of the scene moving relative to host device 102, or both).

It is expected that the image frames for which motion was detected may exhibit some secondary blurring of the captured scene (e.g., blurred thermal image data associated with the scene) due to the thermal time constants of infrared sensors 132 (e.g., microbolometer thermal time constants) interacting with the scene movement.

In block 535, image frames for which motion was detected are accumulated. For example, if motion is detected for a continuous series of image frames, then the image frames of the series may be accumulated. As another example, if motion is detected for only some image frames, then the non-moving image frames may be skipped and not included in the accumulation. Thus, a continuous or discontinuous set of image frames may be selected to be accumulated based on the detected motion.

In block 540, the accumulated image frames are averaged to provide a blurred image frame. Because the accumulated image frames were captured during motion, it is expected that actual scene information will vary between the image frames and thus cause the scene information to be further blurred in the resulting blurred image frame (block 545).

In contrast, FPN (e.g., caused by one or more components of infrared imaging module 100) will remain fixed over at least short periods of time and over at least limited changes in scene irradiance during motion. As a result, image frames captured in close proximity in time and space during motion will suffer from identical or at least very similar FPN. Thus, although scene information may change in consecutive image frames, the FPN will stay essentially constant. By averaging, multiple image frames captured during motion will blur the scene information, but will not blur the FPN. As a result, FPN will remain more clearly defined in the blurred image frame provided in block 545 than the scene information.

In one embodiment, 32 or more image frames are accumulated and averaged in blocks 535 and 540. However, any desired number of image frames may be used in other embodiments, but with generally decreasing correction accuracy as frame count is decreased.

Referring now to the defocus-based approach, in block 530, a defocus operation may be performed to intentionally defocus the image frames captured by infrared sensors 132. For example, in one embodiment, one or more actuators 199 may be used to adjust, move, or otherwise translate optical element 180, infrared sensor assembly 128, and/or other components of infrared imaging module 100 to cause infrared sensors 132 to capture a blurred (e.g., unfocused) image frame of the scene. Other non-actuator based techniques are also contemplated for intentionally defocusing infrared image frames such as, for example, manual (e.g., user-initiated) defocusing.

Although the scene may appear blurred in the image frame, FPN (e.g., caused by one or more components of infrared imaging module 100) will remain unaffected by the defocusing operation. As a result, a blurred image frame of the scene will be provided (block 545) with FPN remaining more clearly defined in the blurred image than the scene information.

In the above discussion, the defocus-based approach has been described with regard to a single captured image frame. In another embodiment, the defocus-based approach may include accumulating multiple image frames while the infrared imaging module 100 has been defocused and averaging the defocused image frames to remove the effects of temporal noise and provide a blurred image frame in block 545.

Thus, it will be appreciated that a blurred image frame may be provided in block 545 by either the motion-based approach or the defocus-based approach. Because much of the scene information will be blurred by either motion, defocusing, or both, the blurred image frame may be effectively considered a low pass filtered version of the original captured image frames with respect to scene information.

In block 550, the blurred image frame is processed to determine updated row and column FPN terms (e.g., if row and column FPN terms have not been previously determined then the updated row and column FPN terms may be new row and column FPN terms in the first iteration of block 550). As used in this disclosure, the terms row and column may be used interchangeably depending on the orientation of infrared sensors 132 and/or other components of infrared imaging module 100.

In one embodiment, block 550 includes determining a spatial FPN correction term for each row of the blurred image frame (e.g., each row may have its own spatial FPN correction term), and also determining a spatial FPN correction term for each column of the blurred image frame (e.g., each column may have its own spatial FPN correction term). Such processing may be used to reduce the spatial and slowly varying (1/f) row and column FPN inherent in thermal imagers caused by, for example, 1/f noise characteristics of amplifiers in ROIC 402 which may manifest as vertical and horizontal stripes in image frames.

Advantageously, by determining spatial row and column FPN terms using the blurred image frame, there will be a reduced risk of vertical and horizontal objects in the actual imaged scene from being mistaken for row and column noise (e.g., real scene content will be blurred while FPN remains unblurred).

Figure 6:
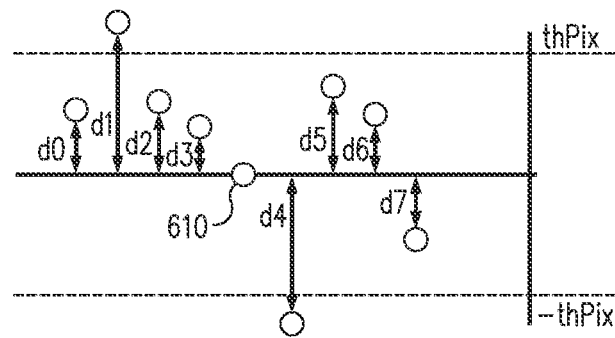
FIG. 6 illustrates differences between neighboring pixels in accordance with an embodiment of the disclosure.

In one embodiment, row and column FPN terms may be determined by considering differences between neighboring pixels of the blurred image frame. For example, FIG. 6 illustrates differences between neighboring pixels in accordance with an embodiment of the disclosure. Specifically, in FIG. 6 a pixel 610 is compared to its 8 nearest horizontal neighbors: d0-d3 on one side and d4-d7 on the other side. Differences between the neighbor pixels can be averaged to obtain an estimate of the offset error of the illustrated group of pixels. An offset error may be calculated for each pixel in a row or column and the average result may be used to correct the entire row or column.

To prevent real scene data from being interpreted as noise, upper and lower threshold values may be used (thPix and −thPix). Pixel values falling outside these threshold values (pixels d1 and d4 in this example) are not used to obtain the offset error. In addition, the maximum amount of row and column FPN correction may be limited by these threshold values.

Further techniques for performing spatial row and column FPN correction processing are set forth in U.S. patent application Ser. No. 12/396,340 filed Mar. 2, 2009 which is incorporated herein by reference in its entirety.

Referring again to FIG. 5, the updated row and column FPN terms determined in block 550 are stored (block 552) and applied (block 555) to the blurred image frame provided in block 545. After these terms are applied, some of the spatial row and column FPN in the blurred image frame may be reduced. However, because such terms are applied generally to rows and columns, additional FPN may remain such as spatially uncorrelated FPN associated with pixel to pixel drift or other causes. Neighborhoods of spatially correlated FPN may also remain which may not be directly associated with individual rows and columns. Accordingly, further processing may be performed as discussed below to determine NUC terms.

In block 560, local contrast values (e.g., edges or absolute values of gradients between adjacent or small groups of pixels) in the blurred image frame are determined. If scene information in the blurred image frame includes contrasting areas that have not been significantly blurred (e.g., high contrast edges in the original scene data), then such features may be identified by a contrast determination process in block 560.

For example, local contrast values in the blurred image frame may be calculated, or any other desired type of edge detection process may be applied to identify certain pixels in the blurred image as being part of an area of local contrast. Pixels that are marked in this manner may be considered as containing excessive high spatial frequency scene information that would be interpreted as FPN (e.g., such regions may correspond to portions of the scene that have not been sufficiently blurred). As such, these pixels may be excluded from being used in the further determination of NUC terms. In one embodiment, such contrast detection processing may rely on a threshold that is higher than the expected contrast value associated with FPN (e.g., pixels exhibiting a contrast value higher than the threshold may be considered to be scene information, and those lower than the threshold may be considered to be exhibiting FPN).

In one embodiment, the contrast determination of block 560 may be performed on the blurred image frame after row and column FPN terms have been applied to the blurred image frame (e.g., as shown in FIG. 5). In another embodiment, block 560 may be performed prior to block 550 to determine contrast before row and column FPN terms are determined (e.g., to prevent scene based contrast from contributing to the determination of such terms).

Following block 560, it is expected that any high spatial frequency content remaining in the blurred image frame may be generally attributed to spatially uncorrelated FPN. In this regard, following block 560, much of the other noise or actual desired scene based information has been removed or excluded from the blurred image frame due to: intentional blurring of the image frame (e.g., by motion or defocusing in blocks 520 through 545), application of row and column FPN terms (block 555), and contrast determination (block 560).

Thus, it can be expected that following block 560, any remaining high spatial frequency content (e.g., exhibited as areas of contrast or differences in the blurred image frame) may be attributed to spatially uncorrelated FPN. Accordingly, in block 565, the blurred image frame is high pass filtered. In one embodiment, this may include applying a high pass filter to extract the high spatial frequency content from the blurred image frame. In another embodiment, this may include applying a low pass filter to the blurred image frame and taking a difference between the low pass filtered image frame and the unfiltered blurred image frame to obtain the high spatial frequency content. In accordance with various embodiments of the present disclosure, a high pass filter may be implemented by calculating a mean difference between a sensor signal (e.g., a pixel value) and its neighbors.

In block 570, a flat field correction process is performed on the high pass filtered blurred image frame to determine updated NUC terms (e.g., if a NUC process has not previously been performed then the updated NUC terms may be new NUC terms in the first iteration of block 570).

Figure 7:
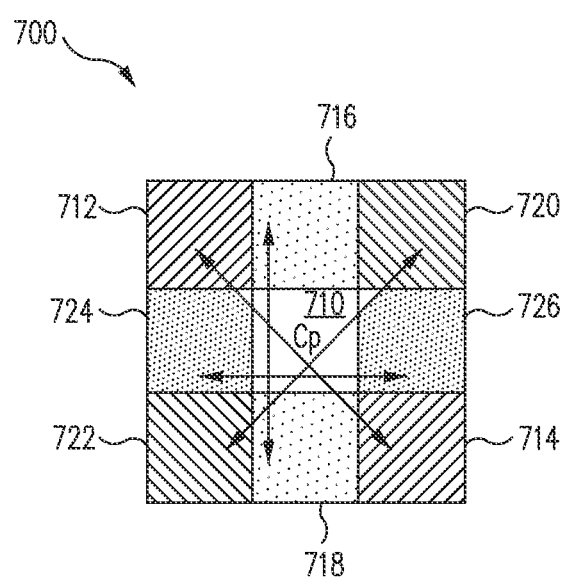
FIG. 7 illustrates a flat field correction technique in accordance with an embodiment of the disclosure.

For example, FIG. 7 illustrates a flat field correction technique 700 in accordance with an embodiment of the disclosure. In FIG. 7, a NUC term may be determined for each pixel 710 of the blurred image frame using the values of its neighboring pixels 712 to 726. For each pixel 710, several gradients may be determined based on the absolute difference between the values of various adjacent pixels. For example, absolute value differences may be determined between: pixels 712 and 714 (a left to right diagonal gradient), pixels 716 and 718 (a top to bottom vertical gradient), pixels 720 and 722 (a right to left diagonal gradient), and pixels 724 and 726 (a left to right horizontal gradient).

These absolute differences may be summed to provide a summed gradient for pixel 710. A weight value may be determined for pixel 710 that is inversely proportional to the summed gradient. This process may be performed for all pixels 710 of the blurred image frame until a weight value is provided for each pixel 710. For areas with low gradients (e.g., areas that are blurry or have low contrast), the weight value will be close to one. Conversely, for areas with high gradients, the weight value will be zero or close to zero. The update to the NUC term as estimated by the high pass filter is multiplied with the weight value.

In one embodiment, the risk of introducing scene information into the NUC terms can be further reduced by applying some amount of temporal damping to the NUC term determination process. For example, a temporal damping factor λ between 0 and 1 may be chosen such that the new NUC term ($NUC_{NEW}$) stored is a weighted average of the old NUC term ($NUC_{OLD}$) and the estimated updated NUC term ($NUC_{UPDATE}$). In one embodiment, this can be expressed as $NUC_{NEW} = \lambda \cdot NUC_{OLD} + (1-\lambda) \cdot (NUC_{OLD} + NUC_{UPDATE})$.

Although the determination of NUC terms has been described with regard to gradients, local contrast values may be used instead where appropriate. Other techniques may also be used such as, for example, standard deviation calculations. Other types flat field correction processes may be performed to determine NUC terms including, for example, various processes identified in U.S. Pat. No. 6,028,309 issued Feb. 22, 2000, U.S. Pat. No. 6,812,465 issued Nov. 2, 2004, and U.S. patent application Ser. No. 12/114,865 filed May 5, 2008, which are incorporated herein by reference in their entirety.

Referring again to FIG. 5, block 570 may include additional processing of the NUC terms. For example, in one embodiment, to preserve the scene signal mean, the sum of all NUC terms may be normalized to zero by subtracting the NUC term mean from each NUC term. Also in block 570, to avoid row and column noise from affecting the NUC terms, the mean value of each row and column may be subtracted from the NUC terms for each row and column. As a result, row and column FPN filters using the row and column FPN terms determined in block 550 may be better able to filter out row and column noise in further iterations (e.g., as further shown in FIG. 8) after the NUC terms are applied to captured images (e.g., in block 580 further discussed herein). In this regard, the row and column FPN filters may in general use more data to calculate the per row and per column offset coefficients (e.g., row and column FPN terms) and may thus provide a more robust alternative for reducing spatially correlated FPN than the NUC terms which are based on high pass filtering to capture spatially uncorrelated noise.

In blocks 571-573, additional high pass filtering and further determinations of updated NUC terms may be optionally performed to remove spatially correlated FPN with lower spatial frequency than previously removed by row and column FPN terms. In this regard, some variability in infrared sensors 132 or other components of infrared imaging module 100 may result in spatially correlated FPN noise that cannot be easily modeled as row or column noise. Such spatially correlated FPN may include, for example, window defects on a sensor package or a cluster of infrared sensors 132 that respond differently to irradiance than neighboring infrared sensors 132. In one embodiment, such spatially correlated FPN may be mitigated with an offset correction. If the amount of such spatially correlated FPN is significant, then the noise may also be detectable in the blurred image frame. Since this type of noise may affect a neighborhood of pixels, a high pass filter with a small kernel may not detect the FPN in the neighborhood (e.g., all values used in high pass filter may be taken from the neighborhood of affected pixels and thus may be affected by the same offset error). For example, if the high pass filtering of block 565 is performed with a small kernel (e.g., considering only immediately adjacent pixels that fall within a neighborhood of pixels affected by spatially correlated FPN), then broadly distributed spatially correlated FPN may not be detected.

Figure 11:
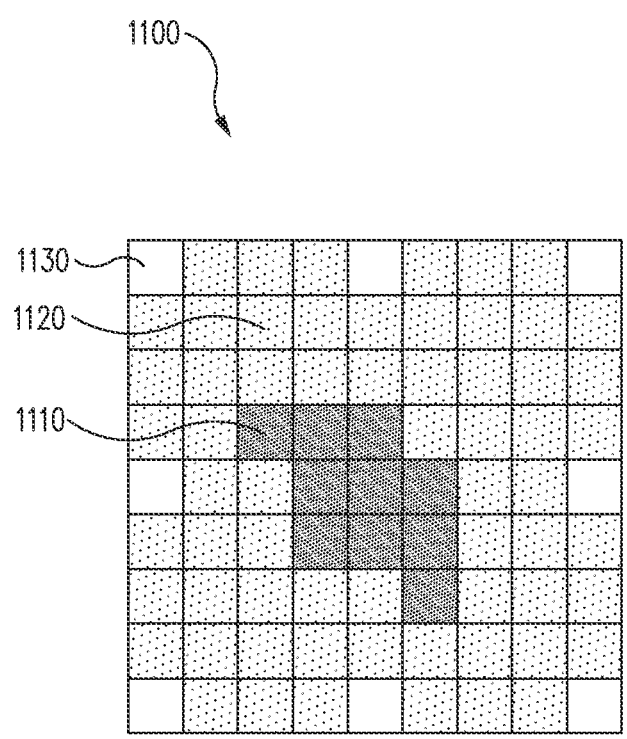
FIG. 11 illustrates spatially correlated fixed pattern noise (FPN) in a neighborhood of pixels in accordance with an embodiment of the disclosure.

For example, FIG. 11 illustrates spatially correlated FPN in a neighborhood of pixels in accordance with an embodiment of the disclosure. As shown in a sample image frame 1100, a neighborhood of pixels 1110 may exhibit spatially correlated FPN that is not precisely correlated to individual rows and columns and is distributed over a neighborhood of several pixels (e.g., a neighborhood of approximately 4 by 4 pixels in this example). Sample image frame 1100 also includes a set of pixels 1120 exhibiting substantially uniform response that are not used in filtering calculations, and a set of pixels 1130 that are used to estimate a low pass value for the neighborhood of pixels 1110. In one embodiment, pixels 1130 may be a number of pixels divisible by two in order to facilitate efficient hardware or software calculations.

Referring again to FIG. 5, in blocks 571-573, additional high pass filtering and further determinations of updated NUC terms may be optionally performed to remove spatially correlated FPN such as exhibited by pixels 1110. In block 571, the updated NUC terms determined in block 570 are applied to the blurred image frame. Thus, at this time, the blurred image frame will have been initially corrected for spatially correlated FPN (e.g., by application of the updated row and column FPN terms in block 555), and also initially corrected for spatially uncorrelated FPN (e.g., by application of the updated NUC terms applied in block 571).

In block 572, a further high pass filter is applied with a larger kernel than was used in block 565, and further updated NUC terms may be determined in block 573. For example, to detect the spatially correlated FPN present in pixels 1110, the high pass filter applied in block 572 may include data from a sufficiently large enough neighborhood of pixels such that differences can be determined between unaffected pixels (e.g., pixels 1120) and affected pixels (e.g., pixels 1110). For example, a low pass filter with a large kernel can be used (e.g., an N by N kernel that is much greater than 3 by 3 pixels) and the results may be subtracted to perform appropriate high pass filtering.

In one embodiment, for computational efficiency, a sparse kernel may be used such that only a small number of neighboring pixels inside an N by N neighborhood are used. For any given high pass filter operation using distant neighbors (e.g., a large kernel), there is a risk of modeling actual (potentially blurred) scene information as spatially correlated FPN. Accordingly, in one embodiment, the temporal damping factor $\lambda$ may be set close to 1 for updated NUC terms determined in block 573.

In various embodiments, blocks 571-573 may be repeated (e.g., cascaded) to iteratively perform high pass filtering with increasing kernel sizes to provide further updated NUC terms further correct for spatially correlated FPN of desired neighborhood sizes. In one embodiment, the decision to perform such iterations may be determined by whether spatially correlated FPN has actually been removed by the updated NUC terms of the previous performance of blocks 571-573.

After blocks 571-573 are finished, a decision is made regarding whether to apply the updated NUC terms to captured image frames (block 574). For example, if an average of the absolute value of the NUC terms for the entire image frame is less than a minimum threshold value, or greater than a maximum threshold value, the NUC terms may be deemed spurious or unlikely to provide meaningful correction. Alternatively, thresholding criteria may be applied to individual pixels to determine which pixels receive updated NUC terms. In one embodiment, the threshold values may correspond to differences between the newly calculated NUC terms and previously calculated NUC terms. In another embodiment, the threshold values may be independent of previously calculated NUC terms. Other tests may be applied (e.g., spatial correlation tests) to determine whether the NUC terms should be applied.

If the NUC terms are deemed spurious or unlikely to provide meaningful correction, then the flow diagram returns to block 505. Otherwise, the newly determined NUC terms are stored (block 575) to replace previous NUC terms (e.g., determined by a previously performed iteration of FIG. 5) and applied (block 580) to captured image frames.

Figure 8:
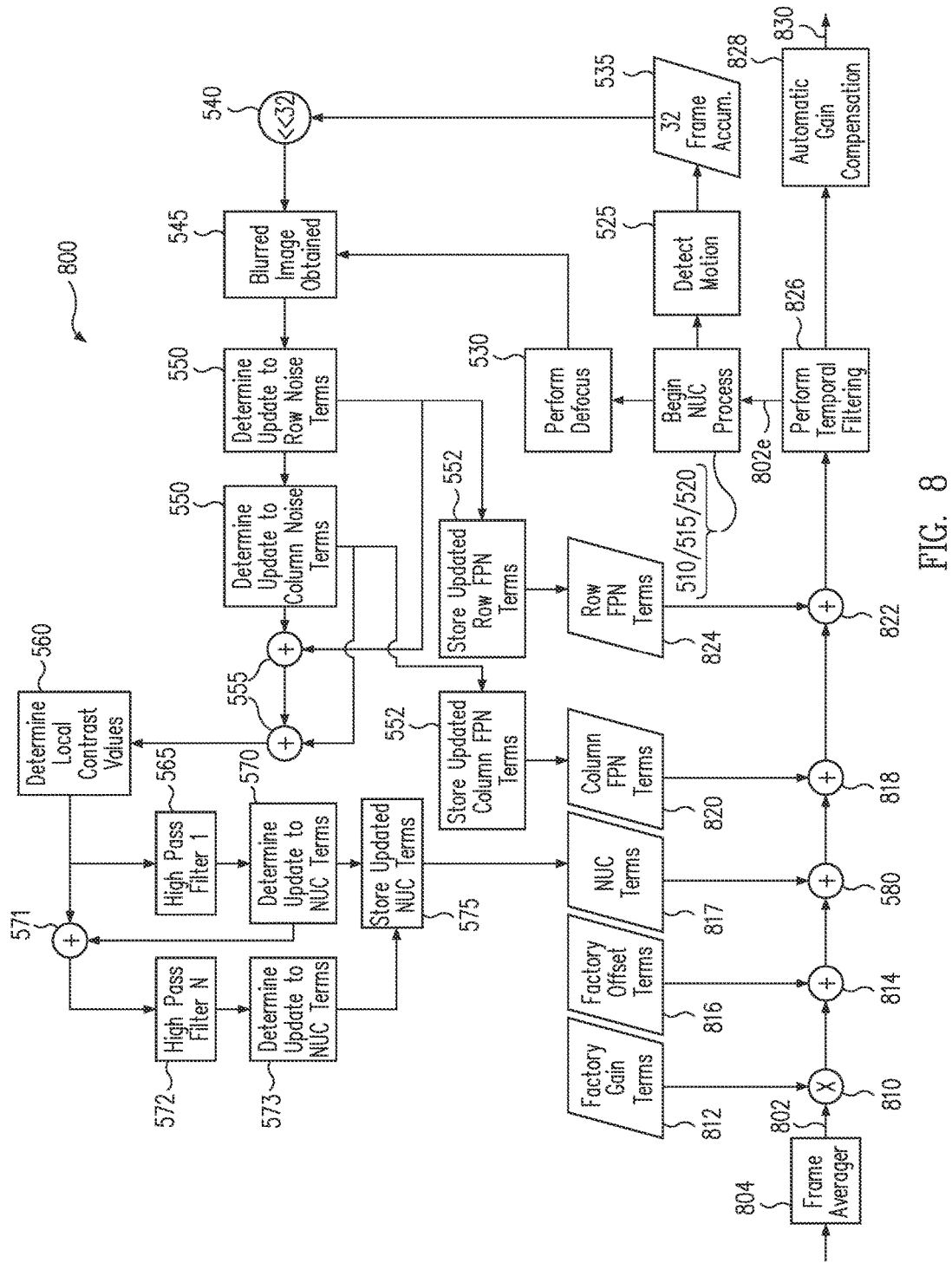
FIG. 8 illustrates various image processing techniques of FIG. 5 and other operations applied in an image processing pipeline in accordance with an embodiment of the disclosure.

FIG. 8 illustrates various image processing techniques of FIG. 5 and other operations applied in an image processing pipeline 800 in accordance with an embodiment of the disclosure. In this regard, pipeline 800 identifies various operations of FIG. 5 in the context of an overall iterative image processing scheme for correcting image frames provided by infrared imaging module 100. In some embodiments, pipeline 800 may be provided by processing module 160 or processor 195 (both also generally referred to as a processor) operating on image frames captured by infrared sensors 132.

Image frames captured by infrared sensors 132 may be provided to a frame averager 804 that integrates multiple image frames to provide image frames 802 with an improved signal to noise ratio. Frame averager 804 may be effectively provided by infrared sensors 132, ROIC 402, and other components of infrared sensor assembly 128 that are implemented to support high image capture rates. For example, in one embodiment, infrared sensor assembly 128 may capture infrared image frames at a frame rate of 240 Hz (e.g., 240 images per second). In this embodiment, such a high frame rate may be implemented, for example, by operating infrared sensor assembly 128 at relatively low voltages (e.g., compatible with mobile telephone voltages) and by using a relatively small array of infrared sensors 132 (e.g., an array of 64 by 64 infrared sensors in one embodiment).

In one embodiment, such infrared image frames may be provided from infrared sensor assembly 128 to processing module 160 at a high frame rate (e.g., 240 Hz or other frame rates). In another embodiment, infrared sensor assembly 128 may integrate over longer time periods, or multiple time periods, to provide integrated (e.g., averaged) infrared image frames to processing module 160 at a lower frame rate (e.g., 30 Hz, 9 Hz, or other frame rates). Further information regarding implementations that may be used to provide high image capture rates may be found in U.S. Provisional Patent Application No. 61/495,879 filed Jun. 10, 2011 which is incorporated herein by reference in its entirety.

Image frames 802 proceed through pipeline 800 where they are adjusted by various terms, temporally filtered, used to determine the various adjustment terms, and gain compensated.

In blocks 810 and 814, factory gain terms 812 and factory offset terms 816 are applied to image frames 802 to compensate for gain and offset differences, respectively, between the various infrared sensors 132 and/or other components of infrared imaging module 100 determined during manufacturing and testing.

In block 580, NUC terms 817 are applied to image frames 802 to correct for FPN as discussed. In one embodiment, if NUC terms 817 have not yet been determined (e.g., before a NUC process has been initiated), then block 580 may not be performed or initialization values may be used for NUC terms 817 that result in no alteration to the image data (e.g., offsets for every pixel would be equal to zero).

In blocks 818 and 822, column FPN terms 820 and row FPN terms 824, respectively, are applied to image frames 802. Column FPN terms 820 and row FPN terms 824 may be determined in accordance with block 550 as discussed. In one embodiment, if the column FPN terms 820 and row FPN terms 824 have not yet been determined (e.g., before a NUC process has been initiated), then blocks 818 and 822 may not be performed or initialization values may be used for the column FPN terms 820 and row FPN terms 824 that result in no alteration to the image data (e.g., offsets for every pixel would be equal to zero).

Figure 9:
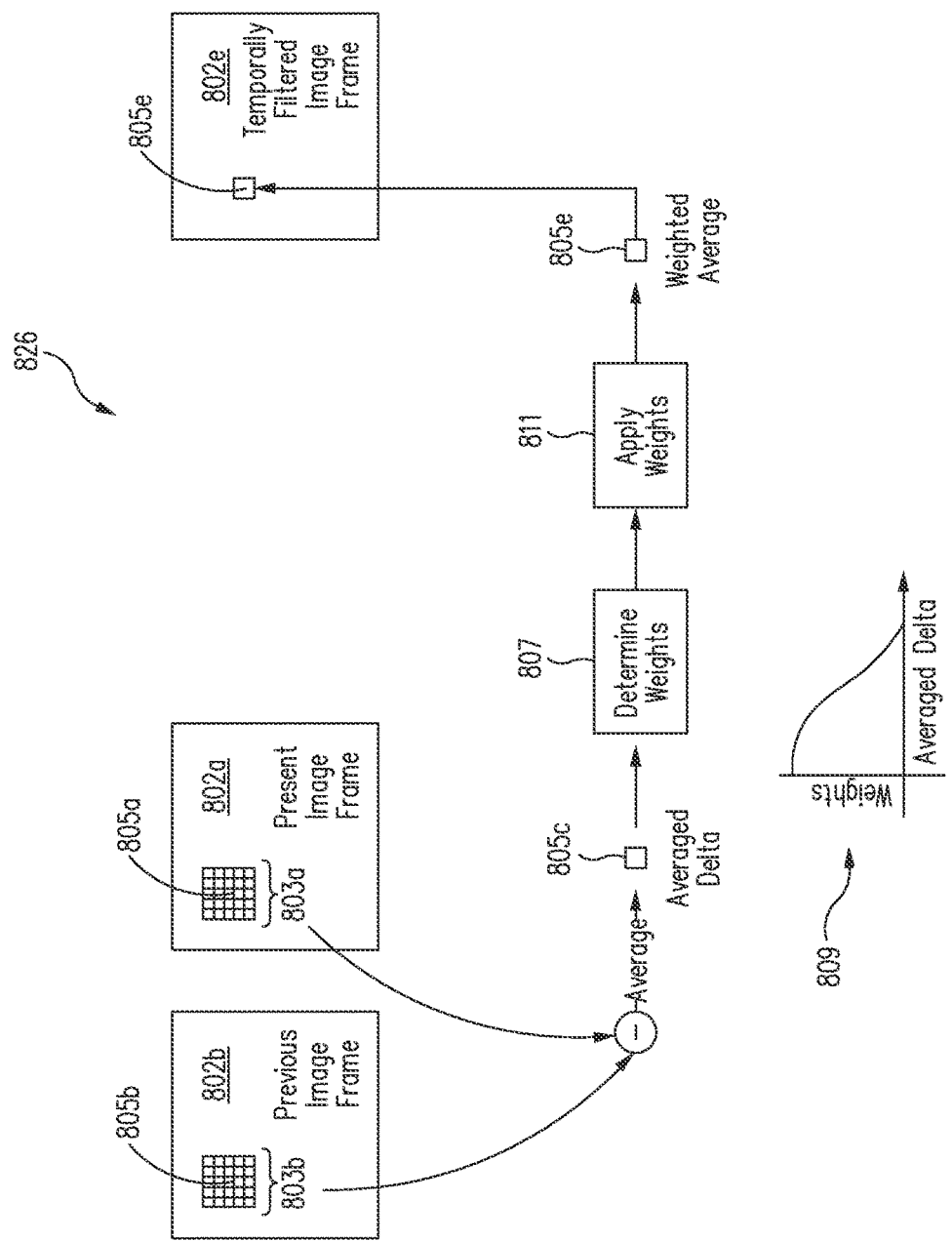
FIG. 9 illustrates a temporal noise reduction process in accordance with an embodiment of the disclosure.

In block 826, temporal filtering is performed on image frames 802 in accordance with a temporal noise reduction (TNR) process. FIG. 9 illustrates a TNR process in accordance with an embodiment of the disclosure. In FIG. 9, a presently received image frame 802a and a previously temporally filtered image frame 802b are processed to determine a new temporally filtered image frame 802e. Image frames 802a and 802b include local neighborhoods of pixels 803a and 803b centered around pixels 805a and 805b, respectively. Neighborhoods 803a and 803b correspond to the same locations within image frames 802a and 802b and are subsets of the total pixels in image frames 802a and 802b. In the illustrated embodiment, neighborhoods 803a and 803b include areas of 5 by 5 pixels. Other neighborhood sizes may be used in other embodiments.

Differences between corresponding pixels of neighborhoods 803a and 803b are determined and averaged to provide an averaged delta value 805c for the location corresponding to pixels 805a and 805b. Averaged delta value 805c may be used to determine weight values in block 807 to be applied to pixels 805a and 805b of image frames 802a and 802b.

In one embodiment, as shown in graph 809, the weight values determined in block 807 may be inversely proportional to averaged delta value 805c such that weight values drop rapidly towards zero when there are large differences between neighborhoods 803a and 803b. In this regard, large differences between neighborhoods 803a and 803b may indicate that changes have occurred within the scene (e.g., due to motion) and pixels 802a and 802b may be appropriately weighted, in one embodiment, to avoid introducing blur across frame-to-frame scene changes. Other associations between weight values and averaged delta value 805c may be used in various embodiments.

The weight values determined in block 807 may be applied to pixels 805a and 805b to determine a value for corresponding pixel 805e of image frame 802e (block 811). In this regard, pixel 805e may have a value that is a weighted average (or other combination) of pixels 805a and 805b, depending on averaged delta value 805c and the weight values determined in block 807.

For example, pixel 805e of temporally filtered image frame 802e may be a weighted sum of pixels 805a and 805b of image frames 802a and 802b. If the average difference between pixels 805a and 805b is due to noise, then it may be expected that the average change between neighborhoods 805a and 805b will be close to zero (e.g., corresponding to the average of uncorrelated changes). Under such circumstances, it may be expected that the sum of the differences between neighborhoods 805a and 805b will be close to zero. In this case, pixel 805a of image frame 802a may both be appropriately weighted so as to contribute to the value of pixel 805e.

However, if the sum of such differences is not zero (e.g., even differing from zero by a small amount in one embodiment), then the changes may be interpreted as being attributed to motion instead of noise. Thus, motion may be detected based on the average change exhibited by neighborhoods 805a and 805b. Under these circumstances, pixel 805a of image frame 802a may be weighted heavily, while pixel 805b of image frame 802b may be weighted lightly.

Other embodiments are also contemplated. For example, although averaged delta value 805c has been described as being determined based on neighborhoods 805a and 805b, in other embodiments averaged delta value 805c may be determined based on any desired criteria (e.g., based on individual pixels or other types of groups of sets of pixels).

In the above embodiments, image frame 802a has been described as a presently received image frame and image frame 802b has been described as a previously temporally filtered image frame. In another embodiment, image frames 802a and 802b may be first and second image frames captured by infrared imaging module 100 that have not been temporally filtered.

Figure 10:
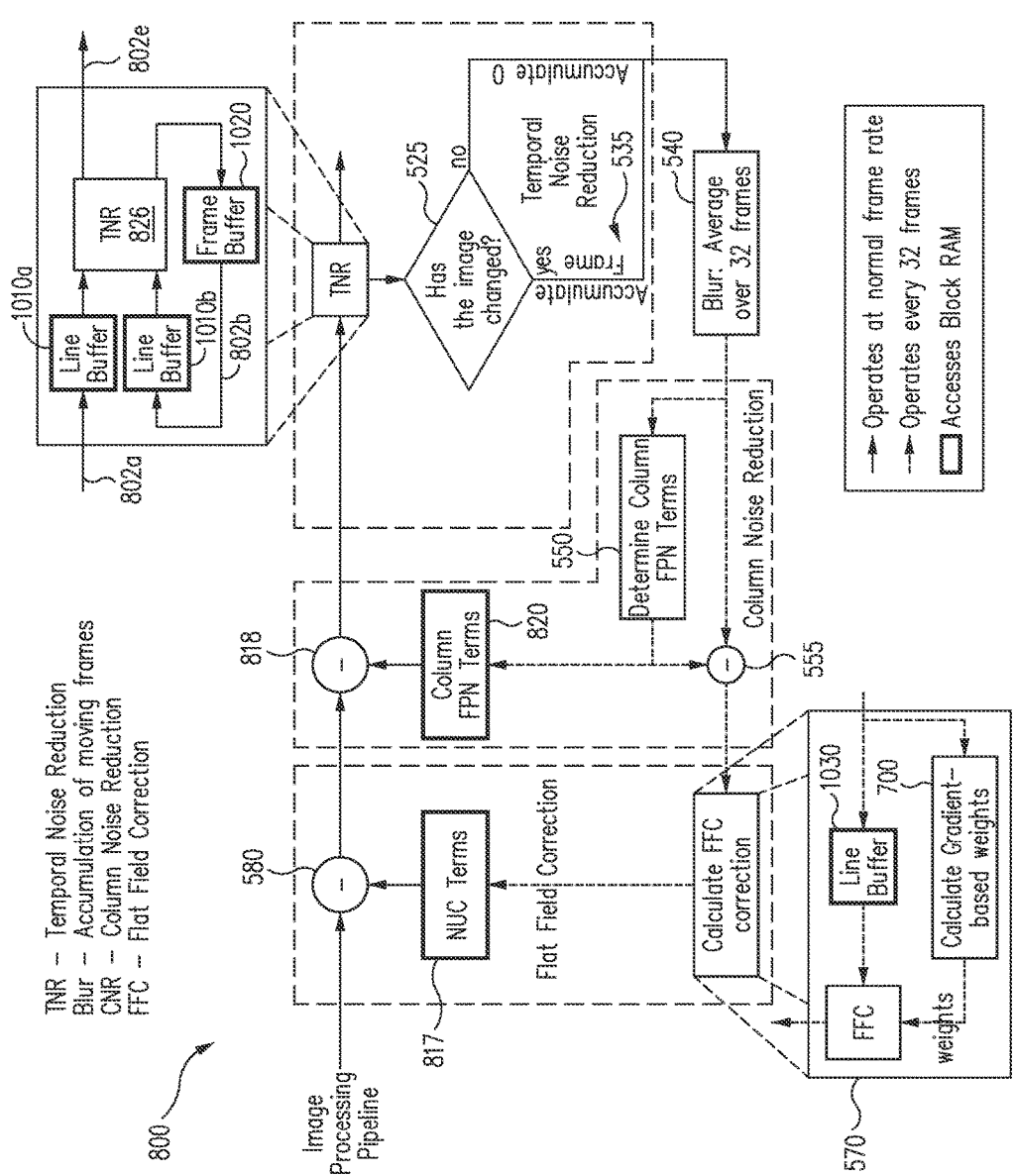
FIG. 10 illustrates particular implementation details of several processes of the image processing pipeline of FIG. 8 in accordance with an embodiment of the disclosure.

FIG. 10 illustrates further implementation details in relation to the TNR process of block 826. As shown in FIG. 10, image frames 802a and 802b may be read into line buffers 1010a and 1010b, respectively, and image frame 802b (e.g., the previous image frame) may be stored in a frame buffer 1020 before being read into line buffer 1010b. In one embodiment, line buffers 1010a-b and frame buffer 1020 may be implemented by a block of random access memory (RAM) provided by any appropriate component of infrared imaging module 100 and/or host device 102.

Referring again to FIG. 8, image frame 802e may be passed to an automatic gain compensation block 828 for further processing to provide a result image frame 830 that may be used by host device 102 as desired.

FIG. 8 further illustrates various operations that may be performed to determine row and column FPN terms and NUC terms as discussed. In one embodiment, these operations may use image frames 802e as shown in FIG. 8. Because image frames 802e have already been temporally filtered, at least some temporal noise may be removed and thus will not inadvertently affect the determination of row and column FPN terms 824 and 820 and NUC terms 817. In another embodiment, non-temporally filtered image frames 802 may be used.

In FIG. 8, blocks 510, 515, and 520 of FIG. 5 are collectively represented together. As discussed, a NUC process may be selectively initiated and performed in response to various NUC process initiating events and based on various criteria or conditions. As also discussed, the NUC process may be performed in accordance with a motion-based approach (blocks 525, 535, and 540) or a defocus-based approach (block 530) to provide a blurred image frame (block 545). FIG. 8 further illustrates various additional blocks 550, 552, 555, 560, 565, 570, 571, 572, 573, and 575 previously discussed with regard to FIG. 5.

As shown in FIG. 8, row and column FPN terms 824 and 820 and NUC terms 817 may be determined and applied in an iterative fashion such that updated terms are determined using image frames 802 to which previous terms have already been applied. As a result, the overall process of FIG. 8 may repeatedly update and apply such terms to continuously reduce the noise in image frames 830 to be used by host device 102.

Referring again to FIG. 10, further implementation details are illustrated for various blocks of FIGS. 5 and 8 in relation to pipeline 800. For example, blocks 525, 535, and 540 are shown as operating at the normal frame rate of image frames 802 received by pipeline 800. In the embodiment shown in FIG. 10, the determination made in block 525 is represented as a decision diamond used to determine whether a given image frame 802 has sufficiently changed such that it may be considered an image frame that will enhance the blur if added to other image frames and is therefore accumulated (block 535 is represented by an arrow in this embodiment) and averaged (block 540).

Also in FIG. 10, the determination of column FPN terms 820 (block 550) is shown as operating at an update rate that in this example is ⅟32 of the sensor frame rate (e.g., normal frame rate) due to the averaging performed in block 540. Other update rates may be used in other embodiments. Although only column FPN terms 820 are identified in FIG. 10, row FPN terms 824 may be implemented in a similar fashion at the reduced frame rate.

FIG. 10 also illustrates further implementation details in relation to the NUC determination process of block 570. In this regard, the blurred image frame may be read to a line buffer 1030 (e.g., implemented by a block of RAM provided by any appropriate component of infrared imaging module 100 and/or host device 102). The flat field correction technique 700 of FIG. 7 may be performed on the blurred image frame.

In view of the present disclosure, it will be appreciated that techniques described herein may be used to remove various types of FPN (e.g., including very high amplitude FPN) such as spatially correlated row and column FPN and spatially uncorrelated FPN.

Other embodiments are also contemplated. For example, in one embodiment, the rate at which row and column FPN terms and/or NUC terms are updated can be inversely proportional to the estimated amount of blur in the blurred image frame and/or inversely proportional to the magnitude of local contrast values (e.g., determined in block 560).

In various embodiments, the described techniques may provide advantages over conventional shutter-based noise correction techniques. For example, by using a shutterless process, a shutter (e.g., such as shutter 105) need not be provided, thus permitting reductions in size, weight, cost, and mechanical complexity. Power and maximum voltage supplied to, or generated by, infrared imaging module 100 may also be reduced if a shutter does not need to be mechanically operated. Reliability will be improved by removing the shutter as a potential point of failure. A shutterless process also eliminates potential image interruption caused by the temporary blockage of the imaged scene by a shutter.

Also, by correcting for noise using intentionally blurred image frames captured from a real world scene (not a uniform scene provided by a shutter), noise correction may be performed on image frames that have irradiance levels similar to those of the actual scene desired to be imaged. This can improve the accuracy and effectiveness of noise correction terms determined in accordance with the various described techniques.

As discussed, in various embodiments, infrared imaging module 100 may be configured to operate at low voltage levels. In particular, infrared imaging module 100 may be implemented with circuitry configured to operate at low power and/or in accordance with other parameters that permit infrared imaging module 100 to be conveniently and effectively implemented in various types of host devices 102, such as mobile devices and other devices.

Figure 12:
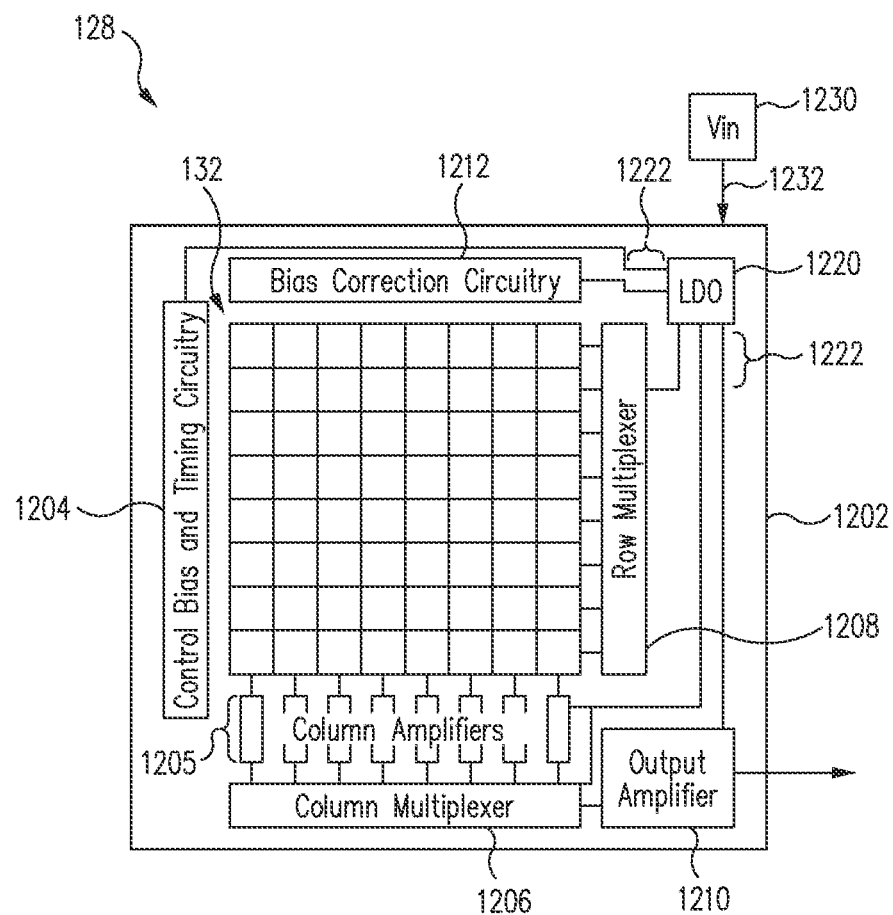
FIG. 12 illustrates a block diagram of another implementation of an infrared sensor assembly including an array of infrared sensors and a low-dropout regulator in accordance with an embodiment of the disclosure.

For example, FIG. 12 illustrates a block diagram of another implementation of infrared sensor assembly 128 including infrared sensors 132 and an LDO 1220 in accordance with an embodiment of the disclosure. As shown, FIG. 12 also illustrates various components 1202, 1204, 1205, 1206, 1208, and 1210 which may implemented in the same or similar manner as corresponding components previously described with regard to FIG. 4. FIG. 12 also illustrates bias correction circuitry 1212 which may be used to adjust one or more bias voltages provided to infrared sensors 132 (e.g., to compensate for temperature changes, self-heating, and/or other factors).

In some embodiments, LDO 1220 may be provided as part of infrared sensor assembly 128 (e.g., on the same chip and/or wafer level package as the ROIC). For example, LDO 1220 may be provided as part of an FPA with infrared sensor assembly 128. As discussed, such implementations may reduce power supply noise introduced to infrared sensor assembly 128 and thus provide an improved PSRR. In addition, by implementing the LDO with the ROIC, less die area may be consumed and fewer discrete die (or chips) are needed.

LDO 1220 receives an input voltage provided by a power source 1230 over a supply line 1232. LDO 1220 provides an output voltage to various components of infrared sensor assembly 128 over supply lines 1222. In this regard, LDO 1220 may provide substantially identical regulated output voltages to various components of infrared sensor assembly 128 in response to a single input voltage received from power source 1230, in accordance with various techniques described in, for example, U.S. patent application Ser. No. 14/101,245 filed Dec. 9, 2013 incorporated herein by reference in its entirety.

For example, in some embodiments, power source 1230 may provide an input voltage in a range of approximately 2.8 volts to approximately 11 volts (e.g., approximately 2.8 volts in one embodiment), and LDO 1220 may provide an output voltage in a range of approximately 1.5 volts to approximately 2.8 volts (e.g., approximately 2.8, 2.5, 2.4, and/or lower voltages in various embodiments). In this regard, LDO 1220 may be used to provide a consistent regulated output voltage, regardless of whether power source 1230 is implemented with a conventional voltage range of approximately 9 volts to approximately 11 volts, or a low voltage such as approximately 2.8 volts. As such, although various voltage ranges are provided for the input and output voltages, it is contemplated that the output voltage of LDO 1220 will remain fixed despite changes in the input voltage.

The implementation of LDO 1220 as part of infrared sensor assembly 128 provides various advantages over conventional power implementations for FPAs. For example, conventional FPAs typically rely on multiple power sources, each of which may be provided separately to the FPA, and separately distributed to the various components of the FPA. By regulating a single power source 1230 by LDO 1220, appropriate voltages may be separately provided (e.g., to reduce possible noise) to all components of infrared sensor assembly 128 with reduced complexity. The use of LDO 1220 also allows infrared sensor assembly 128 to operate in a consistent manner, even if the input voltage from power source 1230 changes (e.g., if the input voltage increases or decreases as a result of charging or discharging a battery or other type of device used for power source 1230).

The various components of infrared sensor assembly 128 shown in FIG. 12 may also be implemented to operate at lower voltages than conventional devices. For example, as discussed, LDO 1220 may be implemented to provide a low voltage (e.g., approximately 2.5 volts). This contrasts with the multiple higher voltages typically used to power conventional FPAs, such as: approximately 3.3 volts to approximately 5 volts used to power digital circuitry; approximately 3.3 volts used to power analog circuitry; and approximately 9 volts to approximately 11 volts used to power loads. Also, in some embodiments, the use of LDO 1220 may reduce or eliminate the need for a separate negative reference voltage to be provided to infrared sensor assembly 128.

Figure 13:
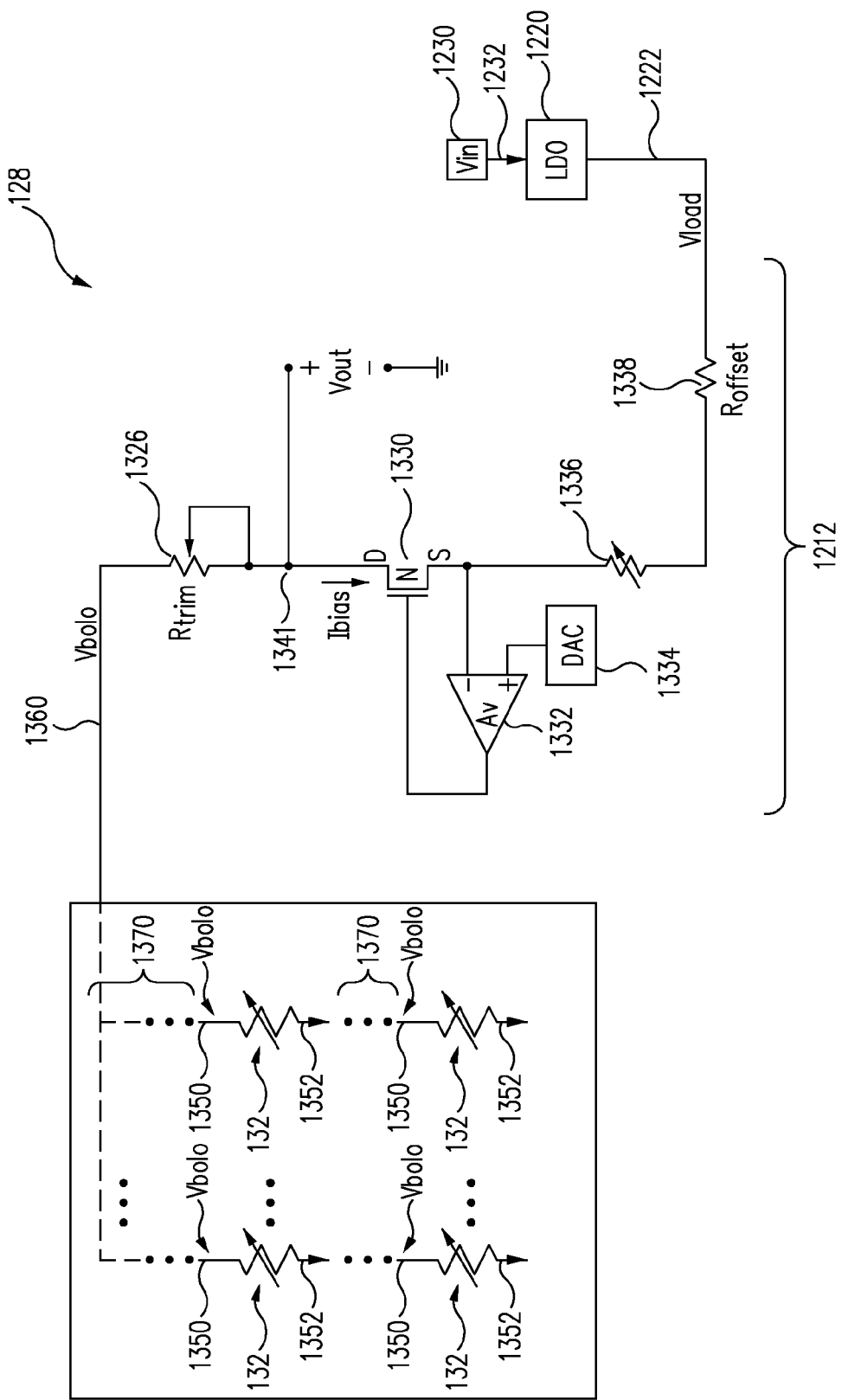
FIG. 13 illustrates a circuit diagram of a portion of the infrared sensor assembly of FIG. 12 in accordance with an embodiment of the disclosure.

Additional aspects of the low voltage operation of infrared sensor assembly 128 may be further understood with reference to FIG. 13. FIG. 13 illustrates a circuit diagram of a portion of infrared sensor assembly 128 of FIG. 12 in accordance with an embodiment of the disclosure. In particular, FIG. 13 illustrates additional components of bias correction circuitry 1212 (e.g., components 1326, 1330, 1332, 1334, 1336, 1338, and 1341) connected to LDO 1220 and infrared sensors 132. For example, bias correction circuitry 1212 may be used to compensate for temperature-dependent changes in bias voltages in accordance with an embodiment of the present disclosure. The operation of such additional components may be further understood with reference to similar components identified in U.S. Pat. No. 7,679,048 issued Mar. 16, 2010 which is hereby incorporated by reference in its entirety. Infrared sensor assembly 128 may also be implemented in accordance with the various components identified in U.S. Pat. No. 6,812,465 issued Nov. 2, 2004 which is hereby incorporated by reference in its entirety.

In various embodiments, some or all of the bias correction circuitry 1212 may be implemented on a global array basis as shown in FIG. 13 (e.g., used for all infrared sensors 132 collectively in an array). In other embodiments, some or all of the bias correction circuitry 1212 may be implemented an individual sensor basis (e.g., entirely or partially duplicated for each infrared sensor 132). In some embodiments, bias correction circuitry 1212 and other components of FIG. 13 may be implemented as part of ROIC 1202.

As shown in FIG. 13, LDO 1220 provides a load voltage Vload to bias correction circuitry 1212 along one of supply lines 1222. As discussed, in some embodiments, Vload may be approximately 2.5 volts which contrasts with larger voltages of approximately 9 volts to approximately 11 volts that may be used as load voltages in conventional infrared imaging devices.

Based on Vload, bias correction circuitry 1212 provides a sensor bias voltage Vbolo at a node 1360. Vbolo may be distributed to one or more infrared sensors 132 through appropriate switching circuitry 1370 (e.g., represented by broken lines in FIG. 13). In some examples, switching circuitry 1370 may be implemented in accordance with appropriate components identified in U.S. Pat. Nos. 6,812,465 and 7,679,048 previously referenced herein.

Each infrared sensor 132 includes a node 1350 which receives Vbolo through switching circuitry 1370, and another node 1352 which may be connected to ground, a substrate, and/or a negative reference voltage. In some embodiments, the voltage at node 1360 may be substantially the same as Vbolo provided at nodes 1350. In other embodiments, the voltage at node 1360 may be adjusted to compensate for possible voltage drops associated with switching circuitry 1370 and/or other factors.

Vbolo may be implemented with lower voltages than are typically used for conventional infrared sensor biasing. In one embodiment, Vbolo may be in a range of approximately 0.2 volts to approximately 0.7 volts. In another embodiment, Vbolo may be in a range of approximately 0.4 volts to approximately 0.6 volts. In another embodiment, Vbolo may be approximately 0.5 volts. In contrast, conventional infrared sensors typically use bias voltages of approximately 1 volt.

The use of a lower bias voltage for infrared sensors 132 in accordance with the present disclosure permits infrared sensor assembly 128 to exhibit significantly reduced power consumption in comparison with conventional infrared imaging devices. In particular, the power consumption of each infrared sensor 132 is reduced by the square of the bias voltage. As a result, a reduction from, for example, 1.0 volt to 0.5 volts provides a significant reduction in power, especially when applied to many infrared sensors 132 in an infrared sensor array. This reduction in power may also result in reduced self-heating of infrared sensor assembly 128.

In accordance with additional embodiments of the present disclosure, various techniques are provided for reducing the effects of noise in image frames provided by infrared imaging devices operating at low voltages. In this regard, when infrared sensor assembly 128 is operated with low voltages as described, noise, self-heating, and/or other phenomena may, if uncorrected, become more pronounced in image frames provided by infrared sensor assembly 128.

For example, referring to FIG. 13, when LDO 1220 maintains Vload at a low voltage in the manner described herein, Vbolo will also be maintained at its corresponding low voltage and the relative size of its output signals may be reduced. As a result, noise, self-heating, and/or other phenomena may have a greater effect on the smaller output signals read out from infrared sensors 132, resulting in variations (e.g., errors) in the output signals. If uncorrected, these variations may be exhibited as noise in the image frames. Moreover, although low voltage operation may reduce the overall amount of certain phenomena (e.g., self-heating), the smaller output signals may permit the remaining error sources (e.g., residual self-heating) to have a disproportionate effect on the output signals during low voltage operation.

To compensate for such phenomena, infrared sensor assembly 128, infrared imaging module 100, and/or host device 102 may be implemented with various array sizes, frame rates, and/or frame averaging techniques. For example, as discussed, a variety of different array sizes are contemplated for infrared sensors 132. In some embodiments, infrared sensors 132 may be implemented with array sizes ranging from 32 by 32 to 160 by 120 infrared sensors 132. Other example array sizes include 80 by 64, 80 by 60, 64 by 64, and 64 by 32. Any desired array size may be used.

Advantageously, when implemented with such relatively small array sizes, infrared sensor assembly 128 may provide image frames at relatively high frame rates without requiring significant changes to ROTC and related circuitry. For example, in some embodiments, frame rates may range from approximately 120 Hz to approximately 480 Hz.

In some embodiments, the array size and the frame rate may be scaled relative to each other (e.g., in an inversely proportional manner or otherwise) such that larger arrays are implemented with lower frame rates, and smaller arrays are implemented with higher frame rates. For example, in one embodiment, an array of 160 by 120 may provide a frame rate of approximately 120 Hz. In another embodiment, an array of 80 by 60 may provide a correspondingly higher frame rate of approximately 240 Hz. Other frame rates are also contemplated.

By scaling the array size and the frame rate relative to each other, the particular readout timing of rows and/or columns of the FPA may remain consistent, regardless of the actual FPA size or frame rate. In one embodiment, the readout timing may be approximately 63 microseconds per row or column.

As previously discussed with regard to FIG. 8, the image frames captured by infrared sensors 132 may be provided to a frame averager 804 that integrates multiple image frames to provide image frames 802 (e.g., processed image frames) with a lower frame rate (e.g., approximately 30 Hz, approximately 60 Hz, or other frame rates) and with an improved signal to noise ratio. In particular, by averaging the high frame rate image frames provided by a relatively small FPA, image noise attributable to low voltage operation may be effectively averaged out and/or substantially reduced in image frames 802. Accordingly, infrared sensor assembly 128 may be operated at relatively low voltages provided by LDO 1220 as discussed without experiencing additional noise and related side effects in the resulting image frames 802 after processing by frame averager 804.

Other embodiments are also contemplated. For example, although a single array of infrared sensors 132 is illustrated, it is contemplated that multiple such arrays may be used together to provide higher resolution image frames (e.g., a scene may be imaged across multiple such arrays). Such arrays may be provided in multiple infrared sensor assemblies 128 and/or provided in the same infrared sensor assembly 128. Each such array may be operated at low voltages as described, and also may be provided with associated ROIC circuitry such that each array may still be operated at a relatively high frame rate. The high frame rate image frames provided by such arrays may be averaged by shared or dedicated frame averagers 804 to reduce and/or eliminate noise associated with low voltage operation. As a result, high resolution infrared images may be obtained while still operating at low voltages.

In various embodiments, infrared sensor assembly 128 may be implemented with appropriate dimensions to permit infrared imaging module 100 to be used with a small form factor socket 104, such as a socket used for mobile devices. For example, in some embodiments, infrared sensor assembly 128 may be implemented with a chip size in a range of approximately 4.0 mm by approximately 4.0 mm to approximately 5.5 mm by approximately 5.5 mm (e.g., approximately 4.0 mm by approximately 5.5 mm in one example). Infrared sensor assembly 128 may be implemented with such sizes or other appropriate sizes to permit use with socket 104 implemented with various sizes such as: 8.5 mm by 8.5 mm, 8.5 mm by 5.9 mm, 6.0 mm by 6.0 mm, 5.5 mm by 5.5 mm, 4.5 mm by 4.5 mm, and/or other socket sizes such as, for example, those identified in Table 1 of U.S. Provisional Patent Application No. 61/495,873 filed Jun. 10, 2011 incorporated herein by reference in its entirety.

Power systems can generally be used to generate electricity and/or mechanical force, for example. In some embodiments, a power system may include combustion-driven electrical generators, photovoltaic solar systems, and geothermal, solar, or water-flow-driven turbine electrical generators. In further embodiments, a power system may include a combustion, electrical, or water-flow-driven mechanical force generators. For example, a power system may be used to power any type of vehicle, such as airplane, a ship, a train, or a common automobile, or may be used to power a push lawnmower or any other type of mechanical tool. Power systems generating mechanical force may interface with a machine through a drive shaft, an electromagnetic actuator, or through a number of other interface mechanisms.

Systems for monitoring power systems, such as those described here, help leverage power systems for various applications. For example, a monitoring system may be used to accurately monitor and control operation of a power system for efficiency, performance, reliability, and convenience (e.g., scheduling), or any combination of those, and an emphasis in operation of the power system can change over time depending on instant need.

In particular, monitoring systems including various infrared imaging modules 100 described herein have a number of advantages over conventional monitoring systems. For example, infrared imaging modules 100 may be configured to monitor temperatures and conditions of power systems in very high detail and with high accuracy at or near real-time without necessarily being physically integrated into the active components of the power systems. This allows power systems to operate with less down time due to undetected (e.g., due to inaccurate or time-delayed monitoring) potential power system maintenance issues and/or due to monitoring system maintenance, which can take place without having to interrupt operation of the power systems. Each one of infrared imaging modules 100 can be configured to monitor multiple components of power systems at the same time by being aimed such that multiple components are in its field of view (FOV).

In some embodiments, infrared imaging modules 100 can be configured to detect thermal excursions (e.g., abnormal component temperatures) multiple types of gases (e.g., carbon monoxide, fuel fumes), density/partial density of gasses, fluid leaks, component heat capacity, and component thermal conductivity, for example, and can do so without being subject to the types of thermal or other sensor lag present in conventional sensors. Moreover, infrared imaging modules 100 can be configured to record any of the above over time and detect minute changes in the detected component temperatures or conditions. Thus, the monitoring systems described herein can be implemented more easily than conventional monitoring systems and can be used to extract better performance from power systems (e.g., through feedback control) by providing more detailed data that can be acquired more quickly than with conventional sensors.

Figure 14:
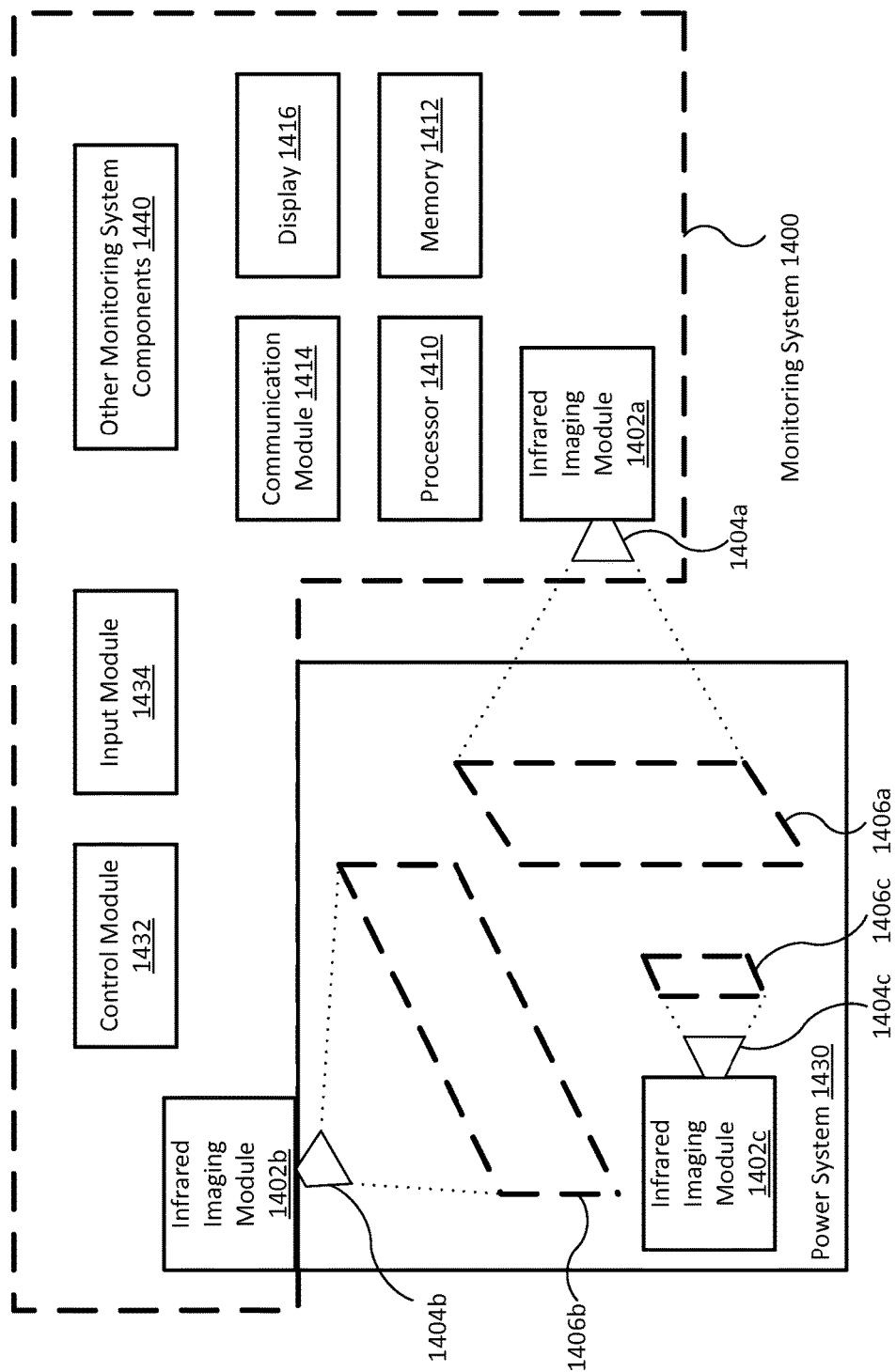
FIG. 14 illustrates a block diagram of a system used to monitor components of a power system in accordance with an embodiment of the disclosure.

Referring now to FIG. 14, FIG. 14 shows a block diagram of a monitoring system 1400 used to monitor components of a power system 1430 in accordance with an embodiment of the disclosure. System 1400 may include one or more infrared imaging modules 1402*a*, 1402*b*, 1402*c*, processor 1410, memory 1412, communication module 1414, display 1416, control module 1432, input module 1434, and other monitoring system components 1440. Where appropriate, elements of system 1400 may be implemented in the same or similar manner as corresponding elements of host device 102 of FIG. 1 and may be configured to perform various NUC processes and other processes as described herein.

In some embodiments, each of infrared imaging modules 1402*a*, 1402*b*, 1402*c* may be a small form factor infrared camera or imaging device implemented in accordance with various embodiments disclosed herein. For example, each one of infrared imaging modules 1402*a*, 1402*b*, 1402*c* may include an FPA implemented in accordance with various embodiments disclosed herein or otherwise where appropriate. In addition, in some embodiments, each of infrared imaging modules 1402*a*, 1402*b*, 1402*c* may be implemented with one or more substantially co-located non-thermal cameras and oriented such that an FOV of a non-thermal camera at least partially overlaps an FOV of a corresponding infrared imaging module. In such embodiments, images and/or image data captured by infrared imaging modules 1402*a*, 1402*b*, 1402*c* may be superimposed, fused, blended, or otherwise combined (e.g., by processor 1410) with images and/or image data captured by one or more non-thermal cameras, as described herein. Each of infrared imaging modules 1402*a*, 1402*b*, 1402*c* may be configured to capture, process, and/or manage infrared images, including thermal images, of a portion of power system 1430.

Infrared imaging modules 1402*a*, 1402*b*, 1402*c* may be mounted throughout power system 1430 so that at least a portion of a component of power system 1430 is within a FOV of at least one infrared imaging module 1402*a*, 1402*b*, 1402*c*. For example, as will be further described with regard to FIG. 16, infrared imaging modules 1402*a*, 1402*b*, 1402*c* may be used in the context of a vehicle or other environment. More generally, infrared imaging modules 1402*a*, 1402*b*, 1402*c* may be positioned/mounted to view any component of power system 1430. For example, power system components that obstruct a desired view may be moved, eliminated, or fitted with infrared-transmissive materials to allow infrared radiation from a desired portion of power system 1430 to reach a particular infrared imaging module.

In some embodiments, each of infrared imaging modules 1402*a*, 1402*b*, 1402*c* may include respective optical elements 1404*a*, 1404*b*, 1404*c* (e.g., infrared-transmissive lenses, infrared-transmissive prisms, infrared-reflective mirrors, infrared fiber optics) that guide infrared radiation from a portion of power system 1430 to FPAs of infrared imaging modules 1402*a*, 1402*b*, 1402*c*. Such optical elements may be used when mounting an infrared imaging module at a particular FOV-defined location is difficult or impossible. For example, a flexible fiber-optic cable may be used to route infrared radiation from within a sealed component, such as a water cooling system line, to an infrared imaging module mounted on a housing of power system 430. Such optical elements may also be used to suitably define or alter an FOV of an infrared imaging module. A switchable FOV (e.g., selectable by a corresponding infrared imaging module and or processor 1410) may optionally be provided to provide alternating far-away and close-up views of a portion of a component of power system 1430.

Infrared images captured, processed, and otherwise managed by infrared imaging modules 1402*a*, 1402*b*, 1402*c* may be radiometrically normalized infrared images (e.g., thermal images). Pixels that make up a captured image may contain calibrated thermal data (e.g., absolute temperatures). As discussed above in connection with infrared imaging module 100 of FIG. 1, each of infrared imaging modules 1402*a*, 1402*b*, 1402*c* and/or associated components may be calibrated using appropriate techniques so that images captured by the infrared imaging modules are properly calibrated thermal images. In some embodiments, appropriate calibration processes may be performed periodically by each of the infrared imaging modules and/or processor 1410 so that the infrared imaging modules and their captured thermal images maintain accurate calibration.

Processor 1410 may be implemented as any appropriate processing device as described with regard to processor 195 in FIG. 1. In some embodiments, processor 1410 may be part of or implemented with other conventional processors and control electronics that may be installed with power system 1430 or with a machine powered by power system 1430. For example, a vehicle powered by power system 1430 may include a processor or control electronics for controlling and monitoring various mechanical operations of a power system or a powered vehicle, a processor for an entertainment and vehicle information system, a processor for a navigation system, and/or a processor for a remote diagnostics system, any of which may be used to implement all or part of processor 1410. In other embodiments, processor 1410 may interface and communicate with such other control electronics and processors as well as any power system components associated with such processors. In some embodiments, processor 1410 may be configured to control, monitor, and or communicate with power system 1430, for example, and in some embodiments, do so according to a schedule set by a user, a technician, or by default at a factory. Such schedule may determine whether a maintenance indication is provided to a user, for example, or to determine when one or more power system components are enabled.

Processor 1410 may be configured to interface and communicate with other components of system 1400 to perform methods and processes described herein, including to provide control signals to one or more components of power system 1430. Processor 1410 may be configured to receive thermal images of at least a portion of a component of power system 1430 captured by an infrared imaging module, perform thermal image processing operations as further described herein, and extract data from thermal image to, for example, determine a condition of the portion of the component, of the component, or of other components of power system 1430. Processor 1410 may also be configured to compile, analyze, or otherwise process extracted data, thermal images, and determined conditions to generate monitoring information about the components of power system 1430, such as monitoring information about detected conditions of components of power system 1430.

For example, processor 1410 may determine, from calibrated thermal images provided by one or more of infrared imaging modules 1402a, 1402b, 1402c, aggregate temperature of a component or temperature of a specific portion of a component. Processor 1410 may generate monitoring information that includes, for example, a temperature reading based on the determined temperature. Processor 1410 may further determine whether the temperature of a component is within a normal operating temperature range, and generate monitoring information that includes a notification or alarm indicating the temperature is outside a safe range.

In another example, processor 1410 may perform various thermal image processing operations and thermal image analytics on thermal images of a portion of a power system component to obtain temperature distribution and variance profiles of the power system component. Processor 1410 may correlate and/or match the obtained profiles to those of abnormal conditions to detect, for example, a clogged or leaking water or oil cooling system, a malfunctioning water or oil pump, a leaking combustion chamber inlet or exhaust valve, a non-optimal air/fuel mixture, a failing bearing, an overheating combustion engine component or electric motor component, an exhaust system leak, a build-up of debris on an inner surface of a component, a failing high voltage (HV) battery, or other conditions, as further described herein.

In yet another example, processor 1410 may perform various thermal image processing operations and thermal image analytics on thermal images of a combustion engine (e.g., including an intake manifold, a cylinder head, an exhaust manifold, a crankcase, a turbo, and aftercooler), an electric motor (e.g., including power switching circuitry, a rotor, motor windings, bearings), and/or other power system components to detect cracks, leaks, foreign objects, deformation, and other abnormal conditions. Based on the detection, processor 1410 may generate monitoring information that includes an alarm or other visual or audible notifications that indicate abnormal conditions and/or descriptions of abnormal conditions.

In some embodiments, processor 1410 may be configured to convert thermal images of portions of power system 1430 into user-viewable images (e.g., thermograms) using appropriate methods and algorithms. For example, thermographic data contained in thermal images may be converted into gray-scaled or color-scaled pixels to construct images that can be viewed on a display. In some embodiments, thermographic data and/or thermograms may be combined with images and/or image data captured by one or more non-thermal cameras (e.g., through superposition, fusing, blending, and/or other combining methods) to construct user-viewable images. User-viewable images may optionally include a legend or scale that indicates the approximate temperature of corresponding pixel color and/or intensity. Such user-viewable images, if presented on a display (e.g., display 1416), may be used to confirm or better understand abnormal conditions detected by system 1400. Monitoring information generated by processor 1410 may include such user-viewable images.

Memory 1412 may include one or more memory devices to store data and information, including thermal images and monitoring information. The memory devices may include various types of memory for thermal image and other information storage including volatile and non-volatile memory devices, such as RAM (Random Access Memory), ROM (Read-Only Memory), EEPROM (Electrically-Erasable Read-Only Memory), flash memory, or a disk drive. In one embodiment, thermal images and monitoring information stored in the memory devices may be retrieved (e.g., by a technician using appropriate readers and/or diagnostic tools) for purposes of reviewing and further diagnosing the condition of components monitored by system 1400. In some embodiments, processor 1410 may be configured to execute software instructions stored on memory 1412 to perform various methods, processes, or operations in the manner described herein.

Display 1416 may be configured to present, indicate, or otherwise convey monitoring information generated by processor 1410. In one embodiment, display 1416 may be implemented with various lighted icons, symbols, indicators, and/or analog gauges which may be similar to conventional indicators, gauges, and warning lights on a power system instrument panel. The lighted icons, symbols, and/or indicators may indicate one or more notifications or alarms associated with the monitoring information. The lighted icons, symbols, or indicators may also be complemented with an alpha-numeric display panel (e.g., a segmented LED panel) to display letters and numbers representing other monitoring information, such as a temperature reading, a description or classification of detected abnormal conditions, etc.

In other embodiments, display 1416 may be implemented with an electronic display screen, such as a liquid crystal display (LCD), a cathode ray tube (CRT), or various other types of generally known video displays and monitors, including touch-sensitive displays. Display 1416 may be suitable for presenting user-viewable thermal images converted by processor 1410 from thermal images captured by infrared imaging modules. It is contemplated that conventional information display screens, such as those typically found in a vehicle powered by power system 1430 (e.g., for interfacing with an on-board entertainment system, displaying navigation information, displaying rear view camera images, and displaying various other types of vehicle information) may be utilized as display 1416.

Communication module 1414 may be configured to facilitate communication and interfacing between various components of system 1400. For example, elements such as infrared imaging modules 1402a, 1402b, 1402c, display 1416, control module 1432, input module 1434, and/or other monitoring system components 1440 may transmit and receive data to and from processor 1410 through communication module 1414, which may manage wired and/or wireless connections (e.g., through proprietary RF links, proprietary infrared links, and/or standard wireless communication protocols such as IEEE 802.11 WiFi standards and Bluetooth™) between the various components. Such wireless connections may allow infrared imaging modules to be mounted where it would not be convenient to provide wired connections, for example, such as on rotating or otherwise moving components.

Communication module 1414 may be further configured to allow components of system 1400 to communicate and interface with other existing electronic components of power system 1430 or a machine powered by power system 1430. For example, processor 1410 may communicate, via communication module 1414, with a power system electronic control unit (ECU), a vehicle information and entertainment system, a vehicle navigation system, and other existing sensors and electronic components. In this regard, communication module 1414 may support various interfaces, protocols, and standards for networking, such as the controller area network (CAN) bus, the vehicle area network (VAN) standard, the local interconnect network (LIN) bus, the media oriented systems transport (MOST) network, or the ISO 11738 (or ISO bus) standard. Furthermore, communication module may be configured to send control signals generated by processor 1410 using these interfaces and protocols.

In some embodiments, system 1400 may include a number of communication modules 1414 adapted for various applications of system 1400 on various types of power systems. In other embodiments, communication module 1414 may be integrated into or implemented as part of various other components of system 1400. For example, infrared imaging modules 1402a, 1402b, 1402c, processor 1410, and display 1416 may each comprise a subcomponent that may be configured to perform the operations of communication module 1414, and may communicate with one another via wired and/or wireless connections without a separate communication module 1414.

Control module 1432 may include one or more modules configured to provide direct control signals to power system 1430, for example, without having to rely on communication module 1414 and associated protocols to communicate with control electronics of power system 1430. As such, control module 1432 may be any module that can interface directly with one or more components of power system 1430, such as an intake manifold or a turbo, for example, to control those components operation directly (e.g., an air/fuel mixture, or a boost pressure). In some embodiments, control module 1432 can be configured to allow system 1400 to override control electronics of power system 1430, or to provide additional control not provided by control electronics of power system 1430.

In similar fashion, input module 1434 may include one or more modules configured to receive direct monitoring signals from power system 1430, for example, without having to rely on communication module 1414 and associated protocols to communicate with control electronics of power system 1430. As such, input module 1434 may be any module that can interface directly with one or more components of power system 1430, such as an intake manifold or a turbo, for example, to receive monitoring signals from those components directly (e.g., signals indicating an air/fuel mixture, or a boost pressure). In some embodiments, input module 1434 can be configured to allow system 1400 to ignore monitoring signals provided by control electronics of power system 1430, or to provide additional monitoring signals not provided by control electronics of power system 1430. In some embodiments, control module 1432 and input module 1434 may be configured to allow system 1400 to provide a closed loop option for monitoring and control of one or more components of power system 1430 that is separate from the control electronics of power system 1430.

Other system components 1440 may include, in some embodiments, other sensors such as a temperature sensor (e.g., a thermocouple, an infrared thermometer), a moisture sensor, a conventional digital camera, an electrical sensor (e.g., a volt/current/resistance meter), and/or a pressure sensor (e.g., a barometer). Sensors such as a temperature, moisture, or pressure sensor may be utilized by processor 1410 to compensate for environmental conditions, and thereby obtain a more accurate analysis of thermal images and derived conditions of various components of power system 1430. Sensors such as a conventional digital camera and electrical sensor may provide reference data points and/or context information that may be utilized by processor 1410 to obtain a more accurate analysis of thermal images and derived conditions of various components of power system 1430. Further examples of context information are provided below with reference to FIG. 18.

Other system components 1440 may also include any other device as may be beneficial for various applications of system 1400. In some embodiments, other system components 1440 may include a chime, a speaker with associated circuitry for generating a tone, or other devices that may be used to sound an audible alarm or notification based on monitoring information generated by processor 1410. In further embodiments, other system components 1440 may include a user interface to accept user input of, for example, a desired performance of power system 1430, a notification setting of system 1400, external sensor data, or context information.

In various embodiments, one or more components of system 1400 may be combined and/or implemented or not, depending on application requirements. For example, processor 1410 may be combined with any of infrared imaging modules 1402a, 1402b, 1402c, memory 1412, display 1416, and/or communication module 1414. In another example, processor 1410 may be combined with any of infrared imaging sensors 1402a, 1402b, 1402c with only certain operations of processor 1410 performed by circuitry (e.g., a processor, logic device, microprocessor, microcontroller, etc.) within any of the infrared imaging modules.

Thus, system 1400 may be mounted on, installed in, or otherwise integrated into power system 1430 to provide on-board and real-time monitoring of the condition of various power system components, such as combustion engines, electric motors, HV batteries, HV generators, housings, water/oil cooling systems, transmissions, etc. For example, system 1400 may be used for on-board and real-time monitoring of the condition of power system 1430 when used to provide power to a vehicle and detect abnormalities of a crack formation, a carbon monoxide or fuel leak, and above-normal temperatures. It is also contemplated that system 1400 may be adapted or modified to monitor various other components of a machine powered by power system 1430.

Figure 15:
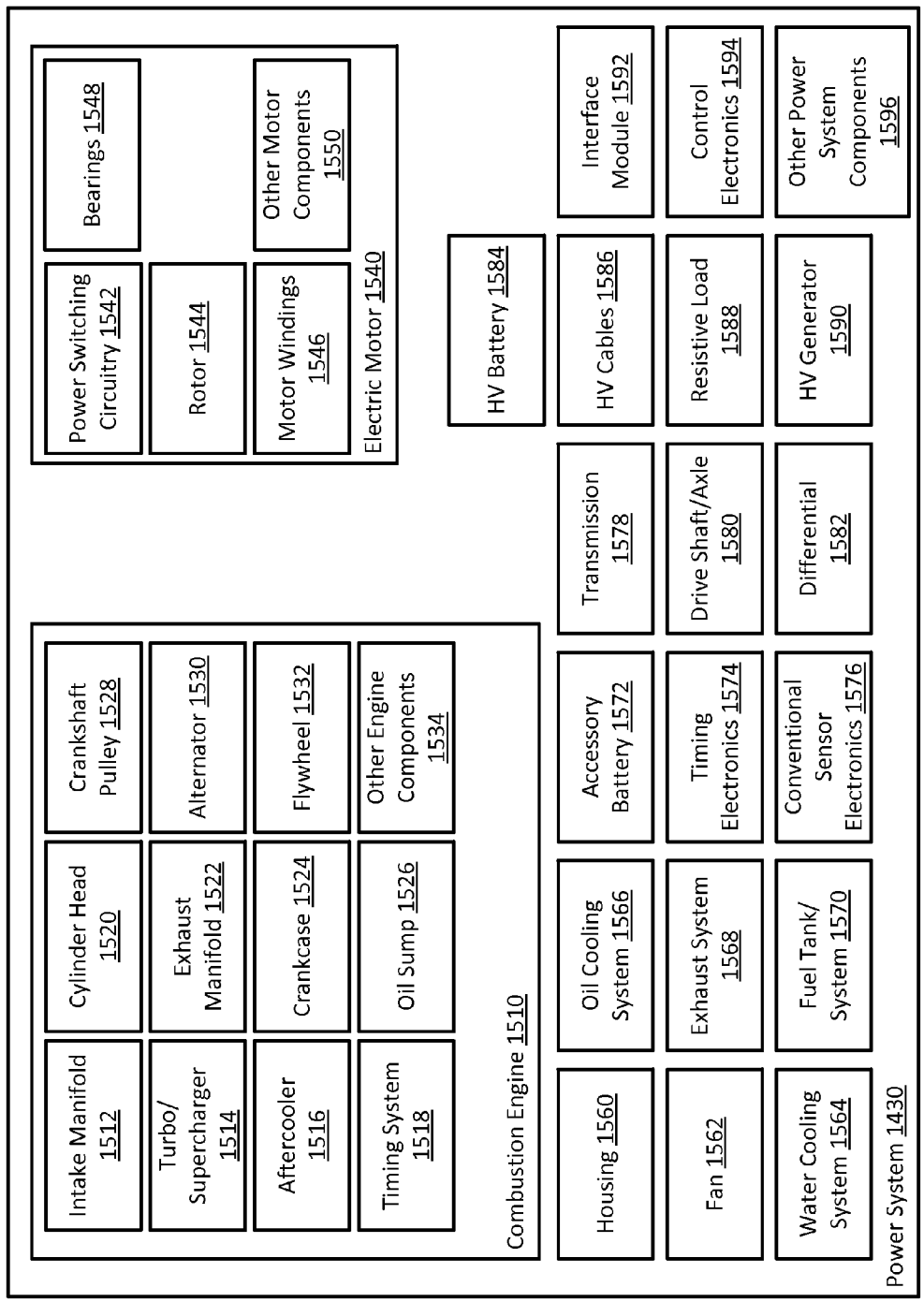
FIG. 15 illustrates a block diagram of various components of a power system in accordance with an embodiment of the disclosure.

FIG. 15 illustrates a non-exclusive group of components of power system 1430 that can be monitored by system 1400. For example, power system 1430 may include one or more of a combustion engine 1510, an electric motor 1540, and other power system components configured to support operation of combustion engine 1510 or electric motor 1540 and to conform the mechanical advantage of power system 1430 to a particular application. Although not explicitly shown in FIG. 15, power system 1430 may additionally or alternatively include other types of power generating devices, such as a thermal engine powered by thermal gradients and reservoirs, for example, and electric generators powered by chemical, photonic and/or external mechanical forces (e.g., wind, tides, kinetic motion). FIG. 15 should not be construed as an exclusive set or number of power system components that can be monitored and/or controlled by a system similar to system 1400, and any groupings of power system components in FIG. 15 are provided for descriptive and organizational purposes only. Furthermore, in some embodiments, power systems may include one or more of each component in FIG. 15 in addition to other power system components not explicitly indicated in FIG. 15.

Combustion engine 1510 may be a petrol, diesel, natural gas, propane, or any other type of combustion engine, for example, and include a number of components configured to conform operation of combustion engine 1510 and power system 1430 to a particular application. For example, intake manifold 1512, which may be used to combine air and fuel and deliver the mixture to a combustion chamber of combustion engine 1510, may be configured to adjust the volume of fuel or air or mixture delivered to each combustion chamber of combustion engine 1510 according to a desired power output and/or efficiency. An optimal adjustment can depend on the temperature of the fuel, air, or air/fuel mixture delivered to the intake manifold as well as the real-time temperature of the combustion chamber.

Turbocharger ("turbo") 1514, which may be closely linked to intake manifold 1512, may be configured to use exhaust gasses to power a turbine that increases (e.g., boosts) the pressure of the air and/or air/fuel mixture delivered to intake manifold 1512, and its effectiveness and condition can be monitored by detecting its absolute temperature as well as the thermal gradients between inlet and outlet ports both for the exhaust gasses and for the delivered air. In some embodiments, turbo 1514 may include a wastegate, variable internal geometry, and/or actuator relief valves to adjust a boost delivered to intake manifold 1512. In further embodiments, power system 1430 may additionally or alternatively include a supercharger that also boosts the pressure of air and/or air/fuel mixture delivered to intake manifold 1512 (e.g., and is similarly adjusted), but where the supercharger derives boost power from a mechanic link to, for example, crankshaft pulley 1528 of combustion engine 1510.

Aftercooler 1516, also closely linked to the intake manifold, may be a sealed radiator-like device configured to extract heat from the adiabatically compressed air delivered by turbo 1514 to increase the effectiveness of turbo 1514 and increase the density of compressed air delivered to intake manifold 1512. The inlet and outlet temperatures of, for example, cooling water provided to aftercooler 1516, as well as the compressed air, can indicate the effectiveness and condition of aftercooler 1516. In some embodiments, one or more additional aftercoolers may be placed elsewhere in power system 1430 to cool heated gasses used or produced by power system 1430.

Timing system 1518 may be a mechanical and/or electrical device used to time the combustion cycle of combustion chambers of combustion engine 1510, and improper timing can cause abnormal temperatures throughout the components coupled to intake manifold 1512, cylinder head 1520, and exhaust manifold 1522. In some embodiments, cylinder head 1520 may be used to seal off oil used to lubricate cams and valves servicing a combustion chamber. The cylinder head oil is typically in thermal equilibrium with the moving components of the combustion chamber, and the cylinder head is typically in thermal equilibrium with the cylinder head oil, and so abnormal cylinder head temperatures often indicate abnormal operation of combustion engine 1510.

Exhaust manifold 1522 may be used to collect exhaust gasses from one or more combustion chambers and deliver them to turbo 1514 and exhaust system 1568. The temperature of the exhaust gasses can indicate proper or improper combustion, operation of inlet or exhaust valves, and operation of turbo 1514, and since exhaust manifold 1522 is typically in thermal equilibrium with the localized exhaust gasses, abnormal exhaust manifold temperatures often indicate abnormal operation of combustion engine 1510.

In likewise fashion, temperatures of crankcase 1524, oil sump 1526, crankshaft pulley 1528, alternator 1530, flywheel 1532, and other engine components 1534 can indicate developing operational problems with combustion engine 1510 and/or the individual components themselves. Other engine components 1534 may include, for example, components such as an oil filter, a fuel pump, oil and/or water cooling lines embedded in combustion engine 1510, bearings allowing motion of components within and protruding through combustion engine 1510, thermal links between components of combustion engine 1510, an air-conditioning compressor, and various components used to interface combustion engine 1510 with other components of power system 1430, a machine powered by power system 1430, or the surrounding environment.

Electric motor 1540 may include a number of components that may be monitored and/or adjusted to conform operation of electric motor 1540 and power system 1430 to a particular application. For example, power switching circuitry 1542, which may be used to deliver the proper polarity electrical power to a particular motor winding 1546 at a particular time, may be configured to adjust the timing or amplitude of the delivered power according to a desired power output and/or efficiency. An optimal adjustment may depend on the temperature of HV battery 1584. Moreover, the temperature of power switching circuitry 1542 can indicate a developing fault prior to a failure of power switching circuitry 1542.

In similar fashion, temperatures of rotor 1544, motor windings 1546, bearings 1548, and other motor components 1550 can indicate developing operational problems with electric motor 1540 and/or the individual components themselves. In addition, such temperatures can indicate the magnitude of an instantaneous or time-averaged mechanical load on electrical motor 1540. Other motor components 1550 may include, for example, components such as ground terminals, a motor casing, and various components used to interface electric motor 1540 with other components of power system 1430, a machine powered by power system 1430, or the surrounding environment.

As noted above, FIG. 15 also includes a number of power system components configured to support operation of a combustion engine, an electric motor, or any other type of power generating device, and to allow power system 1430 to provide power to a particular machine and/or application. For example, housing 1560 may be a sealed, vented, rigid, flexible, or any other type or mixture of types of enclosures that is configured to protect, support, move, or house all or a portion of power system 1430 and, in some embodiments, system 1400. Housing 1560 may be metal, fiberglass, ceramic, carbon fiber, or any other material, for example. In some embodiments, housing 1560 may be light and externally aerodynamic, or may include a number of relatively thin structural pieces bolted or welded together. In further embodiments, housing 1560 may be formed to provide mounting for one or more infrared imaging modules for imaging at least a portion of a component of power system 1430. Portions of housing 1560 may be monitored to detect a weakness or crack in housing 1560, for example, or to detect a temperature of other components thermally linked to housing 1560.

Fan 1562 may be used to cool combustion engine 1510, electric motor 1540, HV battery 1584, water cooling system 1564, oil cooling system 1566, or any other component of power system 1430. A speed of fan 1562 may be adjusted depending on the temperature of an associated power system component, an ambient temperature, a power output of power system 1430, or a fault condition of fan 1562, for example.

In some embodiments, portions of water cooling system 1564 may be situated close to fan 1562. Water cooling system 1564 may include one or more radiators, water lines, water pumps, hoses or tubes for accessing an external body of water, conventional thermostats, and spray nozzles, for example, and may be used to cool combustion engine 1510, electric motor 1540, or any other component of power system 1430. In one embodiment, water cooling system 1564 may be used in conjunction with a sealed aftercooler to cool gasses used or produced by power system 1430. In another embodiment, water cooling system 1564 may include a nozzle configured to spray water into a relatively hot stream of gasses, such as exhaust gasses, to cool the gasses directly. In further embodiments, the absolute and/or differential temperatures of paired inlets and outlets of water cooling system 1564 may be used to determine the efficiency and operational status of water cooling system 1564 and to infer operational status of power system components thermally coupled to water cooling system 1564.

Similarly, oil cooling system 1566 may include one or more radiators, oil lines, oil pumps, and spray nozzles, for example, and may be used to cool combustion engine 1510, electric motor 1540, or any other component of power system 1430. In some embodiments, the absolute and/or differential temperatures of paired inlets and outlets of oil cooling system 1566 may be used to determine the efficiency and operational status of oil cooling system 1566 and to infer operational status of power system components thermally coupled to water cooling system 1566.

Exhaust system 1568 may be attached to exhaust manifold 1522 and include a muffler, a catalytic converter, a particulate scrubber, and tubing from an exhaust manifold to an exhaust port. Temperatures of exhaust system 1568 may indicate proper or improper combustion within engine 1510, for example, or leaks along any portion of exhaust system 1568. In some embodiments, exhaust system 1568 may include selectable elements to adjust a constriction of gas flow in order to provide appropriate back pressure to exhaust manifold 1562, turbo 1514, or other components of power system 1430, for example, and adjust performance of power system 1430. In further embodiments, exhaust system 1568 may include selectable elements to provide heated gas flow to heating elements for heating one or more components of power system 1430 or a machine powered by power system 1430.

Exhaust system 1568 may also include, for example, an aftercooler to cool exhaust gasses before expelling them or delivering them to other elements of exhaust system 1568. In some embodiments, exhaust system 1568 may include an interface with water cooling system 1564 that includes one or more spray nozzles to spray cooling water directly into exhaust gasses delivered by exhaust manifold 1522. Such spray nozzle interfaces may be situated within exhaust manifold 1522, exhaust system 1568, or form a portion of the interface between exhaust manifold 1522 and exhaust system 1568.

Temperatures of fuel system 1570, accessory battery 1572, timing electronics 1574, and conventional sensor electronics 1576 can indicate developing operational problems with power system 1430 and/or the individual components themselves. For example, a temperature of fuel system 1570 may indicate a temperature and/or density of fuel delivered to combustion engine 1510, and may indicate an impending lack of fuel or ignition of fuel in the fuel system. Timing electronics 1574 may be used to electrically control or signal timing of combustion in combustion engine 1510, for example, and may be linked to timing system 1518. Conventional sensor electronics 1576 may provide conventionally measured temperatures and other aspects of operation of power system 1430 to, for example, control electronics 1594 and/or system 1400.

Temperatures of transmission 1578, drive shaft/axle 1580, and differential 1582 can also indicate developing operational problems with power system 1430, the individual components themselves, and/or a machine powered by power system 1430. For example, a high temperature of transmission 1578 and/or differential 1582 may indicate an increased load on a machine coupled to power system 1430 through transmission 1578 and/or differential 1582.

In some embodiments, high voltage (HV) battery 1584 may be used to provide stored electrical power to electric motor 1540, for example, through HV cables 1586. HV generator 1590 may be used to generate electrical power for electric motor 1540, for example, or for storage in HV battery 1584. In some embodiments, stored or generated electricity may be provided to external systems through HV cables 1586. An absolute temperature or temperature gradient across HV battery 1584 may indicate a developing fault, a too high charge or discharge rate, or an age of HV battery 1584, for example. Temperatures of HV cables 1586 and HV generator 1590 may indicate developing operational problems or faults with electric motor 1540 and/or the individual components themselves. Resistive load 1588 may be used to discharge HV battery 1584, HV generator 1590, and power feedback provided by an external force on electric motor 1540, for example. In some embodiments, resistive load 1588 may be adjusted to increase or decrease its resistance according to a desired discharge rate. A temperature of resistive load 1588 may indicate the amount of power delivered to resistive load 1588 by each coupled component, individually or combined.

Interface module 1592 may be used to interface any component or group of components of power system 1430 with an external system, such as system 1400. Thus, system 1400 may directly control operation of power system 1430 through interface module 1592 without a need to communicate with control electronics 1594. Interface module may comprise one or more modules situated throughout power system 1430, and may include servos, actuators, sensors, electrical inputs, pneumatic inputs, and other interface technologies. Control electronics 1594 may be used to control all or any subset of operations of power system 1430 or a machine powered by power system 1430, and in some embodiments, may couple to interface module 1592. Control electronics 1594 may include one or more processors, memories, and communication modules configured to facilitate conventional operation of power system 1430. Temperatures of interface module 1592 and control electronics 1594 may indicate developing electrical faults, environmental overheating (e.g., a fire), or abnormal use of interface module 1592 and control electronics 1594, such as a control-loop fluctuation overusing one or both modules.

Other power system components 1596 may include components such as electrical heaters to moderate temperatures of power system 1430 in cold climates, leveling systems to orient at least portions of powers system 1430 in response to an external acceleration, housing vent actuators to open or close vents in housing 1560 and couple/decouple power system 1430 from ambient conditions, and various components used to interface components of power system 1430 with other components of power system 1430, a machine powered by power system 1430, or the surrounding environment. Temperatures of other power system components 1596 may indicate and/or adjust a condition of one or more components of power system 1430, for example.

Figure 16:
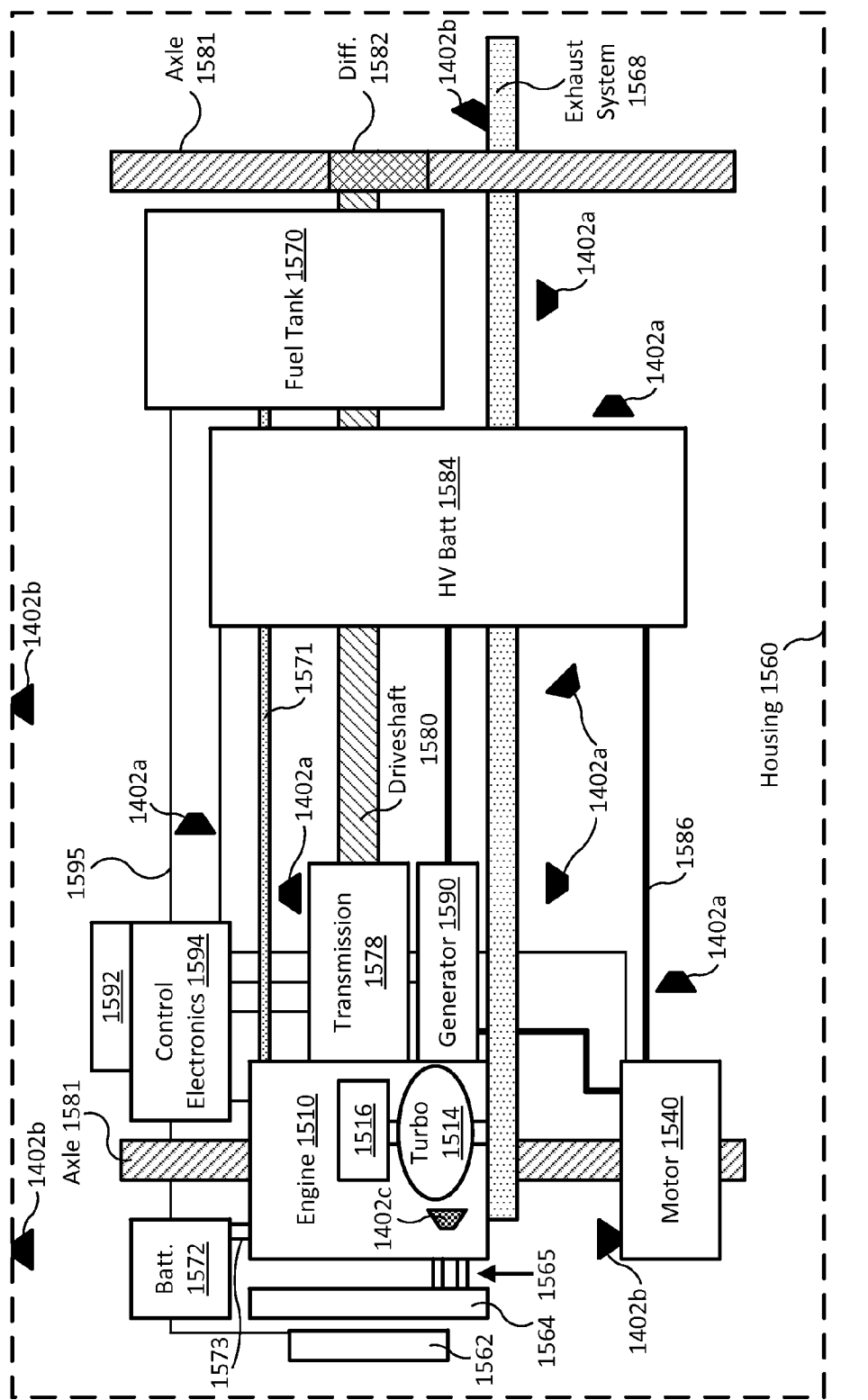
FIG. 16 illustrates a configuration of a system used to monitor components of a power system in accordance with an embodiment of the disclosure.

FIG. 16 illustrates one possible configuration of system 1400 monitoring components of power system 1430. System 1400, as shown in FIG. 16, may be distributed across the entirety of power system 1430, its housing 1560, and/or an apparatus powered by power system 1430, such as a vehicle, and may include multiple infrared imaging modules 1402a, 1402b, 1402c each positioned to view at least a portion of a component of power system 1430. Infrared imaging modules 1402a may be positioned near components of power system 1430, infrared imaging modules 1402b may be mounted on components of power system 1430, and infrared imaging module 1402c may be mounted within a component of power system 1430.

For example, one of infrared imaging modules 1402a in FIG. 16 may be positioned so that a portion of fuel tank 1570 and/or exhaust system 1568 is within FOV 1406a, as illustrated in FIG. 14. In another example, one of infrared imaging modules 1402b may be mounted to a component of power system 1430 (e.g., motor 1540) in FIG. 16 so that a portion of engine 1510, water cooling system 1564, water cooling lines 1565, axle 1575, and/or exhaust system 1568 is within FOV 1406b, as is also illustrated in FIG. 14. In a further example, infrared imaging module 1402c may be mounted within a component of power system 1430 (e.g., in an exhaust manifold, or in engine 1510) in FIG. 16 so that an inner portion of engine 1510, turbo 1514, aftercooler 1516, and/or an intake manifold is within internal FOV 1406c, as illustrated in FIG. 14.

Water cooling system 1564 (e.g., a radiator) may be coupled to engine 1510 by water lines 1565, fuel tank 1570 may be coupled to engine 1510 by fuel line 1571, accessory battery 1572 may be coupled to engine 1510 by battery terminals 1573, driveshaft 1580 may be coupled to axles 1581 by at least one differential 1582, and control electronics 1594 may be coupled to various power system components by control electronics wiring 1595.

In one embodiment, system 1400, including infrared imaging modules 1402a, 1402b, and 1402c, may be configured to monitor water cooling system 1564, water lines 1565, and engine 1510 to determine whether there is a clog, leak, or malfunctioning water pump in cooling system 1564. Additionally, system 1400 may be configured to monitor a temperature of water cooling system 1564, water lines 1565, and portions of engine 1510 and adjust, using control signals generated by processor 1410 of system 1400, for example, a throughput of water cooling system 1564 based on those temperatures, or even to turn off engine 1510 when the temperatures indicate engine 1510 or any other component of power system 1430 is overheating. Control signals generated by processor 1410 may be delivered to power system 1430 through communication module 1414 and/or control module 1432, for example, as shown in FIG. 14.

System 1400 may be configured to monitor an oil cooling system of power system 1430 in similar fashion to monitoring water cooling system 1564. Monitored temperatures of oil and/or water cooling systems may indicate a failing bearing within engine 1510, for example, or, in embodiments where motor 1540 is actively cooled and/or monitored, a failing bearing within motor 1540. In one embodiment, system 1400 may energize a crankcase heater to increase a temperature of engine 1510 when the temperature of at least one component associated with engine 1510 reaches a low temperature limit, for example, or according to a schedule. For example, a crankcase heater may be energized while engine 1510 is not in operation in order to keep engine 1510 and other components of power system 1430 near a nominal operating temperature of engine 1510 prior to scheduled operation of engine 1510.

In another embodiment, system 1400 may be configured to monitor a cylinder head, exhaust manifold, or other components of engine 1510 to determine whether a combustion chamber has leaking inlet or exhaust valves. System 1400 may be configured to adjust, using control signals delivered to at least one component of power system 1430, for example, an ignition timing or state (e.g., on or off) based on whether and what type of valves are leaking.

In a further embodiment, system 1400 may be configured to monitor an air/fuel mixture of engine 1510, either directly by differentiating an air/fuel content from direct imaging of the mixture, for example, or indirectly through monitoring temperatures of at least portions of components of power system 1430, and adjust the mixture based on the temperature or pressure of the ambient air, load on power system 1430, the shared load of motor 1540, and other temperatures and/or conditions of components of power system 1430. In some embodiments, a portion of the monitoring information (e.g., ambient conditions, loads) may be provided to processor 1410 of system 1400 through communication module 1414 and/or input module 1434 receiving signals from power system 1430, a user interface, or other systems. Additionally, system 1400 may be configured to adjust a turbo wastegate and/or turbo boost pressure according to the air/fuel mixture.

In a still further embodiment, system 1400 may be configured to monitor the temperature of HV battery 1584 for excess or spot heating, for example, and adjust a charge or discharge of HV battery 1584 or the rate of charge or discharge to mitigate a possible failure.

In one embodiment, system 1400 may be configured to control an actuated venting of housing 1560 and/or a speed of fan 1562 to regulate temperatures of one or more components of power system 1430. Furthermore, if power system 1430 includes a transmission and/or electric motor 1540, system 1400 may be configured to adjust a transmission ratio, a combustion engine power output, and/or an electric motor power output according to a load on power system 1430, for example. Power system 1400 may determine a load on power system 1430, or any component of power system 1430, through thermal imaging and/or context information, and adjustments may be made to emphasize reliability (e.g., long time between scheduled or detected maintenance needs), efficiency (e.g., minimum fuel usage for required power output), performance (e.g., maximum power availability), and/or convenience (e.g., automatic monitoring and control with little or no interaction with a user over a long period of time).

Figure 17:
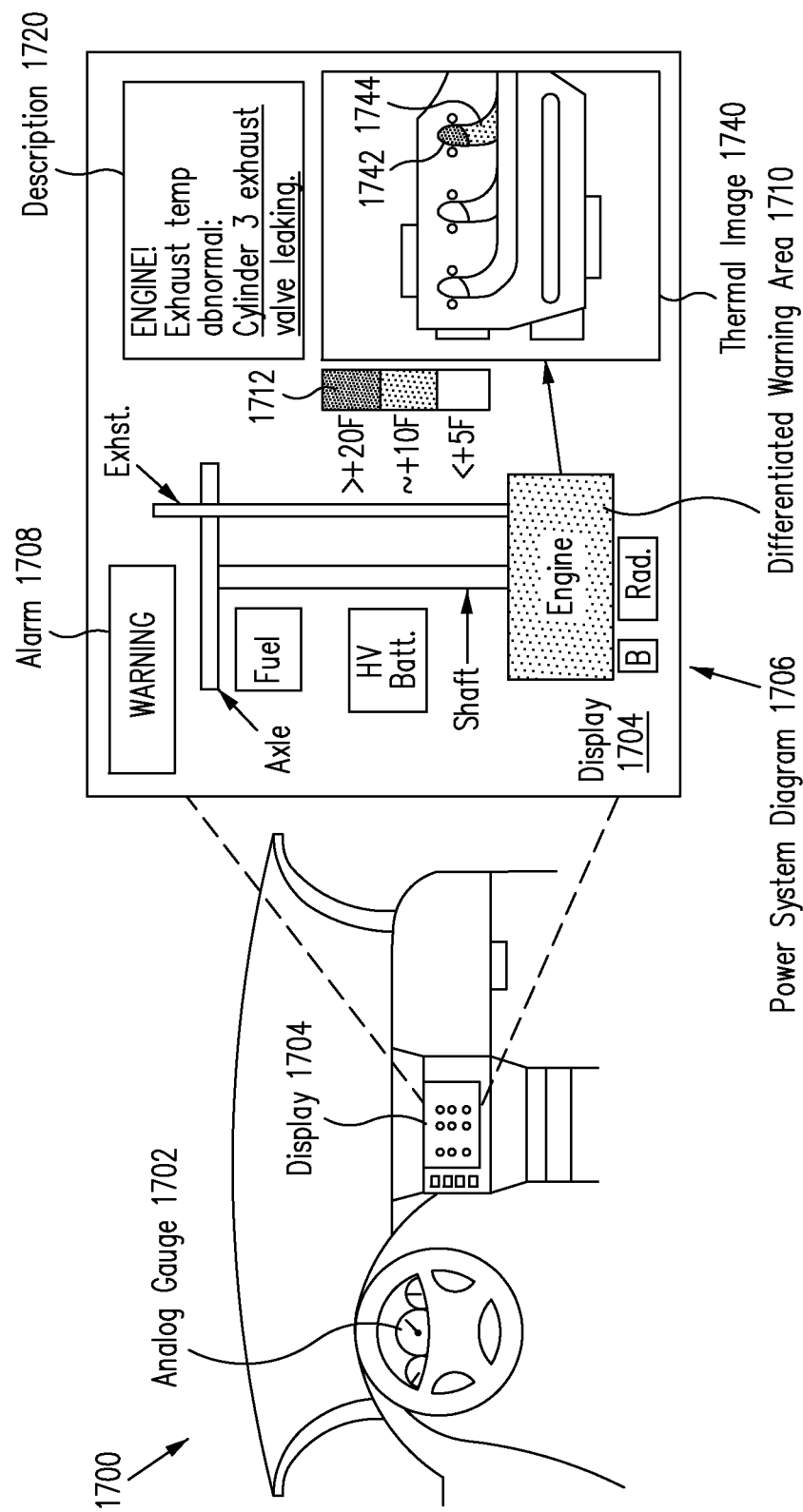
FIG. 17 illustrates a vehicle dashboard including a display of a monitoring system in accordance with an embodiment of the disclosure.

Turning now to FIG. 17, FIG. 17 illustrates a vehicle dashboard 1700 having analog gauge 1702 and display 1704 of system 1400 in accordance with an embodiment of the disclosure. In some embodiments, display 1704 may correspond to display 1416 in FIG. 14, for example, or may include a display of power system 1430 and/or an apparatus powered by power system 1430 configured to display monitoring information communicated by communication module 1414.

As shown in FIG. 17, display 1704 may be implemented with an electronic display screen (e.g., an LCD screen, a CRT screen, or other appropriate displays, such as a touch-sensitive screen) positioned on vehicle dashboard 1700 to present monitoring information generated by processor 1410 for convenient viewing by a user of a vehicle. An example screenshot of display 1704 shows that display 1704 may present monitoring information including one or more notifications such as power system diagrams 1706, alarms 1708, descriptions 1720 of conditions of various components, temperature readings/legends 1712, and/or user-viewable thermal images 1740 of relevant power system components. In various embodiments, the monitoring information presented by display 1704 may be provided in text and/or graphical forms. Notifications of monitoring information may be provided additionally or alternatively in audible form. Thus, through display 1704, system 1400 can present monitoring information to a user of power system 1430, or the user of a machine powered by power system 1430, in real time (e.g., while a vehicle powered by power system 1430 is being used).

In one embodiment, display 1704 may be a touch-sensitive display and may be configured to present power system diagram 1706 including differentiated (e.g., shaded) warning area 1710 indicating a possible problem with engine 1510 of power system 1430. In one embodiment, display 1704 may also be configured to provide a user interface, and a user may select differentiated warning area 1710 by pressing on a corresponding region of touch-sensitive display 1704, and temperature legend 1712, description 1720, and user-viewable thermal image 1740 may be displayed. Temperature legend 1712 may indicate a relative temperature excursion of temperature data provided visually by thermal image 1740, for example, or may indicate a range of absolute temperatures provided by thermal image 1740. Description 1720 may identify one or more relevant power system components, temperatures of power system components, and conditions of power system components, for example, and may include user-selectable options to rectify or mitigate a condition that may damage the power system.

For example, temperature legend 1712, description 1720, and user-viewable thermal image 1740 may indicate that an exhaust temperature of cylinder 3 is more than 20 degrees Fahrenheit above normal operating temperature measured at portion 1742 of an exhaust manifold, and is approximately 10 degrees Fahrenheit above normal operating temperature at portion 1744 of the exhaust manifold. In one embodiment, a user may select description 1720 by pressing on a corresponding region of touch-sensitive display 1704, for example, and thereby acknowledge to system 1400 that the user is aware of the determined condition and will manually mitigate operation of the power system. In another embodiment, user selection of description 1720 may enable system 1400 to mitigate the condition by, for example, diverting fuel and ignition from at least cylinder 3 until the condition can be rectified through appropriate maintenance by a technician.

Figure 18:
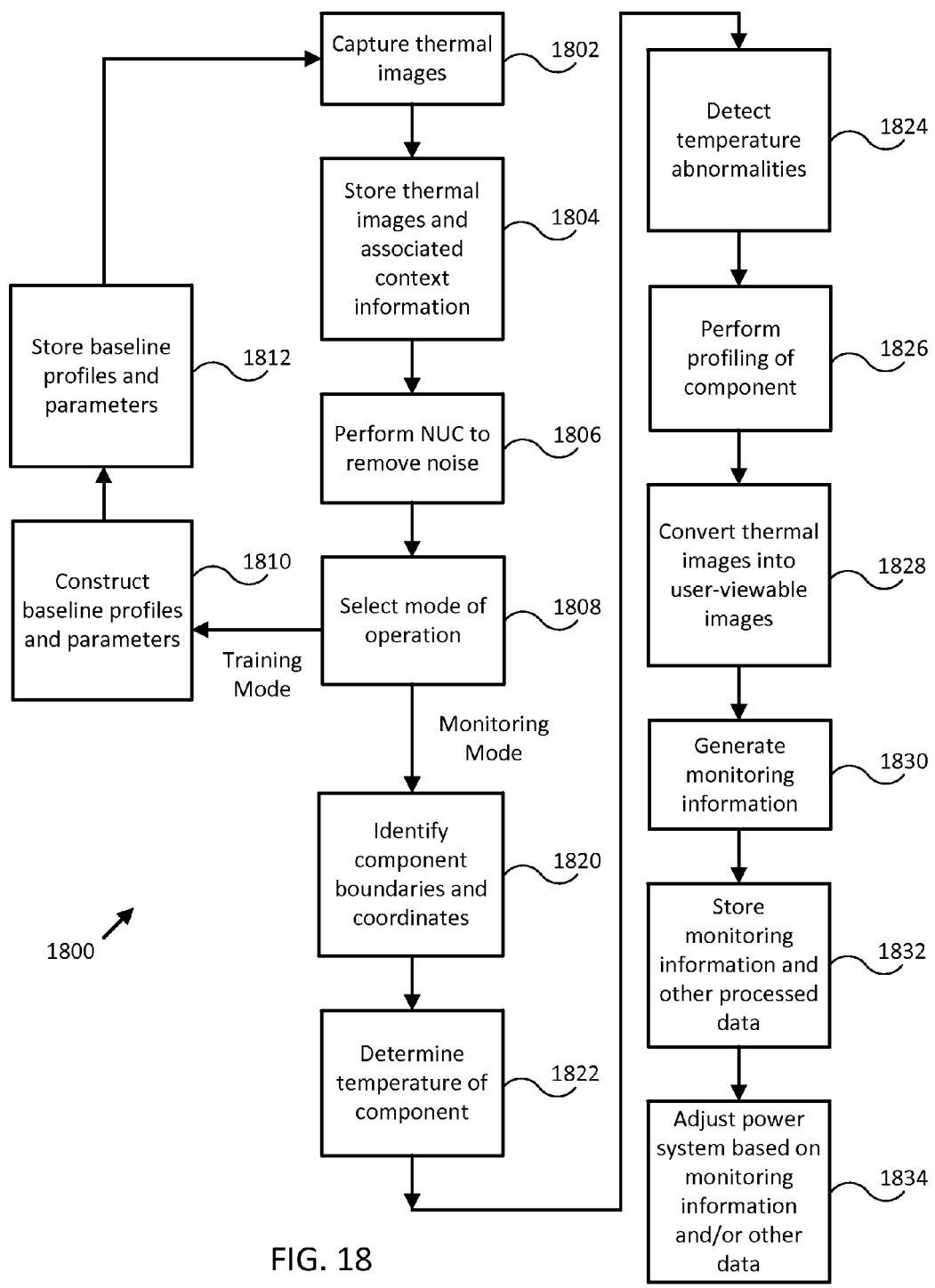
FIG. 18 illustrates a process to monitor components of a power system in accordance with an embodiment of the disclosure.

Referring now to FIG. 18, FIG. 18 illustrates a flowchart of a process 1800 to monitor components of a power system, in accordance with an embodiment of the disclosure. For example, one or more portions of process 1800 may be performed by processor 1410 and/or each of infrared imaging modules 1402a, 1402b, 1402c of system 1400 and utilizing any of optical elements 1404a, 1404b, 1404c, memory 1412, communication module 1414, display 1416, control module 1432, input module 1434, or other monitoring system components 1440, where each of infrared imaging modules 1402a, 1402b, 1402c may be mounted on or in one or more components of power system 1430. It should be appreciated that system 1400 and power system 1430 are identified only for purposes of giving examples and that any other suitable system may be mounted on any other suitable power system to perform all or part of process 1800.

At block 1802, one or more thermal images of portions of a component of a power system (e.g., power system 1430) may be captured by one or more infrared imaging modules of system 1400. For example, thermal images containing images of thermal radiation from combustion engine 1510 (e.g., including intake manifold 1512, cylinder head 1520, exhaust manifold 1522, crankcase 1524, turbo 1514, and aftercooler 1516), electric motor 1540 (e.g., including power switching circuitry 1542, rotor 1544, motor windings 1546, bearings 1548), HV battery 1584, HV generator 1590, water/oil cooling systems 1564/1566, transmission 1578 and/or other power system components 1596 may be captured by infrared imaging modules 1402a, 1402b, 1402c mounted on housing 1560 of power system 1430, as shown in FIG. 16. The one or more thermal images may be received, for example, at processor 1410 communicatively coupled to one or more infrared imaging modules via wired or wireless links.

At block 1804, the one or more thermal images and associated context information may be stored, for example, in memory 1412 by processor 1410, by infrared imaging modules 1402a, 1402b, 1402c, and/or by various sensors (e.g., including other monitoring system components 1440). Context information may include various properties and ambient conditions associated with a thermal image, such as a timestamp, the ambient temperature, the ambient barometric pressure, the total power output, the translational motion of power system 1430, the time elapsed since monitoring was begun, and/or the identification of power system components and their coordinates in the thermal image.

Context information may guide how a thermal image may be processed, analyzed, and/or used. For example, context information may reveal that a thermal image is of intake manifold 1512 or exhaust manifold 1522 while experiencing a low barometric pressure or a high ambient temperature. Such a thermal image may be used to detect abnormally high aggregate temperature, non-optimal air/fuel mixture, and other abnormal conditions.

In this and various other ways, context information may be utilized (e.g., by processor 1410) to determine the appropriate application of the associated thermal image. Context information may also supply input parameters for performing thermal image analytics and profiling as further described in detail below. In different embodiments, context information may be collected, processed, or otherwise managed at a processor (e.g., processor 1410) directly without being stored at a separate memory.

At block 1806, an NUC process may be performed on the captured and stored thermal images to remove noise therein, for example, by using various NUC techniques disclosed herein. In one embodiment, context information associated with thermal images may be analyzed to select blurred thermal images (e.g., motion-based blurred thermal images) to be used by an NUC process described herein.

At block 1808, a mode of operation may optionally be determined. The mode of operation may include a training mode and a monitoring mode. For example, using switches, power system diagnostic devices, and/or other appropriate input devices, system 1400 may be put into a training mode by a user or a technician working on power system 1430. Alternatively, system 1400 may be put into a training mode automatically when it detects certain trigger conditions, for example, when system 1400 is first installed or when new power system components are installed.

If it is determined, at block 1808, that the system (e.g., system 1400) is in a training mode, baseline parameters and profiles may be constructed from the captured thermal images at block 1810. The constructed baseline parameters and profiles may be stored (e.g., in memory 1412) at block 1812. The baseline parameters and profiles may represent normal operating conditions of the various power system components in the thermal images, and include the image coordinates and boundaries, the temperature ranges, the heating and cooling properties (e.g., heat capacity, thermal conductivity), the temperature distribution and variance patterns, and other properties of the power system components in the thermal images.

The baseline parameters and profiles may be constructed by collecting and analyzing various statistics. For example, statistical background and foreground modeling techniques (e.g., using a time-series average of pixel values to distinguish a static background from dynamic "regions of interest") may be used to identify the coordinates and boundaries of various components within the thermal images. The baseline parameters and profiles constructed while in the training mode may be utilized in performing thermal image analytics and profiling during a monitoring mode to determine the condition of various power system components in the thermal images.

The training mode may be useful when various properties of the power system components may deviate from predetermined factory values. For example, aftermarket power system components may be in sizes different from factory power system components, which may be discovered (e.g., as having different image coordinates and boundaries in the thermal images) and recorded at blocks 1810-1812. In another example, normal operating temperature ranges and temperature distribution patterns may be different for high-performance aftermarket components, which may tolerate, or even perform better at, higher temperatures.

In some embodiments, the baseline parameters and profiles may be entered manually (e.g., by a technician or user of the power system) without performing blocks 1810-1812. In some embodiments, baseline parameters and profiles may be preprogrammed only at the factory by the manufacturer of the power system, the machine it powers, and/or the installer of the monitoring system (e.g., system 1400), and blocks 1808-1812 are not performed.

If it is determined, at block 1808, that the system (e.g., system 1400) is in a monitoring mode, thermal image analytics and profiling operations may be performed (e.g., by processor 1410) on the thermal images to determine the condition of various power system components and generate corresponding monitoring information.

At block 1820, the boundaries and pixel coordinates may be identified for each power system component in the thermal images. For example, thermal radiation from turbo 1514, aftercooler 1516, cylinder head 1520, exhaust manifold 1522, and exhaust system 1568 may be distinguished from each other and from housing 1560 by identifying the boundaries and pixel coordinates of each of them. In one embodiment, the baseline parameters and/or the context information associated with the thermal images may supply the boundaries and pixel coordinates for power system components in the thermal images. For example, the predetermined (e.g., during a training mode or at the factory) baseline boundaries and coordinates may be adjusted for the position of rotor 1544 of electric motor 1540 according to the context information to arrive at a determination of the boundaries and pixel coordinates without performing further image processing at block 1820.

In another embodiment, the pixel coordinates and boundaries for each power system component may be identified in real time by performing edge detection algorithms, blob detection algorithms, and/or other appropriate image processing algorithms on the thermal images. In various embodiments, any combination of the real-time image processing operations, the context information, and the baseline parameters may be used in identifying power system component boundaries and coordinates and boundaries within the thermal images.

At block 1822, the temperature of at least a portion of a component of power system 1430 may be determined from the thermal images that contain images of thermal radiation from the various power system components. As discussed with respect to infrared imaging modules 1402*a*, 1402*b*, 1402*c* of FIG. 14, the thermal images may be radiometrically calibrated to contain calibrated temperature data of each pixel in the thermal images. By analyzing the pixels that correspond to the thermal radiation from a certain power system component, a temperature reading of all or part of the power system component may be obtained. The temperature reading may be further refined by using the emissivity of the materials that make up the component.

At block 1824, the temperature readings obtained at block 1822 may be compared against the baseline parameters and profiles to determine whether the temperature of the various power system components are within normal operating ranges. An abnormal operating temperature of a power system component may indicate an impending failure or an occurrence of a failure. In addition, an abnormal operating temperature generally leads to decreased performance even if there is no complete failure of a power system component. For example, abnormally high temperature of a portion of exhaust manifold 1522 can cause the seal between exhaust manifold 1522 and combustion engine 1510 to deteriorate and eventually fail. Similarly, abnormally high temperature of turbo 1514 may lead to an eventual failure. In another example, abnormally high temperature of rotor 1544 of electric motor 1540 may indicate an increased friction and an eventual failure (e.g., a seizure) of a rotor bearing or other bearings 1548.

If one or more abnormal temperature conditions are detected, a notification or alarm flag may be set accordingly so that appropriate alarms may be included in the monitoring information. For example, an alarm flag may indicate an abnormally high temperature condition of a certain component, a portion of that component, or other related components of a power system.

In one embodiment, the thermal images may be analyzed to detect hot or cold portions of a power system component. Hot or cold portions are localized regions that deviate from overall temperature of a power system component. Hot or cold portions generally indicate formation and development of structural failure points, which may eventually lead to a failure of the power system component. It will be appreciated that because hot or cold portions are localized, the aggregate temperature of the component being monitored may still be in a normal range. Thus, hot or cold portion detection may detect and warn of dangerous conditions that may not be revealed by abnormal temperature detection alone.

For example, a relatively cold spot on cylinder head 1520 may indicate build-up of debris on the inside of cylinder head 1520, which may eventually lead to an oil system blockage if the debris separates from the cylinder head wall. Similarly, a hot spot on the cool side of aftercooler 1516 likely indicates blockage of the cooling lines, which may eventually lead to failure of aftercooler 1516, turbo 1514, or other components of power system 1430. In addition, a small hot spot or cold spot may indicate a water or oil leak. User-viewable thermal image 1740 of FIG. 17 shows a very hot spot 1742 and a hot spot 1744 that are clearly distinguishable from the rest of engine 1510/exhaust manifold 1522.

In one embodiment, these and other hot or cold portions of various power system components may be detected by performing blob detection operations or other appropriate thermal image analytics on sharp (e.g., unblurred) thermal images of at least portions of components of power system 1430. As described in connection with block 1804, the context information associated with a thermal image may be analyzed to determine whether the thermal image is sharp or blurred. Blob detection operations or other appropriate thermal image analytics may be performed if the thermal image is determined to be sufficiently sharp based on the context information. If one or more hot or cold spots are detected, a notification or alarm flag may be set accordingly so that appropriate alarms may be included in the monitoring information.

In another embodiment, the thermal images may be analyzed (e.g., by processor 1410) to detect cracks in power system components. Various power system components, such as crankcase 1524, exhaust manifold 1522, oil sump 1526, and radiator/water cooling system 1564, may develop cracks. Because such cracks generally manifest themselves in thermal images as thermal gradient discontinuities, they can be detected, in one embodiment, by performing line detection operations, edge detection operations, or other appropriate operations for detecting thermal gradient discontinuities on thermal images of such components. Similar to hot or cold spot detection, crack detection may be performed if a thermal image is determined to be sufficiently sharp based on the context information. If one or more cracks are detected, a notification or alarm flag may be set accordingly so that appropriate alarms may be included in the monitoring information.

At block 1826, the thermal images may be analyzed (e.g., by processor 1410) to obtain temperature distribution and variance profiles of power system components in the thermal images, and to detect abnormal conditions of a power system (e.g., power system 1430) using the profiles obtained from the thermal images. Various abnormal conditions may be indicated from uneven temperature distribution and variance in a power system component. For example, FIG. 17 shows an uneven temperature distribution and pattern that may be exhibited on exhaust manifold 1522. As FIG. 17 shows, concentration of the highest abnormal temperature nearer to the combustion chamber of engine 1510 may indicate a leaky exhaust valve.

In one embodiment, the temperature distribution and variance profiles obtained from the thermal images may be correlated, matched, profiled, or otherwise compared against predefined temperature distribution and variance profiles of abnormal conditions to detect and identify various abnormal conditions. For example, processor 1410 may detect and identify that power system 1430 has a leaky exhaust valve if the obtained profile matches that of such a condition.

In another embodiment, abnormal conditions may be detected by comparing the profiles obtained from the thermal images against the baseline profiles described above in connection with blocks 1810-1812. Because the baseline profiles may represent normal operating profiles of power system components, deviation (e.g., an uneven temperature distribution) from the baseline profiles may indicate abnormal conditions. For example, the temperature distribution and variance profile of turbo 1514 that has a leaking wastegate, burned oil built up on the turbine, or too high a boost pressure likely deviates from the baseline profile representing a smooth and even temperature distribution and variance.

In yet another embodiment, any uneven temperature distribution and variance may be detected as abnormal without comparing it to abnormal condition profiles or baseline profiles. In various embodiments, any combination of the profiling operations described above may be utilized to detect abnormal conditions. In embodiments where the obtained profiles are compared against abnormal condition profiles and/or baseline profiles, the context information associated with the thermal images may be analyzed to select appropriate profiles. For example, some abnormal condition profiles and/or baseline profiles may be configured to be compared against profiles obtained from unblurred thermal images. Such abnormal condition profiles and/or baseline profiles may be selected to be compared against, if the context information indicates that the thermal images are unblurred.

In embodiments where the obtained profiles are compared against abnormal condition profiles, various profiling operations may be adjusted based on the baseline profiles. For example, data points in abnormal condition profiles may be offset, shifted, or otherwise altered to compensate for a baseline profile that differs from a predefined factory profile.

If one or more abnormal conditions are detected through the various profiling operations described above for block 1826, a notification flag may be set accordingly so that appropriate notifications and/or alarms may be included in the monitoring information.

It will be appreciated that process 1800, including the various profiling operations in block 1826, may permit early detection of some abnormal conditions that otherwise may remain undetected until the effected power system components are permanently damaged. For example, the profiling operations in block 1826 may detect a developing blockage in oil/water cooling systems 1564/1566 as a slight increase in temperatures of crankcase 1524 in areas past the developing blockage. Such condition could otherwise remain undetected, even when conventional cooling system temperature sensors are installed, until the damage to the engine becomes apparent due to a crack or a failed internal bearing. Thus, process 1800 permits early detection that may allow power system operators/owners to reduce maintenance costs by avoiding premature wear of power system components.

For example, in one embodiment, power system component wear may be determined by tracking degradation in heat capacity or thermal conductivity of a power system component (e.g., turbo 1514, aftercooler 1516, exhaust manifold 1522, and exhaust system 1568). As generally known, these systems can be viewed as heat sinks which dissipate heat in the gasses they contain. As such, degradation in heat capacity or a change in thermal conductivity may indicate wear (e.g., loss of component mass) of these components.

The heat capacity and/or thermal conductivity may be obtained by correlating the power system component temperature change with power system output for a given interval. For example, with two or more thermal images, the temperature differences may be determined (e.g., by comparing the temperature readings obtained at block 1822), and the output power may be derived from the context information (containing translational motion powered by the power system, timestamps, and other relevant data) associated with the two or more thermal images. If the heat capacity or thermal conductivity degrades to a certain level relative to the baseline, a notification or alarm flag may be set accordingly so that appropriate alarms may be included in the monitoring information.

In another embodiment, power system component wear may be determined by comparing the temperature differential between raised surfaces and grooves of a power system component, where the grooves represent thinner portions of the power system component than the raised surfaces. In this embodiment, wear may be determined from thermal images of the power system component, which may be analyzed to detect grooves (e.g., by performing edge and/or line detection operations) and obtain the temperature differential between the detected grooves and the raised surfaces. For example, processor 1410 may perform the temperature differential analysis if the context information indicates that the thermal image is sharp (e.g., 30 unblurred) and contains an image of thermal radiation from a power system component that has reached a normal operating temperature. If the temperature differential is outside the threshold for a given condition, a notification or alarm flag may be set accordingly so that appropriate alarms may be included in the monitoring information.

In a further embodiment, the thermal images may be analyzed (e.g., by processor 1410) to detect gas and/or fluid leaks through cracks in power system components. In one embodiment, the thermal images may be able to distinguish carbon monoxide and/or fuel fumes from air, for example, and detect a leak in exhaust system 1568 (e.g., carbon monoxide), intake manifold 1512, or fuel system 1570 (e.g., fuel fumes). In still further embodiments, thermal images from an internal portion of intake manifold 1512 may be analyzed to detect an air/fuel mixture being delivered to combustion chambers of a combustion engine by detecting the relative density of the air and the fuel in the mixture.

At block 1828, the thermal images may be converted into user-viewable thermal images (e.g., thermograms) using appropriate methods and algorithms. For example, as described above with respect to processor 1410 of FIG. 14, the thermographic data contained in the thermal images may be converted into gray-scaled or color-scaled pixels to construct images that can be viewed by a person. User-viewable thermal images may optionally include a legend or scale that indicates the approximate temperature of corresponding pixel color and/or intensity. Such user-viewable thermal images, if presented on a display (e.g., display 1416/1704), may be useful to a user or a technician in confirming or better understanding conditions detected through process 1800, or in visually identifying conditions not otherwise detected through process 1800.

At block 1830, monitoring information may be generated by collecting, compiling, analyzing, or otherwise managing the various notifications, alarms and data from the various thermal image analytics and profiling operations described above. In one embodiment, the monitoring information may include one or more notifications based on the various conditions detected, one or more descriptions of the detected conditions (e.g., the location and the classification of a detected abnormal condition), one or more temperature readings of one or more power system components, one or more user-viewable thermal images of the relevant power system components, and/or other data and alarms. Thus, the monitoring information may include comprehensive data and warnings regarding the condition of the various power system components, and as such, may beneficially permit users or owners to avoid costly damage.

At block 1832, the context information, the generated monitoring information, and/or other acquired or generated data may be stored (e.g., in memory 1412). The stored information and data can be retrieved or recalled later by a user for purposes of reviewing and further diagnosing the condition of the various power system components being monitored.

In one embodiment, a trending analysis may be performed on the monitoring information and other related data acquired and/or generated over a certain period. Such an analysis may produce a summarized view of various conditions of the power system components. Such a trending summary may be updated and/or stored at block 1832, and retrieved later by a user, for example, to use as a guide in properly maintaining one or more components of a power system (e.g., power system 1430). In one example, the trending summary may include an averaged image of the user-viewable thermal images of the power system components. In another example, the stored trending summary may include correlation data between the monitoring information and some or all of the context information (e.g., a translational motion reading, a crankshaft rotational speed reading, a load reading of a machine powered by the power system). Such correlation data may be used to reveal the effects of various factors on the power system components. For example, a user may selectively review a summary of monitoring information based on whether the power system was under a relatively large or small load.

In some embodiments, the monitoring information, the trending summary, and/or other related data may be provided to a conventional on-board data recording device for storage. For example, many power systems are equipped with a data acquisition and recording device. The monitoring information may be synchronized and stored along with other operating-related data (e.g., duration of operation, power system load) in such a device for a real-time and post-operation analysis.

In a more specific example, an operating data recording device may have a plurality of video ports for storing a plurality of video streams synchronized with various other operating data. A stream of user-viewable thermal images (e.g., user-viewable thermal images generated at block 1828) may be fed into one of these video ports for synchronized storage. The stream of user-viewable thermal images may even be tiled, stitched, or otherwise combined to simultaneously show different parts of a power system.

At block 1834, one or more power system components may be adjusted based on the monitoring information to emphasize reliability, performance, efficiency, and/or convenience to a user of the power system. In one embodiment, various components of combustion engine 1510 may automatically be adjusted by a processor (e.g., processor 1410) generating signals to control actuators and electronics attached to various power system components, if monitoring information indicates a non-optimal efficiency or power output. In one embodiment, an air/fuel mixture may automatically be adjusted by a processor activating a wastegate of turbo 1514 if monitoring information indicates a fuel-lean mixture. In other embodiments, a user (e.g., a technician) may adjust the mixture and/or turbo boost pressure based on the stored monitoring information and/or the trend summary, as described above for block 1832. Such automatic and/or manual adjustments based on the comprehensive and real-time monitoring information allow the various power system components to maintain appropriate working temperature and thereby achieve optimal combustion and/or power efficiency. Furthermore, various power system components may be adjusted by a processor (e.g., processor 1410) according to a schedule set by a user, a technician, or at the factory in order to provide convenient and reliable operation of a power system.

The monitoring information may also be presented, for example, on display 1416/1704 to a user, occupants of a vehicle, a technician, or other appropriate users. In one embodiment, the monitoring information may be presented on a display (e.g., display 1416) mounted near a power system so that a user may be informed of any dangerous and/or costly condition of various power system components in real time while the power system is being used.

It various embodiments, process 1800 may be adapted to determine and present monitoring information based on images and/or image data captured by one or more non-thermal cameras, for example, and/or based on combined images constructed from superimposed, fused, blended, and/or otherwise combined infrared, thermal, and/or non-thermal images, as described herein. For example, reflection/radiation by engine components imaged at non-thermal wavelengths may help localize and/or otherwise indicate specific points of impending failure with increased spatial accuracy and/or reliability than with thermal imagery alone, using the methods described herein adapted to process non-thermal and/or combined imagery.

Therefore, it will be appreciated that process 1800 permits on-board and real-time detection and warning of various power system-related conditions that cannot be detected using conventional sensors (e.g., temperature sensors, chemical sensors) and/or cannot be identified without an inspection by an expert while the power system is either dormant or stationary. It is also contemplated that process 1800 may be adapted or modified for monitoring of various other mechanical components powered by a power system, in addition to power system components. Moreover, process 1800 permits control of a power system based on such monitoring to emphasize one or more of reliability, performance, efficiency, and convenience of a user of the power system.

Where applicable, various embodiments provided by the present disclosure can be implemented using hardware, software, or combinations of hardware and software. Also where applicable, the various hardware components and/or software components set forth herein can be combined into composite components comprising software, hardware, and/or both without departing from the spirit of the present disclosure. Where applicable, the various hardware components and/or software components set forth herein can be separated into sub-components comprising software, hardware, or both without departing from the spirit of the present disclosure. In addition, where applicable, it is contemplated that software components can be implemented as hardware components, and vice-versa.

Software in accordance with the present disclosure, such as non-transitory instructions, program code, and/or data, can be stored on one or more non-transitory machine readable mediums. It is also contemplated that software identified herein can be implemented using one or more general purpose or specific purpose computers and/or computer systems, networked and/or otherwise. Where applicable, the ordering of various steps described herein can be changed, combined into composite steps, and/or separated into sub-steps to provide features described herein.

Embodiments described above illustrate but do not limit the invention. It should also be understood that numerous modifications and variations are possible in accordance with the principles of the invention. Accordingly, the scope of the invention is defined only by the following claims.

What is claimed is:

1. A system comprising:
an infrared imaging device having a field of view (FOV) that includes at least a portion of a component of a power system, the component of the power system comprising a combustion engine or an electrical motor for a vehicle, the infrared imaging device coupled to or within the vehicle or the power system and comprising infrared sensors arranged as a focal plane array (FPA) configured to capture a thermal image of the portion of the combustion engine or the electrical motor for the vehicle;
a memory comprising a plurality of executable instructions; and
a processor configured to receive the thermal image and execute the instructions to process the thermal image to generate monitoring information associated with at least the portion of the combustion engine or the electrical motor for the vehicle.

2. The system of claim 1, wherein:
the processor is configured to analyze the thermal image to determine a temperature of the portion of the component;
the monitoring information comprises a notification based on the determined temperature;
the FPA is configured to capture the thermal image of the portion of the combustion engine or the electrical motor for the vehicle while the vehicle is being operated; and
the processor is configured to receive the thermal image and execute the instructions to process the thermal image while the vehicle is being operated.

3. The system of claim 1, wherein:
the processor is configured to analyze the thermal image to determine a condition of the power system associated with the portion of the component; and
the monitoring information comprises a notification based on the determined condition.

4. The system of claim 3, wherein:
the determined condition is a clogged or leaking water or oil cooling system condition, a malfunctioning water or oil pump condition, a leaking combustion chamber inlet or exhaust valve condition, a non-optimal air/fuel mixture condition, a failing bearing condition, an overheating combustion engine component or electric motor component condition, an exhaust system leak condition, a build-up of debris on an inner surface of a component condition, a failing high voltage (HV) battery condition, a component or power system load condition, a component wear condition, a component deformation condition, a component crack condition, a carbon monoxide leak condition, or a fuel leak condition.

5. The system of claim 1, wherein:
the system is configured to generate, based on the monitoring information, a control signal to adjust one or more power system components associated with the thermal image.

6. The system of claim 5, wherein:
the control signal adjusts an air/fuel mixture, a combustion chamber ignition state or timing, a turbo wastegate state, a turbo boost pressure, a charge or discharge of a high voltage battery, a charge or discharge rate of a high voltage battery, a crankcase heater voltage, a housing venting, a fan speed, a water or oil cooling system throughput, a transmission ratio, or a combustion or electric motor output power in accordance with the monitoring information.

7. The system of claim 1, wherein:
the infrared imaging device is mounted to or within: the power system, a housing of the power system, the component of the power system, or the portion of the component.

8. The system of claim 1, further comprising a non-thermal camera substantially co-located with the infrared imaging device and oriented such that an FOV of the non-thermal camera at least partially overlaps the FOV of the infrared imaging device, wherein the monitoring information comprises a non-thermal image data captured by the non-thermal camera combined with the thermal image.

9. The system of claim 1, wherein:
the power system is used to provide mechanical power for a water based vehicle; and
the monitoring info Illation is provided to a user of the water based vehicle.

10. The system of claim 9, wherein the processor is further configured to:
determine presence of one or more selected gases based on the thermal images; and
provide via the monitoring information, status of a malfunctioning component of the power system to the user while the user is using the water based vehicle.

11. The system of claim 1, further comprising a display configured to present the monitoring information to a user, wherein the monitoring information comprises a user-viewable image and a legend associated with the user-viewable image, and wherein the user-viewable image is based, at least in part, on the thermal image.

12. The system of claim 1, wherein:
the FPA comprises an array of microbolometers adapted to receive a bias voltage selected from a range of approximately 0.2 volts to approximately 0.7 volts.

13. The system of claim 12, wherein:
a size of the array of microbolometers is approximately 80 by 60; and
the infrared imaging device is adapted to be inserted into a socket having a size less than approximately 8.5 mm by 8.5 mm.

14. The system of claim 1, wherein:
the thermal image is an unblurred thermal image of the portion of the component;
the infrared imaging device is configured to capture an intentionally blurred thermal image of the portion of the component; and
the processor is configured to determine a plurality of non-uniform correction (NUC) terms based on the intentionally blurred thermal image and apply the NUC terms to the unblurred thermal image to remove noise from the unblurred thermal image.

15. A method comprising:
capturing, at a focal plane array (FPA) of an infrared imaging device, a thermal image of at least a portion of a component of a power system, the component of the power system comprising a combustion engine or an electrical motor for a vehicle, the infrared imaging device coupled to or within the vehicle or the power system and having a field of view (FOV) that includes at least the portion of the combustion engine or the electrical motor for the vehicle; and
processing the thermal image to generate monitoring information associated with the at least the portion of the combustion engine or the electrical motor.

16. The method of claim 15, wherein:
the processing comprises analyzing the thermal image to determine a temperature of the portion of the component; and
the monitoring information comprises a notification based on the determined temperature.

17. The method of claim 15, wherein:
the processing comprises analyzing the thermal image to determine a condition of the power system associated with the portion of the component; and
the monitoring information comprises a notification based on the determined condition.

18. The method of claim 17, wherein:
the determined condition is a clogged or leaking water or oil cooling system condition, a malfunctioning water or oil pump condition, a leaking combustion chamber inlet or exhaust valve condition, a non-optimal air/fuel mixture condition, a failing bearing condition, an overheating combustion engine component or electric motor component condition, an exhaust system leak condition, a build-up of debris on an inner surface of a component condition, a failing high voltage (HV) battery condition, a component power system load condition, a component wear condition, a component deformation condition, a component crack condition, a carbon monoxide leak condition, or a fuel leak condition.

19. The method of claim 15, further comprising:
generating, based on the monitoring information, a control signal to adjust one or more power system components associated with the thermal image.

20. The method of claim 19, further comprising:
adjusting, by the control signal, an air/fuel mixture, a combustion chamber ignition state or timing, a turbo wastegate state, a turbo boost pressure, a charge or discharge of a high voltage battery, a charge or discharge rate of a high voltage battery, a crankcase heater voltage, a housing venting, a fan speed, a water or oil cooling system throughput, a transmission ratio, or an electric motor power in accordance with the monitoring information.

21. The method of claim 15, further comprising:
mounting the infrared imaging device to or within: the power system, a housing of the power system, the component of the power system, or the portion of the component.

22. The method of claim 15, further comprising capturing non-thermal image data using a non-thermal camera, wherein an FOV of the non-thermal camera at least partially overlaps the FOV of the infrared imaging device, and wherein the monitoring information comprises the non-thermal image data combined with the thermal image.

23. The method of claim 15, wherein the power system is used to provide mechanical power for a water based vehicle, the method further comprising:
providing the monitoring information to a user of the water based vehicle.

24. The method of claim 23, wherein the processing further comprises:
determining a presence of one or more selected gases based on the thermal image; and
providing via the monitoring information, status of a malfunctioning component of the power system to the user while the user is using the water based vehicle.

25. The method of claim 15, further comprising:
displaying the monitoring information to a user.

26. The method of claim 15, wherein the FPA comprises an array of microbolometers, the method further comprising:
   providing a bias voltage to the microbolometers selected from a range of approximately 0.2 volts to approximately 0.7 volts.

27. The method of claim 26, wherein:
   a size of the array of microbolometers is approximately 80 by 60; and
   the infrared imaging device is adapted to be inserted into a socket having a size less than approximately 8.5 mm by 8.5 mm.

28. The method of claim 15, wherein the thermal image is an unblurred thermal image of the portion of the component, the method further comprising:
   capturing an intentionally blurred thermal image of the portion of the component;
   determining a plurality of non-uniform correction (NUC) terms based on the intentionally blurred thermal image; and
   applying the NUC terms to the unblurred thermal image to remove noise from the unblurred thermal image.

\* \* \* \* \*